(12) United States Patent
Mishima et al.

(10) Patent No.: US 7,440,619 B2
(45) Date of Patent: Oct. 21, 2008

(54) IMAGE MATCHING METHOD AND IMAGE INTERPOLATION METHOD USING THE SAME

(75) Inventors: Nao Mishima, Tokyo (JP); Goh Itoh, Tokyo (JP); Masahiro Baba, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 381 days.

(21) Appl. No.: 11/355,144

(22) Filed: Feb. 16, 2006

(65) Prior Publication Data

US 2006/0193535 A1    Aug. 31, 2006

(30) Foreign Application Priority Data

Feb. 16, 2005  (JP) .............................. 2005-039623
Nov. 21, 2005  (JP) .............................. 2005-336291

(51) Int. Cl.
G06K 9/68  (2006.01)

(52) U.S. Cl. ........................ 382/209; 382/215; 382/219; 382/278

(58) Field of Classification Search ................. 382/209, 382/215, 218, 219, 278
See application file for complete search history.

(56) References Cited

U.S. PATENT DOCUMENTS

| | | | | |
|---|---|---|---|---|
| 5,534,487 | A | * | 7/1996 | Gironda ....................... 504/290 |
| 5,783,829 | A | * | 7/1998 | Sealock et al. .............. 250/367 |
| 5,901,245 | A | * | 5/1999 | Warnick et al. ............. 382/190 |
| 6,880,386 | B1 | * | 4/2005 | Krotil et al. ................... 73/105 |
| 7,124,041 | B1 | * | 10/2006 | Johnson et al. .............. 702/58 |
| 2003/0174777 | A1 | | 9/2003 | Itoh et al. |
| 2004/0046891 | A1 | | 3/2004 | Mishima et al. |
| 2004/0240551 | A1 | | 12/2004 | Itoh et al. |
| 2004/0246374 | A1 | | 12/2004 | Mishima et al. |
| 2005/0053291 | A1 | | 3/2005 | Mishima et al. |
| 2005/0100095 | A1 | | 5/2005 | Itoh et al. |
| 2005/0157792 | A1 | | 7/2005 | Baba et al. |
| 2006/0078206 | A1 | | 4/2006 | Mishima et al. |

FOREIGN PATENT DOCUMENTS

JP    2927350    5/1999

OTHER PUBLICATIONS

Tekalp, "Digital Video Processing," Prentice Hall Signal Processing Series (1995), pp. 72-151.

(Continued)

Primary Examiner—Yosef Kassa
(74) Attorney, Agent, or Firm—Finnegan, Henderson, Farabow, Garrett & Dunner, L.L.P.

(57) ABSTRACT

An image matching method includes setting first and second lattices to first and second images respectively, computing potential force to each second lattice point of the second lattice by a gradient of an image correlation potential energy based on a position of each first lattice point and pixel thereof and a position of the second lattice point and pixel thereof, computing elasticity force to the second lattice point from elasticity energy between the second and adjacent lattice points, computing frictional force occurring at the second lattice point, performing a numerical analysis of an equation of motion regarding the second lattice point and based on the potential force, elasticity force and frictional force to obtain a convergence state of the second lattice points, and adding a new lattice point between an adjacent lattice point pair of second lattice points according to a distance between the adjacent lattice point pair.

12 Claims, 22 Drawing Sheets

OTHER PUBLICATIONS

Nieweglowski et al., "Motion Compensated Video Sequence Interpolation Using Digital Image Warping," IEEE (1994), pp. V-205—V-208.

Nieweglowski et al., "A Novel Video Coding Scheme Based on Temporal Prediction Using Digital Image Warping," IEEE (1993), pp. 141-150.

Shinagawa et al., "Unconstrained Automatic Image Matching Using Multiresolutional Critical-Point Filters," IEEE Transactions on Pattern Analysis and Machine Intelligence (Sep. 1998), 20:994-1010.

Sakaue et al., "Active Net Model and Its Application to Region Extraction," Television Studies Magazine (1991), 45:1155-63.

Kass et al., "Snakes: Active Contour Models," International Journal of Computer Vision (1988), pp. 321-331.

* cited by examiner

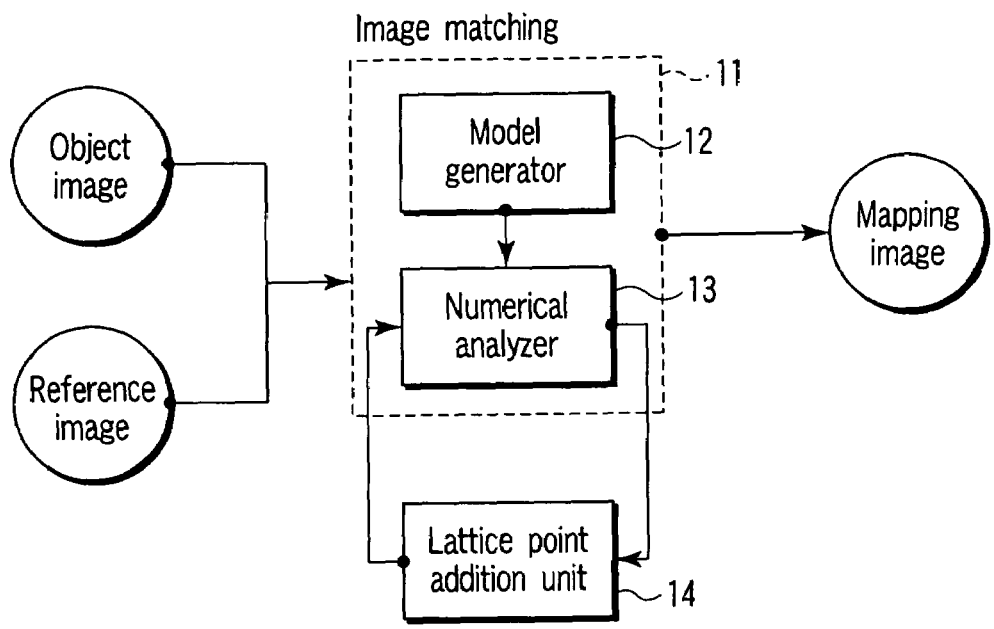
F I G. 1
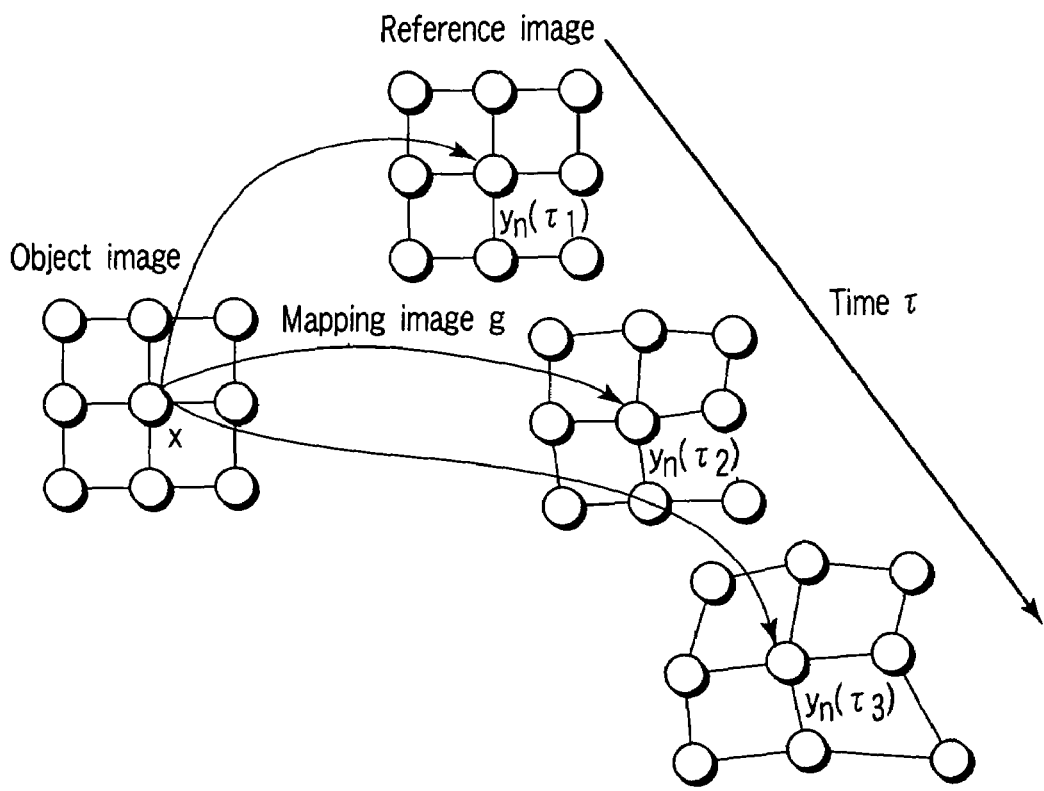
F I G. 2

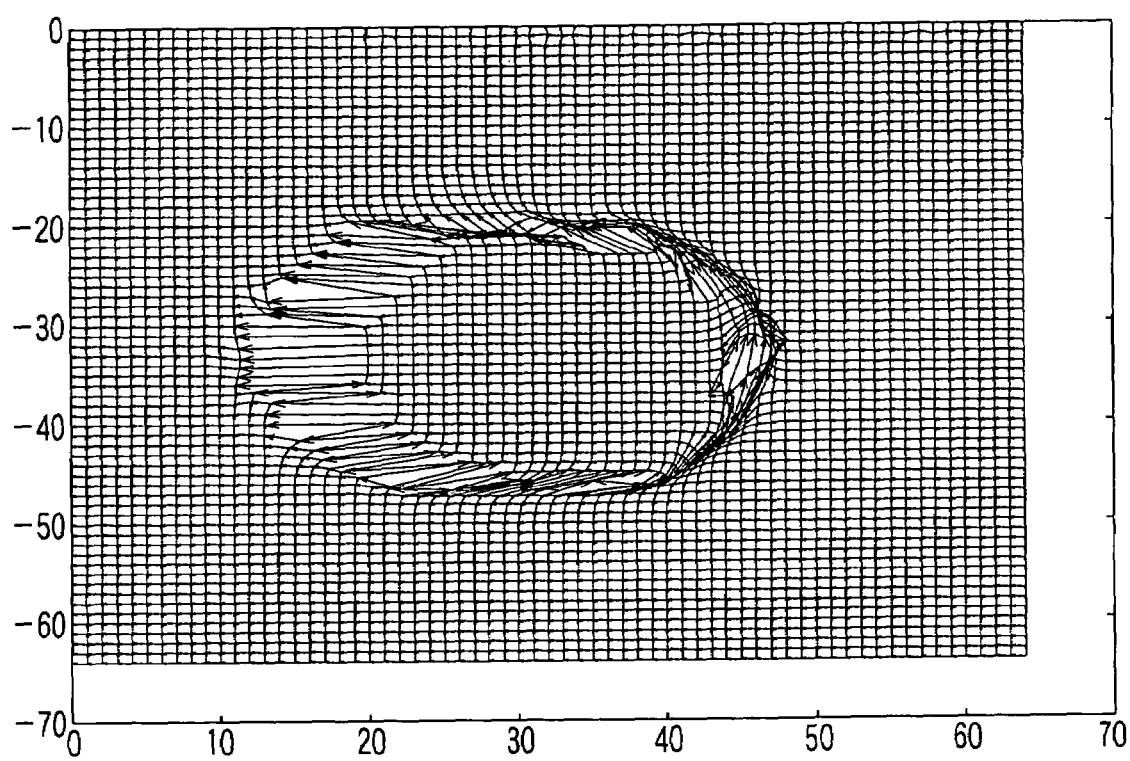
F I G. 12

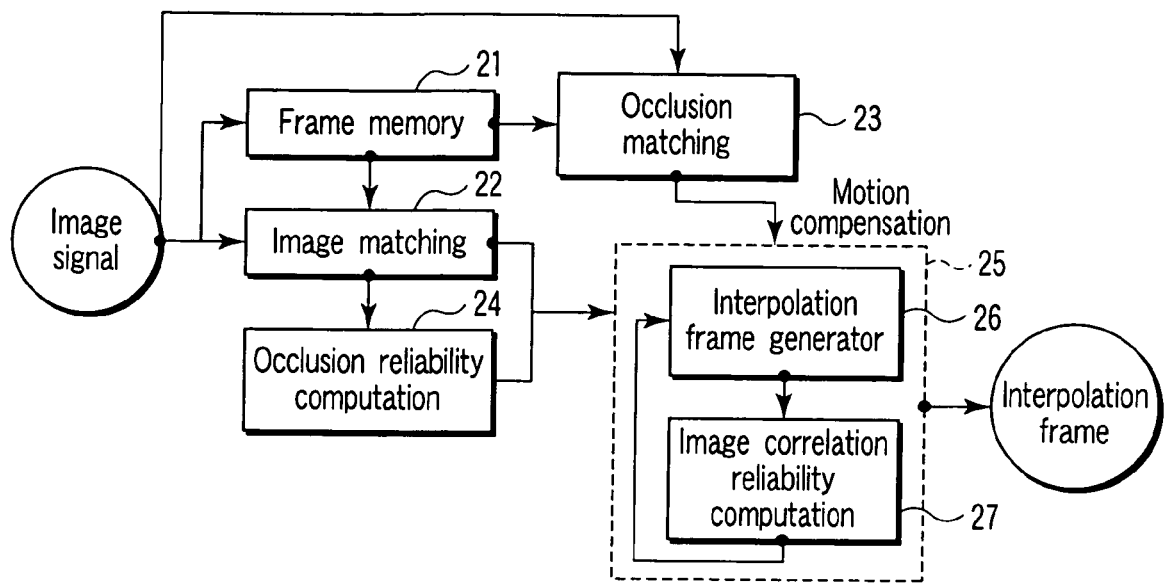
F I G. 13
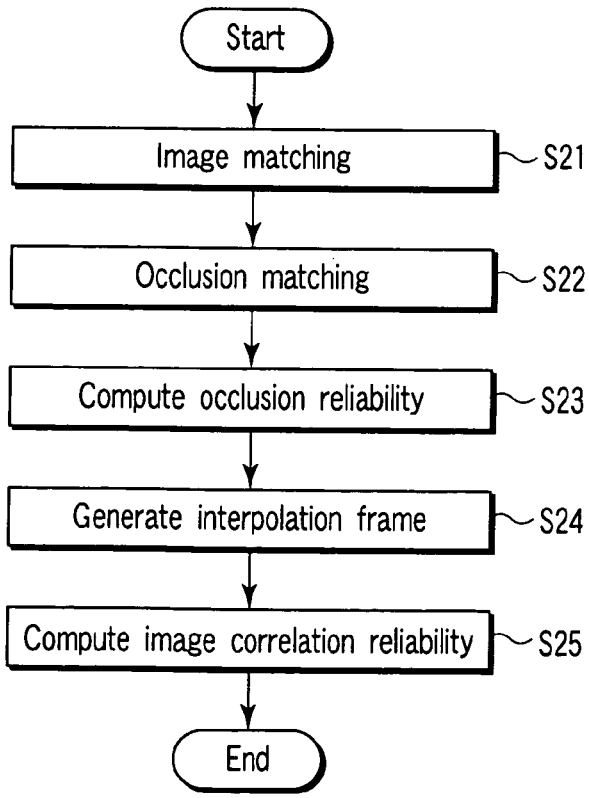
F I G. 14

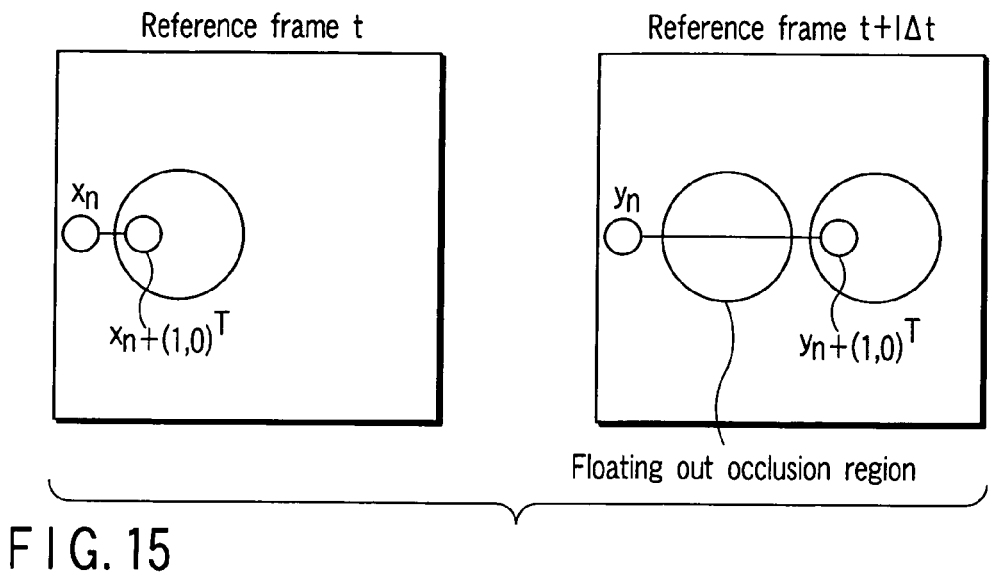
F I G. 15
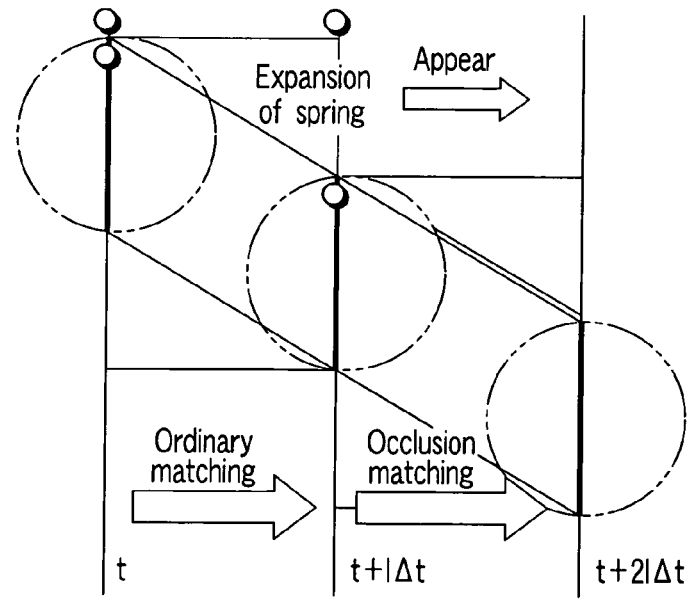
F I G. 16
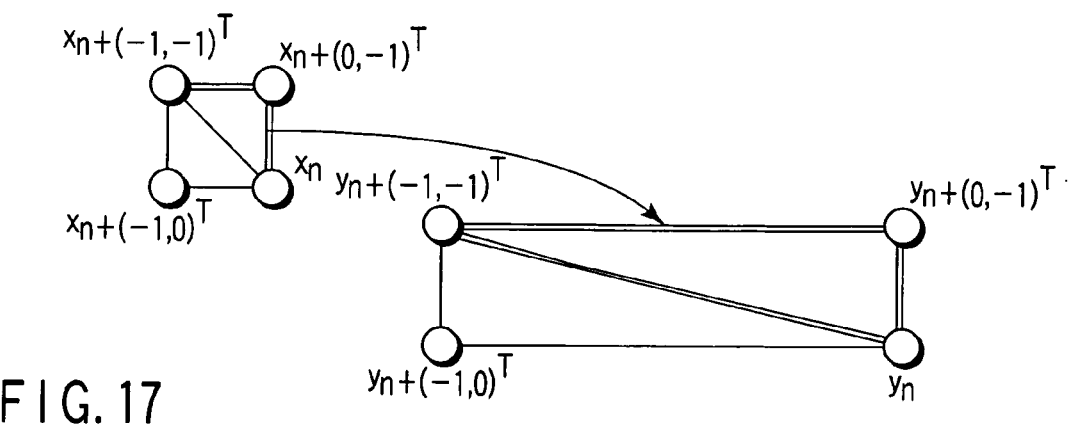
F I G. 17

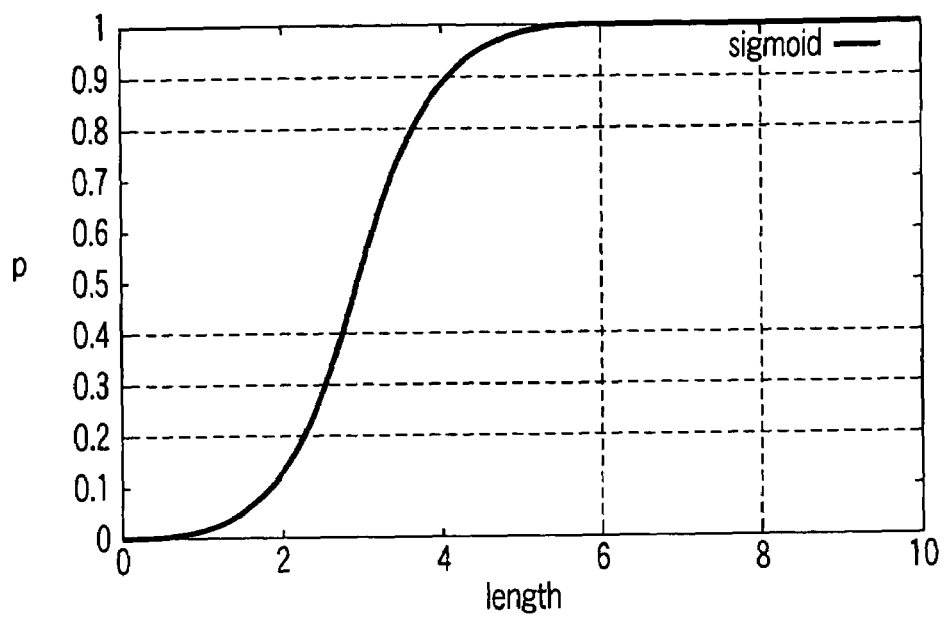
F I G. 18
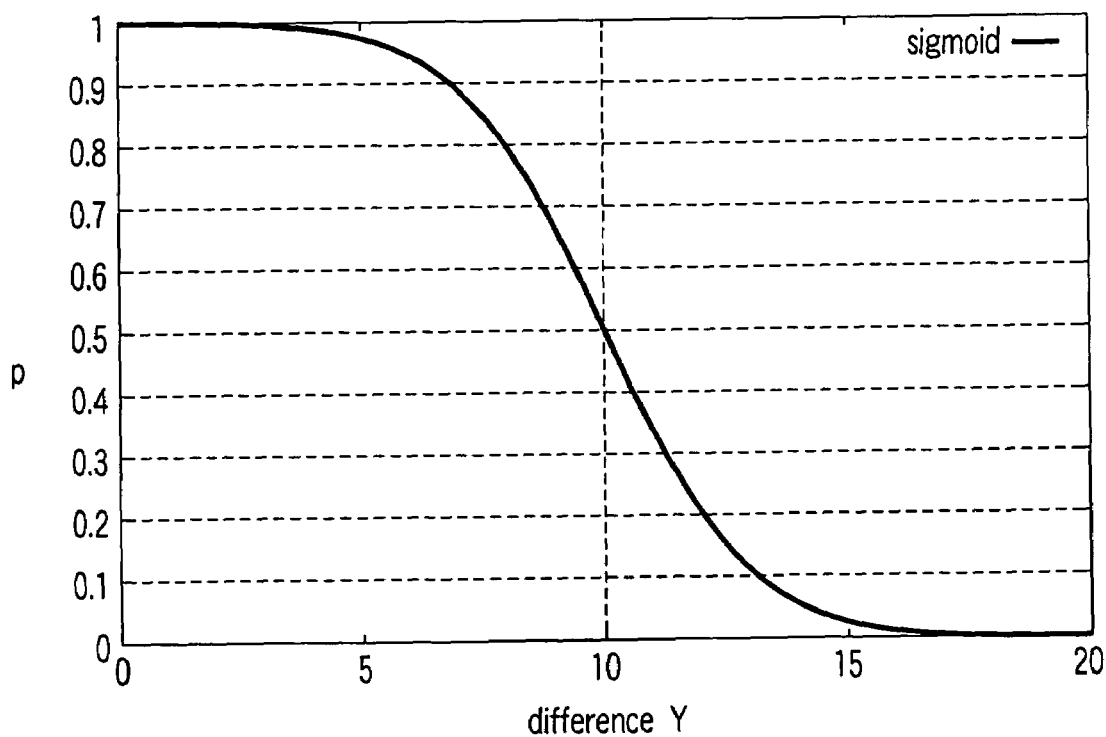
F I G. 19

IMAGE MATCHING METHOD AND IMAGE INTERPOLATION METHOD USING THE SAME

CROSS-REFERENCE TO RELATED APPLICATIONS

This application is based upon and claims the benefit of priority from prior Japanese Patent Applications No. 2005-039623, filed Feb. 16, 2005; and No. 2005-336291, filed Nov. 21, 2005, the entire contents of both of which are incorporated herein by reference.

BACKGROUND OF THE INVENTION

1. Field of the Invention

The present invention relates to an image matching method for matching images by detecting corresponding points from two images, and an image interpolation method for interpolating the image using the same.

2. Description of the Related Art

A technique of image matching to obtain association between one image and the other image is a basic technique in many technical fields such as motion detection, stereo matching, image morphing, image recognition, and video encoding.

According to Murat Tekalp, "Digital Video Processing", Prentice Hall, 1995, a technique of image matching can be sorted to four methods. In other words, there are an optical flow method, a block data base method, a gradient method, and a Bayesian method.

The optical flow method is a method for deriving an optical flow type equation defining that "a change of luminance is constant" and obtaining a flow using the optical flow equation as condition of constraint. The block data base method is a method for obtaining a motion by block-by-block template matching. The gradient method is a method for performing matching in a direction in which luminance gradient of an image decreases. The Bayesian method is a method for obtaining plausible matching stochastically.

Japanese patent No. 2927350 discloses an image matching method using a multiple resolution filter. This method is an image matching method for generating a pyramid of a plurality of multi-resolution images by means of a plurality of multiple resolution filters, and permitting an image matching from a high speed motion to a low speed motion with a high robustness by subjecting the image pyramid to a matching process sequentially from the top thereof.

A method for obtaining a smooth mapping relation is mentioned in Japanese patent No. 2927350. However, there is a problem that constraint condition to make the mapping smooth acts on a discontinuous part of motion, resulting in that the discontinuous mapping cannot be expressed.

This is a trade off to occur always in a conventional image matching method. There is a problem that if the mapping is smoothed, it comes to be difficult to express discontinuity, and if the discontinuity is expressed, the smoothness becomes impaired.

It is an object of the present invention to provide an image matching method that even if the mapping is smoothed, discontinuity is not impaired, and even if discontinuity is expressed, smoothness is obtained, and an image interpolation method using the same.

BRIEF SUMMARY OF THE INVENTION

An aspect of the present invention provides an image matching method for detecting a mapping from a first image to a second image, comprising: setting a first lattice having a plurality of first lattice points to a first image; setting a second lattice having a plurality of second lattice points, each second point of the second lattice points of corresponding to each first lattice point of the first lattice points, to a second image; computing potential force applied to the each second lattice point by a gradient of an image correlation potential energy based on a position of the each first lattice point, pixel data of the each first lattice points, a position of the each second lattice point and pixel data of the each second lattice point; computing elasticity force applied to the each second lattice point from an elasticity energy between the each second lattice point and adjacent lattice points on the second lattice which are adjacent to the each second lattice point; computing frictional force occurring at the each second lattice point; performing a numerical analysis of an equation of motion regarding the second lattice points and based on the potential force, the elasticity force and the frictional force to obtain a convergence state of the second lattice points; and adding a new lattice point between an adjacent lattice point pair of the second lattice points according to a distance between the adjacent lattice point pair while the numerical analysis of the equation of motion is performed.

BRIEF DESCRIPTION OF THE SEVERAL VIEWS OF THE DRAWINGS

FIG. 1 is a block diagram of an image matching apparatus executing an image matching method according to a first embodiment of the present invention.

FIG. 2 is a diagram for explaining dynamics concerning an image matching problem.

FIG. 12 is a diagram showing a mapping obtained by a simplified lattice point addition.

FIG. 13 is a block diagram of an image matching apparatus executing an image matching method according to a second embodiment.

FIG. 14 is a flow chart of the image matching method of the second embodiment.

FIG. 15 is a diagram showing an occlusion region.

FIG. 16 is a diagram for explaining a state solved by occlusion matching.

FIG. 17 is a diagram for explaining occlusion reliability.

FIG. 18 is a diagram representing a sigmoid function.

FIG. 19 is a diagram representing a sigmoid function.

DETAILED DESCRIPTION OF THE INVENTION

First Embodiment

There will be described the present embodiment according to a block diagram of FIG. 1.

According to FIG. 1, an image matching unit 11 comprising a processor including a memory and so on comprises a model creation module 12 and a numerical analysis module 13. When a source image and a reference image are input to the image matching unit 11, the same parts of the object and reference images stored in a frame memory, for example, the same parts of 3D image are matched. In other words, when two images of the object and reference images are input, a dynamic model is created using dynamic concept. Because this dynamic model is output from the model creation module 12 in form of an ordinary differential equation, the numerical analysis module 13 solves the output repeatedly by a general numerical solution. The image of the result provided in the last of repeated computation becomes a final state of matching. In the present embodiment, a lattice point addition module 14 comprising, for example, a processor is provided. The analysis of the dynamic model is performed repeatedly while adding a lattice point sequentially repeatedly as discussed below.

Explaining the above referring to FIG. 2, a lattice space having, for example, nine lattice points is provided temporarily on each of the source image and reference image. In this case, the lattice points correspond to the image parts (pixels) of the source image and reference image. The lattice spaces of the source image and reference image have the same size, and the corresponding points are set beforehand. For example, the middle point of the lattice space of the source image corresponds to the middle point of the lattice space of the reference image. Matching of the object image with the reference image is done in a state that corresponding points are decided. An equation of motion is made in this matching. The equation of motion makes the movements of the lattice points uniquely correspond to each other between the object and reference images with respect to a certain time. It is possible to make a model transforming the lattice of the image in a suitable form by solving the equation of motion during a certain time. Assuming that there is an image wherein the object moves, the lattice space deformed by movement of the lattice point as shown in FIG. 2 is generated. When the computation is stopped at a certain time T after elapse of a time $\tau$, a converged deformation lattice space is generated. This is a basic dynamic model.

Figure 3:
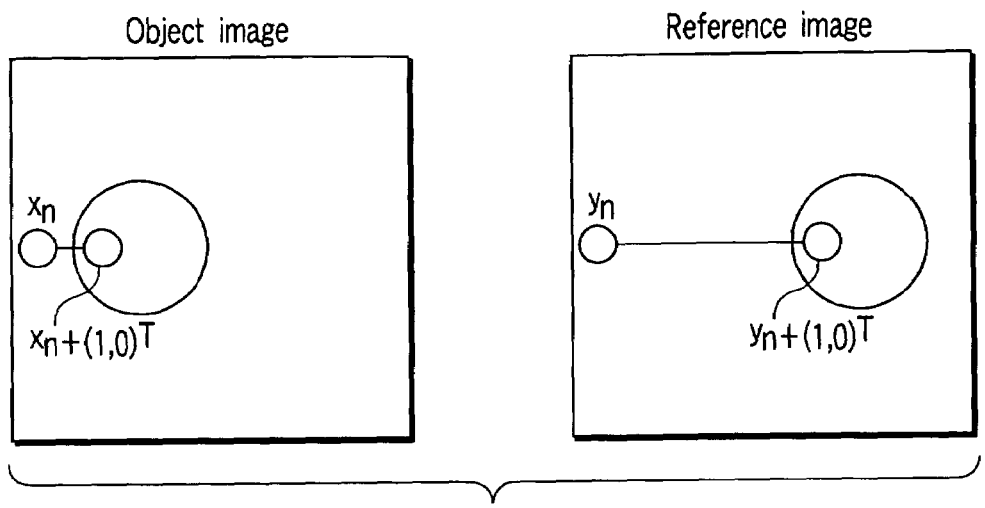
FIG. 3 is a diagram showing an adjacent lattice relation of the other object.
Figure 4:
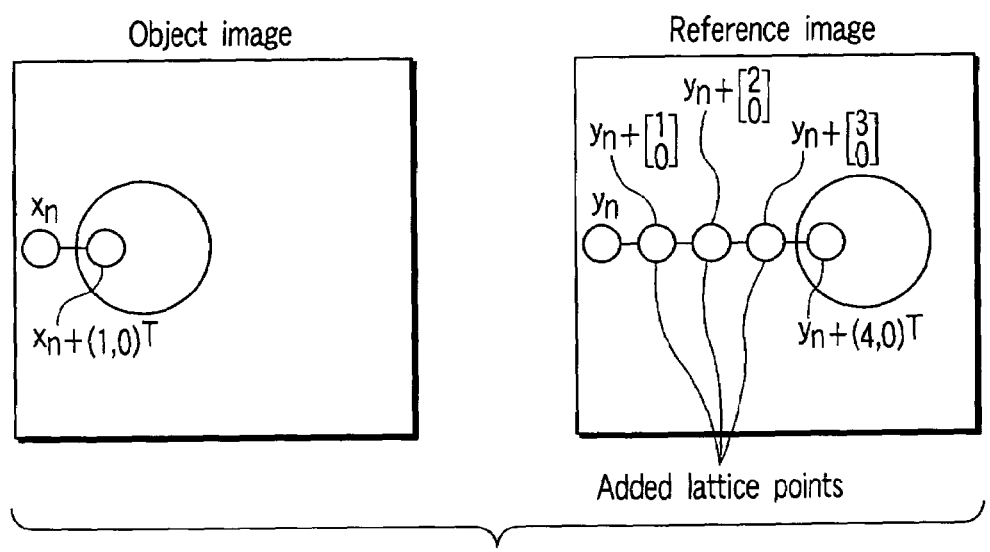
FIG. 4 is a conceptual diagram for explaining addition of lattice points.

A lattice point addition will be explained. In FIG. 3, an object is adjacent to a lattice point Xn in the object image, but in reference image, the object separates from a lattice point Yn. In other words, in the reference image, since a distance between the lattice point Yn+(1,0) on the object and the lattice point Yn increases, a spring between two lattice points expands. In this case, the object moves, so that a space appears in a region on the reference image which corresponds to a region of the object on the source image. A lattice point is added to this space as shown in FIG. 4. In this case, a lattice point is added, whenever the distance between the lattice points exceeds 2.

The image matching and lattice point addition are explained in detail hereinafter. In a fundamental image matching, the following model is thought as a source image. A continuous image model is expressed as shown in equation 1.

$$s_c(x, t), \begin{bmatrix} x \\ t \end{bmatrix} \in R^3 \qquad 1$$

Figure 5:
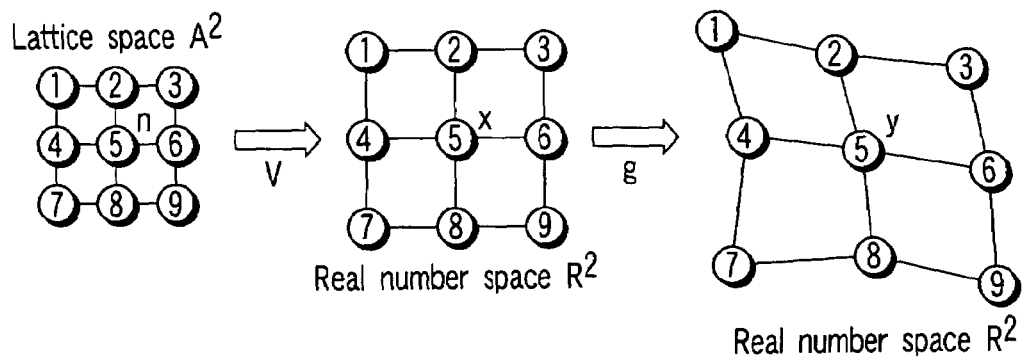
FIG. 5 is a diagram showing a connection between spaces.

This is a continuous image model of a real number basis. Because a digital image is regarded as a source image, the following sampling image model obtained by sampling the above model is used. This sampling image model is expressed by the following equation 2.

$$s_p(x, t), \begin{bmatrix} x \\ t \end{bmatrix} = \begin{bmatrix} V & 0 \\ 0 & \Delta t \end{bmatrix} \begin{bmatrix} n \\ k \end{bmatrix} \in \Lambda^3 \qquad 2$$

where V is a sampling matrix, coupling the lattice space $n \in \Lambda^2$ and real number space $x \in R^2$ as shown in FIG. 5. In this time, the image matching matter is formulated as a matter searching for a motion vector d:$R^3 \to R^2$ satisfying the following condition, that is, equation 3.

$$s_p(x,t) = s_c(x+d(x,t;l\Delta t), t+l\Delta t) \quad 3$$

However, in the case of this formulation, the image value of the same object is assumed not to vary according to a time. Because the motion vector d is a real number, it should be noted that the right-hand side uses a designator of a continuous image model (equation 1). Because matching between two images, i.e., the source image and reference image is conceived, the following equivalent equation 4 is established.

$$s_{k_1,p}(x) = s_{k_2,c}(x+d(x)) \quad 4$$

$k_1, k_2 \in \Lambda$ are variables representing the source image and the reference image, respectively, and these times are $t_1 = k_1 \Delta t$, $t_2 = k_2 \Delta t$.

The motion vector is simplified to be $d: R^2 \to R^2$. As the motion vector d has only to be decided just one with respect to the point x, the motion vector d is assumed to be a one-to-one mapping. Since x+d(x) can be considered to be a mapping with respect to x, g(x)=x+d(x) is defined. g indicates an unique mapping of $g: R^2 \to R^2$. The above matching problem results in a problem searching for a mapping g satisfying the following equation 5.

$$s_{k_1,p}(x) = s_{k_2,c}(g(x)) \quad 5$$

The point decided by the mapping g is defined as y=g(x). $y \in R2$ is defined. Because x=Vn, the lattice point x corresponds to a point n on the lattice space uniquely. Because the mapping g is a unique mapping, y is unique with respect to the lattice point x, too. Accordingly, the lattice point y corresponds to n uniquely. This is shown in FIG. 5. In other words, the space to be processed is a deformed lattice space corresponding one-to-one therewith by the point n on the lattice space.

As described above, because y=g(x)=g(Vn), this is redefined to yn=g(x) to make one-to-one correspondence understandable. The equation 5 of the image matching problem results in a problem searching for ynopt satisfying the following equation 6.

$$s_{k_1,p}(x) = s_{k_2,c}(y_n) \quad 6$$

Dynamics is introduced to the point yn to solve the equation 6 of the image matching problem. In other words, the image matching problem results in a problem solving a dynamical system concerning the point yn. The point yn moves in a state satisfying the equation 6 as considering a relation with surrounding points to converge in an equilibrium state. It is assumed that the image matching is completed by the equilibrium state. This state is expressed as shown in FIG. 2.

A new time axis $\tau \in R$ is introduced to the point y, and the function yn (T) is defined. Assuming that an initial value is same as a rectangular lattice x as the following equation 7.

$$y_n(0) = x \quad 7$$

When the dynamics converge in $\tau \to \infty$, $$\lim_{\tau \to \infty} y_n(\tau) = y_{nopt}$$

is defined. Because a new time axis is introduced, the derivation concerning a time can be defined by the following equation 8.

$$\frac{d}{d\tau} y_n(T) = \dot{y}_n(T), \frac{d}{d\tau^2} y_n(T) = \ddot{y}_n(T) \quad 8$$

The ordinal dynamics is described by the following ordinary differential equation 9.

$$\ddot{y}_n(T) = F, y_n(0) = x, \dot{y}_n(0) = 0 \quad 9$$

$F \in R^2$ is a sum total of forces. This is referred to as a equation of motion.

A force applied to the point yn($\tau$) is conceived. At first a force due to a potential energy becoming a force making the dynamics drive is considered. This is a force for moving the point yn($\tau$) to a state satisfying the equation 6. The equation 5 is transformed to the following equation 10.

$$s_{k_2,c}(y_n) - s_{k_1,p}(x) = 0 \quad 10$$

It is difficult due to noise components included in the image to search for the point which satisfies the equation 10 closely. Consequently, the energy function as expressed by the following equation 11 is conceived.

$$E_u(n) = (s_{k_2,c}(y_n(T)) - s_{k_1,p}(x))^2 \quad 11$$

The point which this energy function Eu becomes smallest is searched for. If the principle of steepest descent method is used, the point can arrives at the local minimum by coming down in a direction of the steepest descent of the energy function Eu around the point yn(T). Accordingly, the gradient in the direction of this steepest descent is defined as a force to the point yn($\tau$). Since the energy function Eu is conceivable as correlation between images, this force is assumed to be a force Fu due to an image correlation potential energy.

Figure 6A:
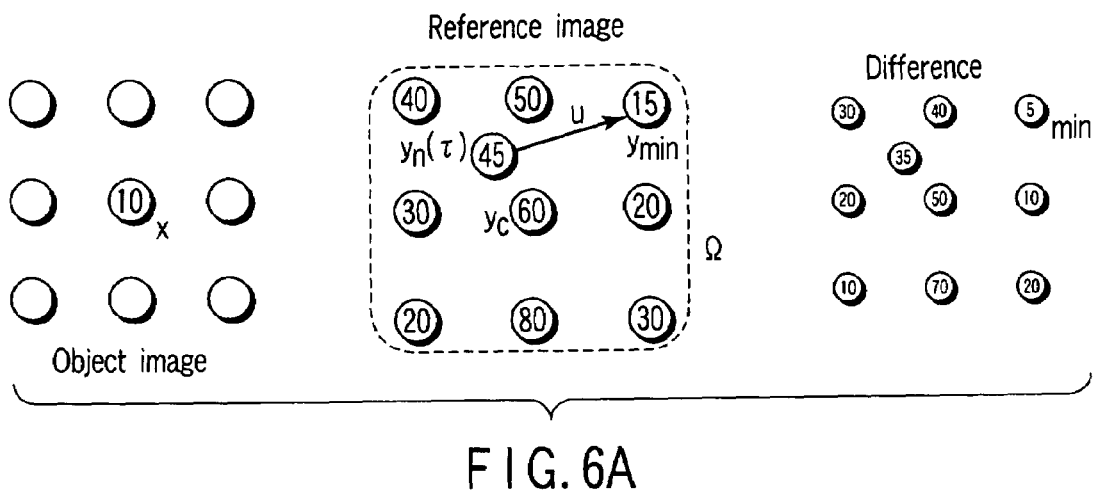
FIGS. 6A and 6B are diagrams representing a force due to an image correlation potential energy.
Figure 6B:
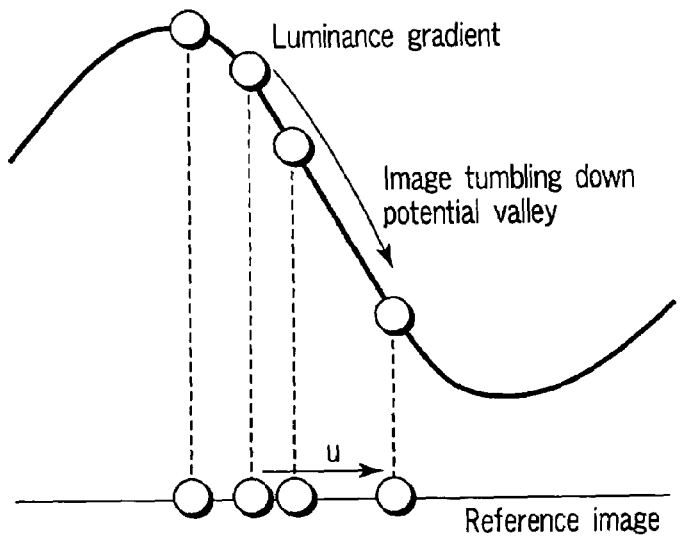

Although various methods of computing a gradient in a direction of the steepest descent are conceivable, the following method is adopted in the present embodiment. A differential value between the source image and the reference image is shown in FIG. 6A, and the gradient in the steepest descent direction is obtained directly by local optimization as shown in FIG. 6B. The image model Sc is continuous image model, but actually, only the sampled image model Sp can be used. Consequently, the local optimization is done based on the sampled image model. Because the sampling point most near the point yn($\tau$) should be a local space center yc as shown in FIG. 6A, it is obtained by the following equation 12.

$$y_c = \left\lfloor y_n(T) + \begin{bmatrix} 0.5 \\ 0.5 \end{bmatrix} \right\rfloor \quad 12$$

$\lfloor \cdot \rfloor$ indicates an operator to be converted to an integer (omission of fractions). When the adjacency space is defined by an equation 13, a local search space $\Omega$ can be defined by the following equation 14.

$$N_s = \left\{ \begin{bmatrix} -1 \\ -1 \end{bmatrix}, \begin{bmatrix} 0 \\ -1 \end{bmatrix}, \begin{bmatrix} 1 \\ -1 \end{bmatrix}, \begin{bmatrix} -1 \\ 0 \end{bmatrix}, \begin{bmatrix} 0 \\ 0 \end{bmatrix}, \begin{bmatrix} 1 \\ 0 \end{bmatrix}, \begin{bmatrix} -1 \\ 1 \end{bmatrix}, \begin{bmatrix} 0 \\ 1 \end{bmatrix}, \begin{bmatrix} 1 \\ 1 \end{bmatrix} \right\} \quad 13$$

$$\Omega = \{y_n(T), y_c + 1 | 1 \in N_s\} \quad 14$$

If a vector in the steepest descent direction is obtained by local optimization, normalized, and muliplied by a magnitude of gradient, the following equation 15 is provided. This equation shows a force due to an image correlation potential energy (square error energy).

$$F_u(x, y_n(T)) = \frac{(s_{k_2,c}(y_{\min}) - s_{k_2,c}(y_n(T)))^2}{\|u_d\|} u_d \qquad 15$$

$$u_d = y_{\min} - y_n(T)$$

$$y_{\min} = \underset{y \in \Omega}{\arg\min}(s_{k_2,p}(y) - s_{k_1,p}(x))^2$$

It is possible to use a force due to the image correlation potential energy (absolute value difference error energy) of the following equation 17 wherein the energy function is defined by the following equation 16 in view of easy handling in mounting.

$$E_u(n) = |s_{k_2,c}(y_n(T)) - s_{k_1,p}(x)| \qquad 16$$

$$F_u(x, y_n(T)) = \frac{|s_{k_2,c}(y_{\min}) - s_{k_2,c}(y_n(T))|}{\|u_d\|} u_d \qquad 17$$

$$u_d = y_{\min} - y_n(T)$$

$$y_{\min} = \underset{y \in \Omega}{\arg\min} |s_{k_2,p}(y) - s_{k_1,p}(x)|$$

Figure 7:
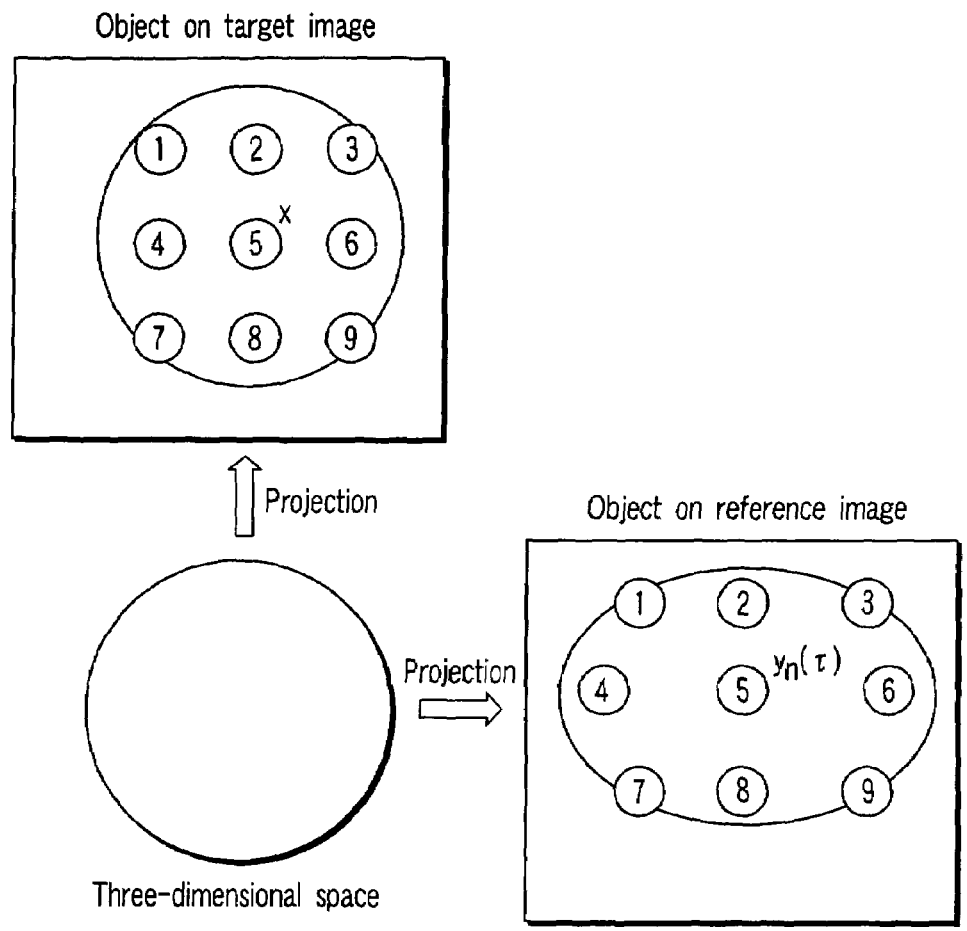
FIG. 7 is a diagram showing a state which phases of an object on a source image and an object of on a reference image are maintained.

Subsequently, a force describing a relation of the point with the peripheral points is conceived. The image to be subjected to matching is assumed to be an image obtained by reflecting a three-dimensional space to a two-dimensional plane. When an object on the three-dimensional space is assumed to be a rigid body, the surface of the rigid body is observed as an object on the two-dimensional image. If the object on three-dimensional space is observed on the source image and reference image, in this time, the phase of the object observed on each image is maintained at a high probability. As shown in FIG. 7, the positional relation of the point x on the object of the source image should be maintained on the point $y_n(\tau)$ on the reference image object, too. This behavior can be simulated by connecting between the point $y_n(\tau)$ and adjacent points by a spring. The relation between the object and the periphery is described by the force Fk of the spring. At first a lattice point space Nn surround the object point is defined as follows. In the case of four points surrounding the object point, the following equation 18 is established.

$$N_n = \left\{ \begin{bmatrix} 0 \\ -1 \end{bmatrix}, \begin{bmatrix} -1 \\ 0 \end{bmatrix}, \begin{bmatrix} 1 \\ 0 \end{bmatrix}, \begin{bmatrix} 0 \\ 1 \end{bmatrix} \right\} \qquad 18$$

If a spring constant (elasticity constant) is supposed to be k, the resilience of the spring applied to the point $y_n(\tau)$ is a spring force expressed by an equation 19. The elasticity constant is a balancer between an image correlation energy and an elasticity energy. If the elastic constant has a large value, the lattice space is hard to be deformed, and thus a result is stable. However, the adequateness to the image becomes bad. If the elastic constant has a small value, the lattice space is easy to be deformed, and thus adequateness to the image is improved. However, consequence becomes too flexible. Consequently, this parameter is given from experience for the present. Because the behavior is not sensitive to the value of this parameter, a certain constant value is given fixedly basically.

$$F_k(y_n(T), \{y_{n+1}(T) \mid \forall 1, 1 \in N_n\}) = \sum_{1 \in N_n} k(y_{n+1}(T) - y_n(T)) \qquad 19$$

When four points surrounding the lattice point are connected, a four-point connection spring model as expressed by the following equation 20 is obtained.

$$F_k(y_n(T), \{y_{n+1}(T) \mid \forall 1, 1 \in N_n\}) = k \left( y_{n+\begin{bmatrix}0\\-1\end{bmatrix}}(T) - y_n(T) \right) + \qquad 20$$

$$k \left( y_{n+\begin{bmatrix}-1\\0\end{bmatrix}}(T) - y_n(T) \right) +$$

$$k \left( y_{n+\begin{bmatrix}1\\0\end{bmatrix}}(T) - y_n(T) \right) +$$

$$k \left( y_{n+\begin{bmatrix}0\\1\end{bmatrix}}(T) - y_n(T) \right)$$

At last, a force making a stored energy dissipate is conceived.

Energy is saved if a force applied to the point yn ($\tau$) is only Fu, Fk, so that a system becomes an oscillating stationary state. Consequently, a force making the saved energy dissipate is introduced. This force can use a frictional force. When a speed can be near to a constant value, the frictional force can be expressed by the following equation 21.

$$F_\mu(\dot{y}_n(T)) = -\mu \dot{y}_n(T) \qquad 21$$

If the above forces are collected, the equation of motion is expressed by the following equation 22.

Equation of Motion $$\ddot{y}_n(\tau) = F_u(x, y_n(T)) + F_k(y_n(T), \{y_{n+1}(T) \mid \forall I, I \in N_n\}) + F_\mu(\dot{y}_n(T)), y_n(0) = x, \dot{y}_n(0) = 0 \qquad 22$$

Because the force Fu due to the image correlation potential energy is not solved for in analysis, the ordinary differential equation 22 is not solved for in analysis. Accordingly, it is difficult to take the limit in$\tau \to \infty$ of a system. Consequently, a convergence state of the system is estimated by computing an interval of t=(0,T) by a numerical analysis, in view of a sufficiently longer time T required for convergence of the system.

The ordinary differential equation provides a solution uniquely by a numerical analysis if an initial value is determined. Generally, this is called an initial value problem of the ordinary differential equation. There are many numerical solutions for solving this problem, for example, a Euler method, a Runge Kutta method, a Bulirsch-Soer method, a predictor-corrector method, an implicit Runge Kutta method. The Runge Kutta method is most famous and has a high use frequent. However, the equation 22 is hard to fit a complicated numerical solution because it has a dimension for an image size. Consequently, the Euler method that implementation is the simplest is adopted in this embodiment. Because the Euler method is a numerical solution for the ordinary differential equation of first-order, at first the formula 22 is converted into a one-time ordinary differential equation. Then, the variable is transformed as expressed by the following equation 23.

$$\begin{cases} \psi_{1,n}(T) = y_n(T) \\ \psi_{2,n}(T) = \dot{y}_n(T) \end{cases} \quad 23$$

This transformation of variable is substituted for the equation 22 to make the following equation 24.

Converted Equation Of Motion $$\begin{cases} \dot{\psi}_{1,n}(T) = \psi_{2,n}(T) \\ \dot{\psi}_{2,n}(T) = F_u(Vn, (\psi_{1,n}(T)) + F_k(\psi_{1,n}(T), \\ \{\psi_{1,n+1}(T) \mid \forall\, 1,\, 1 \in N_n\}) + F_\mu(\psi_{2,n}(T)), \begin{bmatrix} \psi_{1,n}(0) \\ \psi_{2,n}(0) \end{bmatrix} = \begin{bmatrix} Vn \\ 0 \end{bmatrix} \end{cases} \quad 24$$

where $\psi_{1,n}(T), \psi_{2,n}(T)$ correspond to the position and velocity of yn(T), respectively.

The scheme of the Euler method for the ordinary differential equation 25 is expressed by the following equation 26.

$$\dot{x}(t) = F(x(t), t) \quad 25$$

$$x^{(n+1)} = x^{(n)} + hF(x^{(n)}, t) \quad 26$$

This makes a solution progress from t(n) to $t^{(n+1)} \equiv t^{(n)} + h$, where x(n) indicates an n-th step and h indicates a step size. When the scheme of Euler method is applied to the equation 24, there is provided an updating equation due to Euler method of the following equation 27.

$$\begin{cases} \psi_{1,n}^{(n+1)} = \psi_{1,n}^{(n)} + h\psi_{2,n}^{(n)} \\ \psi_{2,n}^{(n+1)} = \psi_{2,n}^{(n)} + h\,[F_u(Vn, \psi_{1,n}^{(n)}) + \\ F_k(\psi_{1,n}^{(n)}, \{\psi_{1,n}^{(n)} / \{ \mid \forall\, 1,\, 1 \in N_n\}) + F_\mu(\psi_{2,n}^{(n)})],\, \begin{bmatrix} \psi_{1,n}^{(0)} \\ \psi_{2,n}^{(0)} \end{bmatrix} = \begin{bmatrix} Vn \\ 0 \end{bmatrix} \end{cases} \quad 27$$

The above image matching is collected as algorithm as follows.

Image Matching Algorithm
1. Initial value is set to $$\begin{bmatrix} \psi_{1,n}^{(0)} \\ \psi_{2,n}^{(0)} \end{bmatrix} = \begin{bmatrix} Vn \\ 0 \end{bmatrix}$$

2. A lattice point addition step (described below).
3. The value of time $T^{(n+1)}$ is computed by an updating equation $$\begin{cases} \psi_{1,n}^{(n+1)} = \psi_{1,n}^{(n)} + h\psi_{2,n}^{(n)} \\ \psi_{2,n}^{(n+1)} = \psi_{2,n}^{(n)} + h\,[F_u(Vn, \psi_{1,n}^{(n)}) + F_k(\psi_{1,n}^{(n)}, \{\psi_{1,n+1}^{(n)} \mid \forall\, 1,\, 1 \in N_n\}) + F_\mu(\psi_{2,n}^{(n)})] \end{cases}$$

in the time $\tau^{(n)}$.

4. $T^{(n+1)} = T^{(n)} + h$
5. If the relation is $T^{(n+1)} > T$, the process is ended, otherwise the lattice point addition step of the above item 2 is done.

Accordingly, the solution $y_{nopt}$ of the equation 6 of the image matching is obtained by $y_{nopt} = \psi_{1,n}^{(T)}$.

The lattice point addition step is explained hereinafter. This is the above process 2 of the image matching algorithm.

If there are adjacent deformation lattice points $y_n(T)$ and $$y_{n+\begin{bmatrix}1\\0\end{bmatrix}}(T),$$

to open between both points greatly is to generate a large spring energy therebetween and occurs a large force. If $y_n(T)$ and $$y_{n+\begin{bmatrix}1\\0\end{bmatrix}}(T)$$

belong to different objects respectively, nothing should exist between $y_n(T)$ and $$y_{n+\begin{bmatrix}1\\0\end{bmatrix}}(T)$$

originally. This conflicts with that large spring energy is accumulated between $y_n(T)$ and $$y_{n+\begin{bmatrix}1\\0\end{bmatrix}}(T).$$

This is shown in FIG. 3. A large space broaden between $y_n(T)$ and $$y_{n+\begin{bmatrix}1\\0\end{bmatrix}}(T),$$

so that it is not correct to connect with a spring between $y_n(T)$ and $$y_{n+\begin{bmatrix}1\\0\end{bmatrix}}(T).$$

It is preferable for solving this contradiction to add a new lattice point between the lattice points $y_n(T)$ and $$y_{n+\begin{bmatrix}1\\0\end{bmatrix}}(T)$$

as shown in FIG. 4, for example. As a result, it is expected that a spring is provided between the adjacent lattice points $y_{n+(3,0)^T}$ and $y_{n+(4,0)^T}$ on an object boundary, so that no large spring energy occurs.

Figure 8:
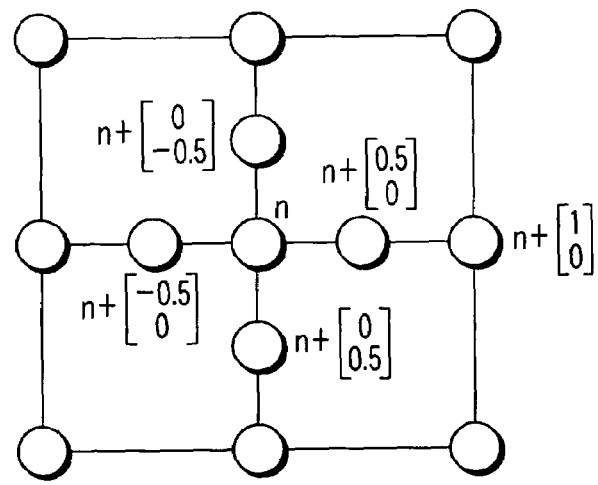
FIG. 8 is a diagram showing a heterogeneous lattice point space.
Figure 9:
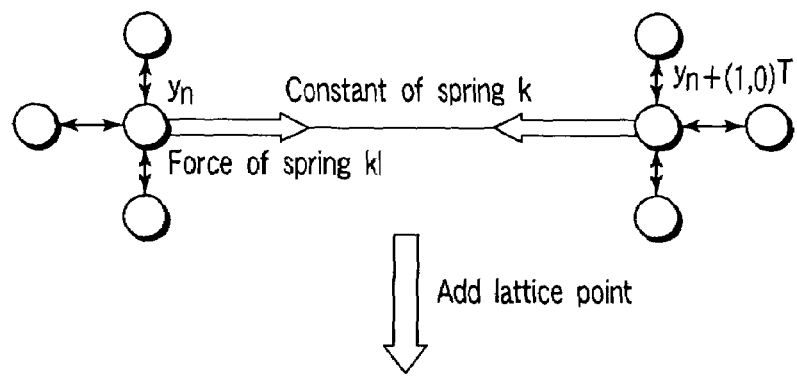
FIG. 9 is a diagram for explaining addition of lattice points.
Figure 9:
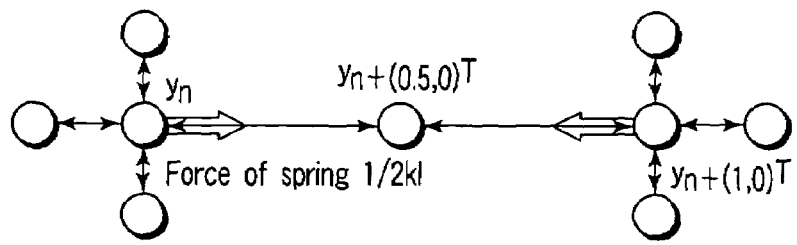

A heterogeneous lattice point space shown in FIG. 8 is introduced for the purpose of formulating concept to add a lattice point. If the heterogeneous lattice point space is used, the lattice point addition can be expressed by conformation as shown in FIG. 9. The spring force applied between the lattice points is decreased to ½ by adding one lattice point as shown in FIG. 9. Therefore, if a lattice point is added between the lattice points when a distance between the lattice points exceeds 2, the spring force becomes equivalent to that when the spring does not expand. Therefore, the lattice point addition algorithm is as follows:

1. When N is assumed to be a neighbor lattice space, $I_a$ satisfying $\|y_{n+1\in N}(T)-y_n(T)\|>2.0$ is searched for.
2. Lattice points $$x = V\left(n + \frac{1}{2}I_a\right) \text{ and}$$

$$y_{n+\frac{1}{2}I_a}(T) = \frac{1}{2}(y_{n+I_a}(T) + y_n(T))$$

are added.

The processing returns to the image matching step after having added the lattice point.

Figure 10:
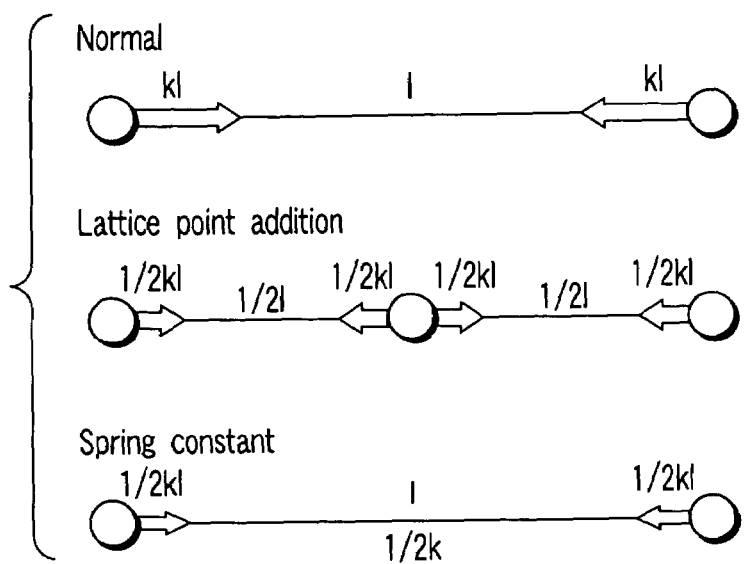
FIG. 10 is a diagram for explaining analysis of a lattice point addition model.

When adding the lattice point as described above, it is to introduce the heterogeneous lattice point space, whereby computation becomes complicated. Consequently, the lattice point addition model was analyzed. As a result, it is found that the lattice points connected to each other by the spring I of a spring constant k are subjected to a force of kI in the normal spring model as shown in FIG. 10. When a lattice point is added between the lattice points, the spring decreases to I/2 in length, resulting in that the spring force applied to each of the lattice points is decreased to kI/2. This corresponds to the spring I of a spring constant k/2. In other words, it is equivalent to set the spring constant to ½ to add one lattice point between the springs. However, because the potential of the added lattice point is not considered, the spring is only equivalent with respect to a spring model consistently, but not equivalent with respect to the whole dynamic matching model including the potential.

The above explanation describes balance between the forces of the springs in the equilibrium state thereof and does not describe on the dynamic behavior of the spring. In other words, it simply describes that the spring forces are equivalent in static.

It is equivalent to making a spring constant $1/(n+1)$ times to add n lattice points to the spring. It is the lattice point addition algorithm to add one lattice point if the length of the spring doubles, two lattice points if it is three times, three lattice points if it is four times, . . . .

This can be simplified by setting the spring constant to ½ if the length of the spring doubles, setting the spring constant to ⅓ if it is three times, setting the spring constant to ¼ if it is four times, . . . . A spring model of such a variable type can be expressed as follows.

A spring model of a simplified model lattice point addition $$F_k(y_n(T), \{y_{n+I}(T) \mid \forall I, I \in N_n\}) = \sum_{I \in N_n} k \frac{1}{\lfloor\|y_{n+1}(T) - y_n(T)\|\rfloor}(y_{n+I}(T) - y_n(T)) \quad 28$$

where $\lfloor \cdot \rfloor$ is an operator to be converted to an integer.
The following spring model can be used elsewhere.
A linear function spring model varying in linear.

$$F_k(y_n(T), \{y_{n+I}(T) \mid \forall I, I \in N_n\}) = \sum_{I \in N_n} k \frac{1}{\|y_{n+1}(T) - y_n(T)\|}(y_{n+I}(T) - y_n(T)) \quad 29$$

A logistic function spring model $$F_k(y_n(T), \{y_{n+I}(T) \mid \forall I, I \in N_n\}) = \sum_{I \in N_n} k\sigma(\|y_{n+I}(T) - y_n(T)\|)(y_{n+I}(T) - y_n(T)) \quad 30$$

$$\sigma(r) = \frac{1}{1 + \exp(\alpha(r - \beta))}$$

where $\alpha>0$, $\beta>0$ are constants.

In other words, the simplified lattice point addition algorithm uses a spring model of the equation 28. More specifically, the spring model of the equation 28 may be employed in the image matching algorithm.

Figure 11:
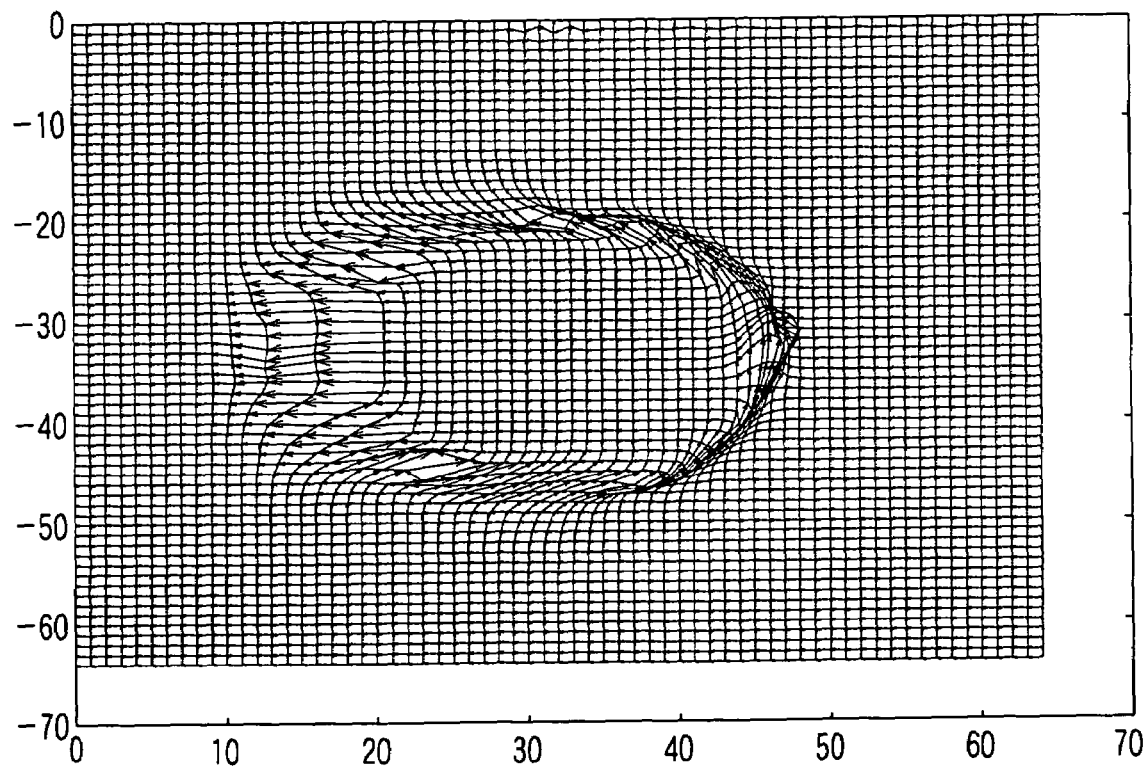
FIG. 11 is a diagram of a mapping when a lattice point is not added.

An effect was confirmed by a test pattern which a round object moves in parallel. As a result, when the lattice point addition is not done, a result shown in FIG. 11 is provided. According to this, it is found that a distortion occurs on a backward boundary of the object. In contrast, a result obtained by carrying out the simplified model lattice point addition is shown in FIG. 12. According to this, it is found that no distortion occurs on a backward boundary of an object.

As described above, the present embodiment can provide a highly precise image matching method that can express discontinuity of movement by an algorithm adding a lattice point.

Second Embodiment (Single Direction Occlusion Model)

The present embodiment is explained according to the block diagram of FIG. 13 and the flow chart FIG. 14. The present embodiment considers a problem how an interpolation is done for the purpose of making an occlusion region correspond to a motion image well, and is directed to generating an interpolation frame containing an occlusion area between frames of an image based on an image signal of a motion image.

When an interpolation frame is generated, there is an occlusion problem making it difficult to generate an interpolation frame of high quality. The present embodiment provides a method for generating an interpolation frame of high quality by interpolating an occlusion region adequately.

Schematically, this method performs an ordinal image matching (surface matching) in a time interval t1-t2, and an occlusion matching in a time interval t2-t3. A reliability of an occlusion region is obtained from a result of the ordinal matching in the time interval t1-t2 based on a certain standard. The interpolation frame is generated from this reliability, result of the image matching and result of occlusion matching. The present embodiment is explained in detail hereinafter.

An image signal of a motion picture is assumed to be divided into a plurality of frames, and subjected to processing. In this time, each frame is stored in a frame memory 21 for each division, and some frames can be accessed at the same time. A frame in a time t is referred to as a reference frame t, a frame in a time t+1Δt is referred to as a reference frame t+1Δt, and a frame of time t+2lΔt is referred to as a reference frame t+2lΔt. An interpolation frame is interpolated between the reference frame t and reference frame t+1Δt.

An occlusion region must be detected adequately for the occlusion region to be interpolated adequately. The ground that can be detected by the present embodiment adequately are explained referring to FIG. 15. FIG. 15 shows an example in which a round object moves to the right from the left. On the reference frame t+1Δt, a uncovered occlusion uncovered occlusion region occurs at a position before the round object moves.

The lattice points on the rear part of the round object, that is, lattice points xn, xn+(1,0)T and yn, yn+(1,0)T are noted. Since the round object moves, if it is subjected to matching, an interval between the lattice points yn, yn+(1,0)T should expand greatly. In other words, a spring between the lattice points yn, yn+(1,0)T is expanded. When the uncovered occlusion region appears by movement of the object as described above, it is found that the spring always expands. In other words, the part that the spring expands greatly is an occlusion region. The superscript "T" expresses transposition.

FIG. 16 show one-dimensionally a movement of the round object shown in two-dashed line, that is, shows a state that the round object moves downward. The uncovered occlusion appears on the rear of the round object between the time t and the time t+1Δt. It is found that the spring expands then. When the round object just moves downward, it is found that a part corresponding to the uncovered occlusion region appears at the time t+2lΔt. In other words, if matching is performed between the reference frame t+1Δt and the reference frame t+2lΔt, a region corresponding to the occlusion region can be found. That is to say, when the object moves, the region hid by the moving object (hidden region or occlusion region) appears. In this time, when watching a state of the lattice point, the spring on the occlusion region expands. Therefore, it can be determined whether it is occlusion by the length of the expanding spring. This is referred to as occlusion matching.

In the above example, the distance between the lattice points is used as an evaluation value, and the occlusion is determined when the distance is greater than a reference value. The occlusion can be detected based on distribution of lattice points. Density of distribution of the lattice points decreases on the occlusion region because the spring expands thereon. Therefore, the density may be used as an evaluation value for determining occlusion. In this case, the density lower than the reference is detected as occlusion. For example, the reference frame t+2lΔt is divided into plural equal rectangular regions, and the lattice points in each region are counted. The number of lattice points is a quantity corresponding to the density of distribution of the lattice points.

Otherwise, the occlusion can be detected using an area of a region surrounded by the lattice points instead of the density. The area of the region surrounded by the lattice points increases on the occlusion region because the spring expands thereon and thus the distance between the lattice points increases. Therefore, the area can be used as an evaluation value for determining occlusion. In this case, the region having an area greater than the reference is detected as occlusion. For example, an area of a triangular region having the lattice points as apices and including no other lattice points, or an area of a rectangular region having the lattice points as apices and including no other lattice points is used.

It can be understood from the above that the occlusion region is detected and the region corresponding to the occlusion region is subjected to matching. Thereafter, these results may be combined for generating an interpolation frame. The present embodiment will be described referring to the block circuit of FIG. 13 and the flow chart of FIG. 14 concretely hereinafter.

In an image matching step S21, a matching image g(;t;lΔt) is acquired using the frame t as an source image and the frame t+1Δt as a reference image, with an image matching module 22. The image matching step S21 performs the same processing as the first embodiment.

In an image matching step S22, the image matching for finding the occlusion region is done using the frame t+1Δt as an source image and the reference frame t+2lΔt as a reference image, with an occlusion matching module 23. This processing is the same as the image matching step 11 of the first embodiment. Therefore, the same processing as the image matching of the first embodiment is done. Occlusion matching is done for acquiring an occlusion image g(;t+lΔt;lΔt).

A conventional image matching method can be used in the occlusion matching module. In other words, a conventional motion estimation method mentioned in Japanese patent No. 2927350, for example, a block matching algorithm, an optical flow estimating method, a gradient method, a bays method can be used.

The block matching algorithm is described as an example. The block matching algorithm is a method for assigning the same motion vector to the lattice points in the block with assumption that movements in a block are the same.

The whole screen is divided into plural (ordinarily, rectangular) blocks each including lattice points. In this example, a rectangular block is adopted.

A point on the upper left of the block is assumed to be a base point X∈Λ$^2$. Each block is assumed to be B(X). A motion vector to each block is obtained as follows.

$$\tilde{d}(X) = \arg\min_{d \in \Omega} \sum_{x \in B(X)} (s_p(x, t+l\Delta t) - s_p(x+d, t+2l\Delta t))^2 \qquad 31$$

where Ω∈Λ$^2$ is a searching space. Since a motion vector $\tilde{d}(X)$ is obtained for the block, this is assigned to each lattice point as expressed by the following equation 32.

$$d(x,t+l\Delta t;l\Delta t)=\tilde{d}(X), \forall x \in B(X) \qquad 32$$

Therefore, the mapping is obtained by the following equation 33.

$$g(x,t+l\Delta t;l\Delta t)=x+d(x,t+l\Delta t;l\Delta t)=x+\tilde{d}(X), \forall x \in B(X) \quad 33$$

The occlusion reliability computation step S23 carried out by the occlusion reliability computation module 24 is described hereinafter. The occlusion reliability is the probability distribution representing whether the pixels of the region are in the occlusion region. The probability that the region is an occlusion region increases as the occlusion reliability nears 1. When the occlusion region is detected by the length of the spring, the reliability in the region must be computed actually as described previously.

In the present embodiment, in view of a problem how an interpolation which makes the occlusion region correspond to the pixels of the motion image in units of pixel well is done, there is used, for example, a triangular area surrounded by the lattice points yn, yn+(0,−1),s□Ayn+(−1,−1),s as shown in FIG. 17. The area of this triangular region is obtained from an absolute value of outer product of a vector by the following equation 34. The superscript "T" expresses a transpose.

$$S_1(n) = \frac{1}{2} \left| (y_{n+(0,-1)^T} - y_n) \times (y_{n+(-1,-1)^T} - y_n) \right| \quad 34$$

Similarly, the area of the lower triangular region is computed by the following equation 35.

$$S_2(n) = \frac{1}{2} \left| (y_{n+(-1,-1)^T} - y_n) \times (y_{n+(-1,0)^T} - y_n) \right| \quad 35$$

Because the area of each of the triangular region xn, xn+(0,−1)T, xn+(−1,−1)T and the triangular region xn, xn+(−1,0)T, xn+(−1,−1)T is 1/2, if the ratio between the triangular regions is computed, the ratio between the areas of the triangular regions is expressed by the following equations 36 and 37. The superscript "T" expresses a transpose.

$$R_1(n) = |(y_{n+(0,-1)^T}-y_n) \times (y_{n+(-1,-1)^T}-y_n)| \quad 36$$

$$R_2(n) = |(y_{n+(-1,-1)^T}-y_n) \times (y_{n+(-1,0)^T}-y_n)| \quad 37$$

A probability distribution is acquired from these triangular ratios. If the length of the spring exceeds a certain constant value, it is assumed to be occlusion. In this case, if the triangular ratio exceeds a certain constant value, it is determined to be occlusion. A sigmoid function according to the following equation 38 as shown in FIG. 18 can be used as such a transform function.

$$\sigma(r) = \frac{1}{1+\exp(-\alpha(r-\beta))} \quad 38$$

where α indicates a constant representing inclination and β indicates coordinates of the center of the inclination.

The triangle in the lattice point n is assumed to be R1(n), R2(n). The following processing is done on all lattice points n, and an occlusion reliability map is generated according to the following equation 39.

$$P(y|g(\cdot,t;l\Delta t))=\sigma(R_1(n)), \forall y \in R_1(n)$$

$$P(y|g(\cdot,t;l\Delta t))=\sigma(R_2(n)), \forall y \in R_2(n) \quad 39$$

A motion compensation step is done by a motion compensation unit 25, and includes an interpolation frame generation step carried out by an interpolation frame generation module 26 and an image correlation reliability computation step S25 done by an image correlation reliability computation module 27. The image correlation reliability computation step is called in the interpolation frame generation step.

The interpolation frame generation step S24 will be described. The method similar to the Digital Image Warping is adopted.

In the Digital Image Warping, a motion vector is obtained for each point of a rectangle. The rectangle is divided into two triangles, and an affine transformation is computed on the basis of three vertexes for each triangle (as described in J. Nieweglowski, T. George Campbell, P. Haavisto, □gA Novel Video Coding Sheme Based on Temporal Prediction Using Digital Image Warping □h, IEEE Transactions on, Volume: 39 Issue: 3, August 1993, the entire contents of which are incorporated herein by reference). A triangular image to be interpolated by the affine transformation is obtained (as described in J. Nieweglowski, P. Haavisto, □gMotion Compensated Video Sequence Interpolation Using Digital Image Warping □h, IEEE Acoustics, Speech, and Signal Processing, vol. 5, p 205-208, 1994, the entire contents of which are incorporated herein by reference).

As shown in Motion Compensated Video Sequence Interpolation Using Digital Image Warping, the affine transformation from a triangle having vertexes $V=\{(u_i,v_i)^T,(i=0,1,2)\}$ to a triangle having vertexes $Y=\{(x_i,y_i)^T,(i=0,1,2)\}$ can be expressed by the following equation 40.

$$T(V,Y) = \frac{1}{\det(U)} B \begin{bmatrix} x_0 & y_0 & 1 \\ x_1 & y_1 & 1 \\ x_2 & y_2 & 1 \end{bmatrix} \quad 40$$

$$B = \begin{bmatrix} v_1-v_2 & v_2-v_0 & v_0-v_1 \\ u_2-u_1 & u_0-u_2 & u_1-u_0 \\ u_1v_2-u_2v_1 & u_2v_0-u_0v_2 & u_0v_1-u_1v_0 \end{bmatrix}$$

$$\det(U) = u_0(v_1-v_2)+v_0(u_2-u_1)+(u_1v_2-u_2v_1)$$

It can be computed using the affine transformation that a point $(u,v)^T$ in the triangle V corresponds to a point $(x,y)^T$ in a triangle expressed by [x,y,1]=[u,v,1] T(V,Y). The superscript "T" expresses a transpose.

Figure 20:
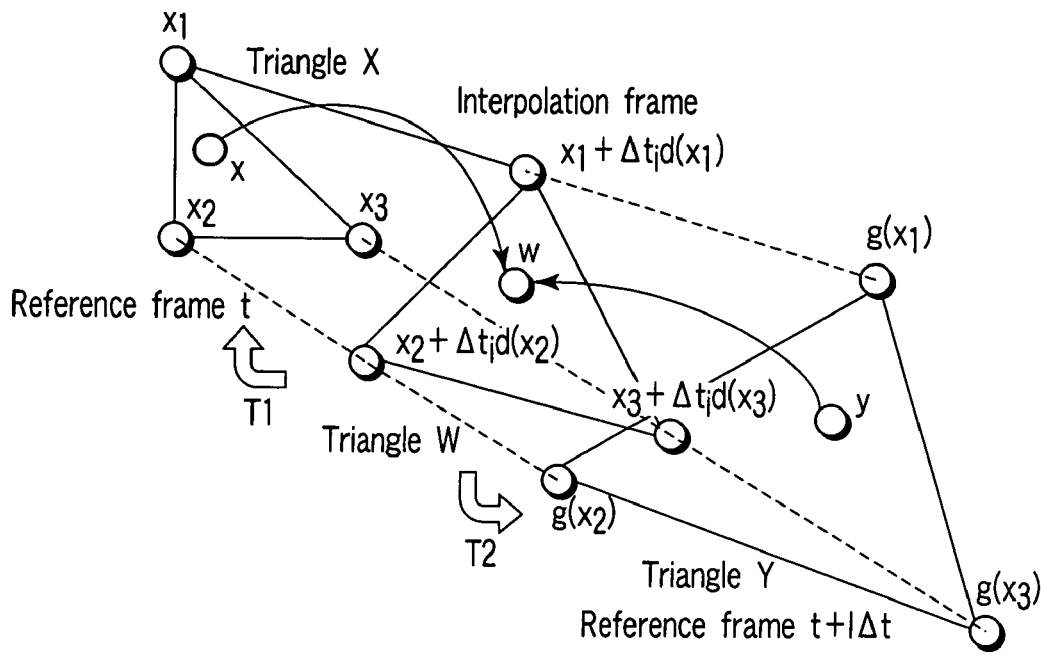
FIG. 20 is a diagram for explaining an interpolation method.

An interpolation frame is obtained by the affine transformation. A time position of the reference frame t is set to 0, and a time position of the reference frame t+l∆tk is set to 1. A time position of the interpolation frame is assumed to be∆t$_i$ (0≦∆t$_i$≦1) When a mapping g(;t;l∆t) is subjected to linear transformation according to ∆ti, it becomes an image represented by gi(x,t,l∆t)=x+∆tid (x,t,l∆t). The interpolation frame is generated as shown in FIG. 20.

A triangle having vertexes {g(x1.t; l∆t), g(x2.t;l∆t), {g(x3.t;l∆t)} is assumed to be W, and a triangle having vertexes {gi(x1.t;l∆t), gi(x2.t;l∆t), {gi(x3.t;l∆t)} is assumed to be Y. A pixel value of a point in the triangle W on the interpolation frame shown by the following equation 41 will be obtained.

$$w \in R^2 | w=Vn \in \Lambda^2 \quad 41$$

Affine transformation from the triangle W to the triangle X and affine transformation from the triangle W to the triangle are obtained by the equation 40, and a pixel value corresponding to the point w is obtained by the former and latter affine transformations. In other words, the point in the triangle which corresponds to the point w can be computed by the following equation 42:

$$[x^T 1] = [w^T 1] T(W,X) \quad \quad 42$$

Similarly, the point in the triangle which corresponds to the point w can be computed by the following equation 43.

$$[y^T 1] = [w^T 1] T(W,Y) \quad \quad 43$$

If a weight average of both frames is obtained according to the time position, a pixel value of the interpolation frame can be computed by the interpolation frame obtained by the following equation 44 and the mapping g(;t;lΔt).

$$s_p(w,t+l\Delta t_i) = \Delta t_i s_c(x,t) + (1-\Delta t_i) s_c(y,t+l\Delta t) \quad \quad 44$$

An interpolation frame based on the mapping g(;t;lΔt) is generated by doing this computation for all triangles in a screen. An occlusion reliability map on the interpolation frame is generated by the occlusion reliability map as follows. The occlusion reliability map on the interpolation frame according to the mapping g(;t;lΔt) is expressed by the following equation 45.

$$P_o(w,t+l\Delta t_i | g(\bullet,t;l\Delta t)) = P(y | g(\bullet,t;l\Delta t)) \quad \quad 45$$

Similarly, an image correlation reliability map due to the mapping g(;t;lΔt) is generated based on the equation 46 in the image correlation reliability computation step described below.

$$P(w,t+l\Delta t_i | g(\bullet,t;l\Delta t), s(\bullet,t), s(\bullet,t+l\Delta t)) = p(s_c(x,t), s_c(y,t+l\Delta t)) \quad \quad 46$$

Because the occlusion mapping g(;t+lΔt;lΔt) produced by occlusion matching is due to matching from the reference frame t+lΔt to the reference frame t+2lΔt, the occlusion mapping is subjected to linear transformation based on the following equation 47 to generate a matching image between the reference frame t+lΔt and the reference frame t.

$$g_o(x,t+l\Delta t; -l\Delta t) = x - d(x,t+l\Delta t;l\Delta t) \quad \quad 47$$

The frame is assumed to be −lΔt because a direction of the image is inversed. When the occlusion mapping g(;t+lΔt;lΔt) is subjected to linear transformation according to Δti, it becomes an image based on the following equation 48.

$$g_{i,o}(x,t+l\Delta t; -l\Delta t) = x - (1-\Delta t_i) d(x,t+l\Delta t;l\Delta t) \quad \quad 48$$

Figure 21:
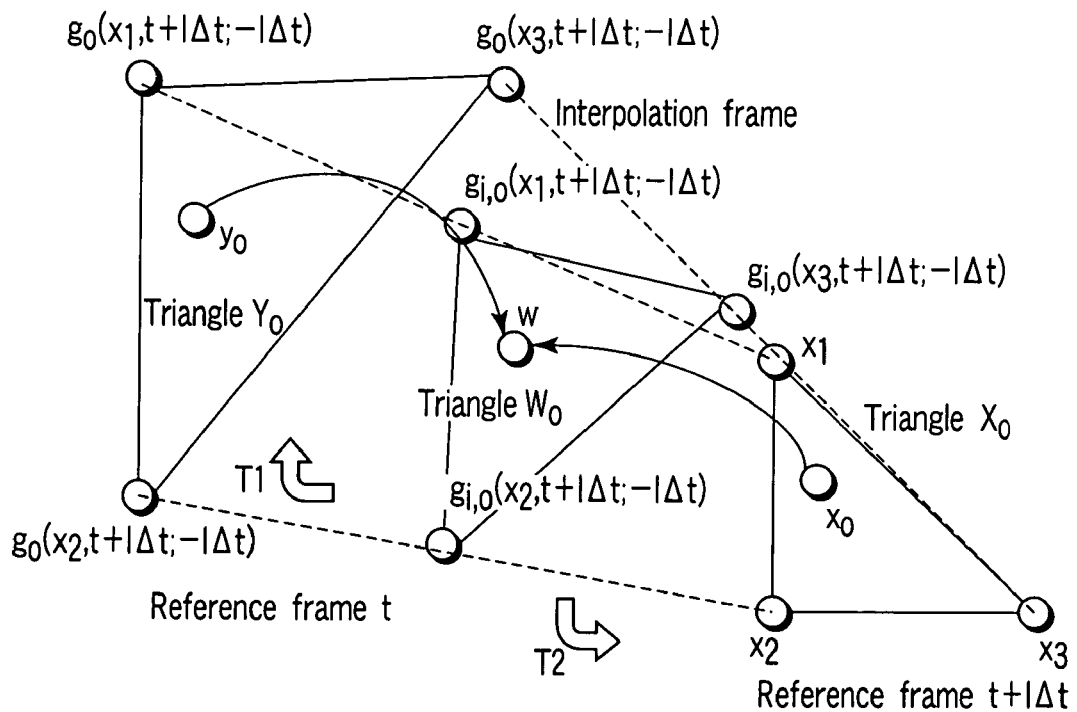
FIG. 21 is a diagram for explaining an occlusion matching interpolation method.

Correspondence between the points is shown in FIG. 21. Assuming that a triangle having vertexes {gi,o (x1.t+lΔ t; −lΔ t), gi,o (x2.t+lΔ t; −lΔ t), gi,o (x3.t+lΔ; −lΔ t)} is indicated by Wo, a triangle having vertexes {x1,x2,x3} is indicated by Xo, and a triangle having vertexes {go(x1.t+lΔ t; −lΔ t), go(x2.t+lΔ t; −lΔ t), go(x3.t+lΔ t; −lΔ t)} is indicated by Yo. A point in the triangle Xo corresponding to the point w is computed according to the following equation 49.

$$[x_o^T 1] = [w^T 1] T(W_o, X_o) \quad \quad 49$$

Similarly, a point in the triangle Yo corresponding to the point w is computed according to the following equation 50.

$$[y_o^T 1] = [w^T 1] T(W_o, Y_o) \quad \quad 50$$

If a weight average of both frames is computed according to a time position, a pixel value of an interpolation frame due to the occlusion mapping g(;t+lΔt;lΔt) can be computed by the following equation 51.

$$s_{o,p}(w,t+l\Delta t_i) = (1-\Delta t_i) s_c(y_o,t) + \Delta t_i s_c(x_o,t+l\Delta t) \quad \quad 51$$

If this processing is executed for all triangles in a screen, the interpolation frame due to the occlusion mapping g(;t+lΔt;lΔt) is generated. An image correlation reliability map due to the occlusion mapping g(;t+lΔt;lΔt) is generated based on the following equation 52 in the image correlation reliability computation step S25.

$$P(w,t+l\Delta t_i | g(\bullet,t+l\Delta t;l\Delta t), s(\bullet,t), s(\bullet,t+l\Delta t)) = p(s_c(y_o,t), s_c(x_o,t+l\Delta t)) \quad \quad 52$$

Because the interpolation frame due to the mapping g(;t; lΔt) and the interpolation frame due to the occlusion mapping g(;t+lΔt;lΔt) can be generated by the above processing, these are combined by a reliability map. The probability of reliability given by the image correlation and the probability of reliability given by the occlusion are independent from each other. Therefore, the probability that the occlusion matching is adopted is expressed by the following equation 52 according to the multiplication theorem of probability.

$$P_1 = P_o(w,t+l\Delta t_i | g(\bullet,t;l\Delta t)) P(w,t+l\Delta t_i | g(\bullet,t+l\Delta t;l\Delta t), s(\bullet,t), s(\bullet,t+l\Delta t)) \quad \quad 53$$

The probability that the ordinary matching is adopted is obtained by the following equation 54.

$$P_0 = \{1 - P_o(w,t+l\Delta t_i | g(\bullet,t;l\Delta t))\} P(w,t+l\Delta t_i | g(\bullet,t;l\Delta t), s(\bullet,t), s(\bullet,t+l\Delta t)) \quad \quad 54$$

The transparency to be used for combination is computed from these probabilities by the following equation 55.

$$\alpha_j = \frac{P_j}{P_0 + P_1}, (j=0,1) \quad \quad 55$$

The interpolation frame due to the mapping and the interpolation frame due to the occlusion mapping are combined using this transparency and based on the following equation 56.

$$s_{i,p}(w,t+l\Delta t_i) = \alpha_0 s_p(w,t+l\Delta t_i) + \alpha_1 s_{o,p}(w,t+l\Delta t_i) \quad \quad 56$$

The interpolation frame Si, p(w,t+lΔti) can be generated by doing the above-mentioned processing for the whole screen.

The image correlation reliability computation step S25 is described hereinafter. This is to obtain a reliability of a corresponding point due to the mapping relation of each point. The differential value between the pixel values at each point can be used as such a reliability. In other words, the image correlation reliability is computed according to the following equation 57.

$$p(s_1, s_2) = \frac{1}{1 + |s_1 - s_2|} \quad \quad 57$$

This is a model that the reliability increases with a decrease of the differential value of the image. However, correlation between the images and a differential value between the pixels have no linear correlation generally. In other words, if the differential value between the pixels is small, the correlation between the images may be high. However, if the differential value between the pixels exceeds a certain constant value, the correlation between the images descends irrespective of the differential value between the pixels. The sigmoid function as shown in FIG. 19 may be used for introducing such a non-linearity. This is assumed to be α<0 in the equation 38. If this is used, the image correlation reliability can be defined by the following equation 58.

$$p(s_1, s_2) = \sigma(|s_1 - s_2|)$$
$$\sigma(r) = \frac{1}{1 + \exp(\alpha(r - \beta))} \qquad 58$$

where α>0, β>0 are constants.

As described above, the present embodiment permits generation of the interpolation frame of high quality, which corresponds to a uncovered occlusion region.

Third Embodiment

(Bidirectional Occlusion Model)

Figure 22:
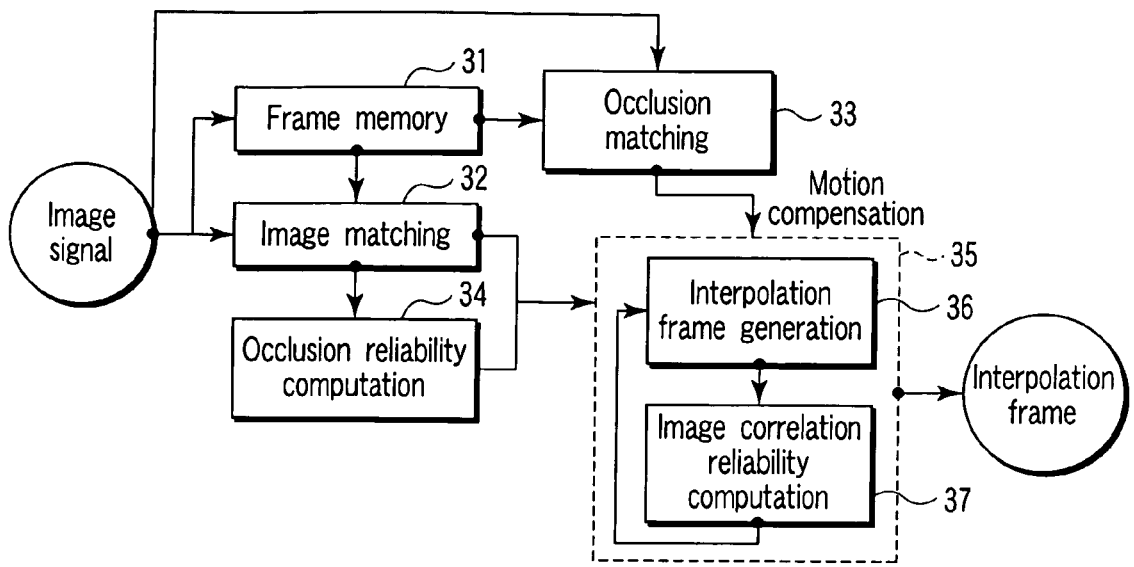
FIG. 22 is a block diagram of an image matching apparatus executing an image matching method according to a third embodiment.
Figure 23:
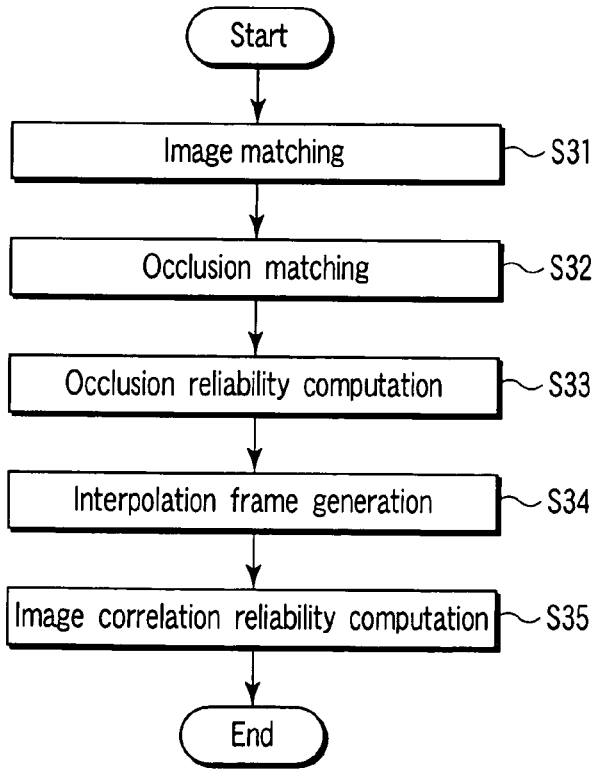
FIG. 23 is a flow chart showing the image matching method of the third embodiment.

The present embodiment is explained according to the block diagram of FIG. 22 and the flow chart of FIG. 23. The present embodiment is directed to generating an interpolation frame between the frames of an image signal of a motion image.

When the interpolation frame is generated, it is difficult owing to occlusion problem to generate an interpolation frame of high quality. The second embodiment provides a method dealing with uncovered occlusion. The present embodiment can deal with covered occlusion as well as uncovered occlusion, by matching in bi-direction of forward and backward with respect to a time axis.

The image signal of the motion image is divided into frames, and subjected to processing. In this time, each frame is stored in a frame memory 31, and some frames can be accessed at the same time. A frame in the time t is referred to as a reference frame t, a frame in the time t+1Δt is referred to as a reference frame t+1Δt, a frame in the time t+2lΔt is referred to as reference frame t+2lΔt, and a frame in the time t−lΔt to as a reference frame t−lΔt. An interpolation frame is interpolated between the reference frame t and the reference frame t+lΔt.

Figure 24:
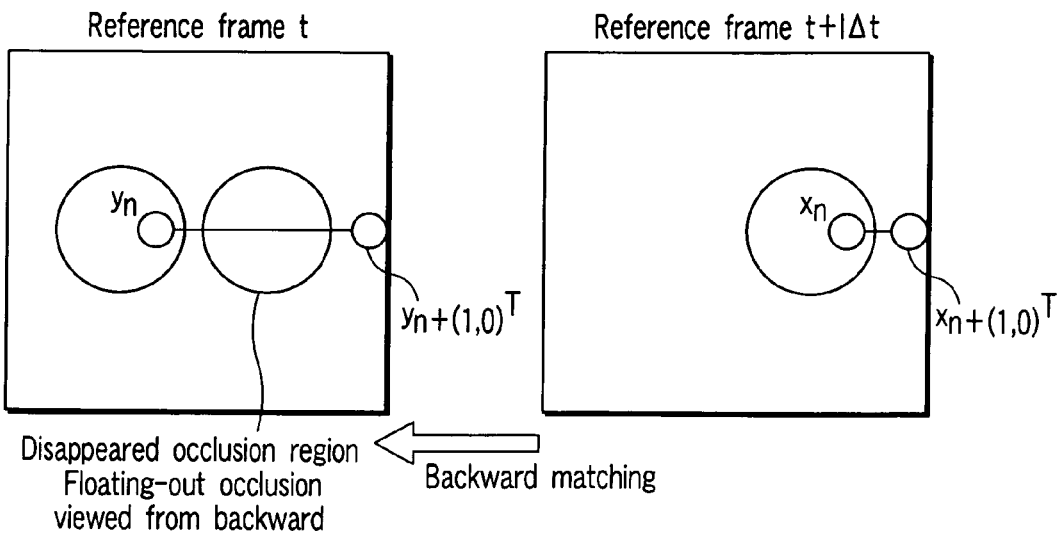
FIG. 24 is a diagram showing an occlusion region obtained by backward matching.

As explained in the second embodiment, a expansion of a spring corresponds to a uncovered occlusion region as shown in FIG. 15. In this case, because matching is done in the forward direction with respect to the time axis, the forward matching is hit. However, the covered occlusion region on the forward part of an object is not considered. When the covered occlusion region is viewed by backward matching as shown in FIG. 24, it appears as a uncovered occlusion region. Accordingly, it is found that it is possible to devise a countermeasure for both occlusions by combining the forward matching with the backward matching.

In an image matching step S31 executed by an image matching module 32, matching is done in forward and backward directions with respect to the time axis to produce two mappings. The internal processing is the same as the image matching step of the first embodiment. In other words, the matching of the first embodiment is done using the reference frame t as an source image and the reference frame t+lΔt as a reference image to output a mapping g(;t;lΔt) of the forward matching. The matching of the first embodiment is done using the reference frame t+lΔt as an source image and the reference frame t as a reference image to output a mapping g(;t+lΔt; −lΔt) of the forward matching.

In an occlusion matching step S32 done by an occlusion matching module 33, the matching is done in the forward and backward with respect to the time axis to produce two occlusion mappings. The internal processing is the same as the image matching of the first embodiment. In other words, the matching of the first embodiment is done using the reference frame t+lΔt as an source image and the reference frame t+2lΔt as a reference image to output a mapping g(;t+lΔt;lΔt) of the forward occlusion matching. The matching of the first embodiment is done using the reference frame t+2lΔt as an source image and the reference frame t+lΔt as a reference image to output a mapping g(;t; −lΔt) of the forward matching.

An occlusion reliability computation step S33 executed by an occlusion reliability computation module 34 is similar to the second embodiment. A forward occlusion reliability map P(y|g(;t;lΔt)) is computed based on the forward matching mapping g(;t; −lΔt). A backward occlusion reliability map P(y|g(;t+lΔt;−lΔt) is computed based on the forward matching mapping g(;t+lΔt; −lΔt).

The motion compensation step comprises an interpolation frame generation step S34 done by an interpolation frame generation module 36 and an image correlation reliability computation step S35 done by an image correlation reliability computation module 37. The image correlation reliability computation step S35 is similar to the second embodiment. The image correlation reliability computation step S35 is accessed in the interpolation frame generation step S34.

The interpolation frame obtained by the forward matching is similar to the second embodiment. In other words, the interpolation frame and reliability map are obtained by the equations 26, 27, 28, 29, 30. The interpolation frames are changed in subscript for identification as follows:

$$s_{f,p}(w,t+l\Delta t_i), s_{f,o,p}(w,t+l\Delta t)$$

A time position of the interpolation frame to be interpolated is assumed to be $\Delta t_i (0 \leq \Delta t_i \leq 1)$, where a time position of the reference frame t is set to 0 and a time position of the reference frame t+lΔt is set to 1. When the backward matching mapping g(;t+lΔt; −lΔt) is subjected to linear transformation according to Δti, the following equation 59 is established.

$$g_i(x,t+l\Delta t;-l\Delta t)=x+(1-\Delta t_i)d(x,t+l\Delta t;-l\Delta t) \qquad 59$$

Assuming that a triangle having vertexes {gi(x1.t+lΔt; −lΔt), gi(x2.t+lΔt; −lΔt), gi(x3.t+lΔt; −lΔt)} is indicated by Wo, a triangle having vertexes {x1,x2,x3} by X, and a triangle having vertexes {g(x1.t+lΔt; −lΔt), g(x2.t+lΔt; −lΔt), g(x3.t+lΔt; −lΔt)} by Y.

A pixel value of a point $W \in R^2 | w = Vn \in \Lambda^2$ in the triangle W will be obtained. Affine transformation from the triangle W to the triangle X and affine transformation to the triangle Y are obtained by the equation 39, and a pixel value corresponding to the point w is obtained by each of the affine transformations. In other words, a point in the triangle X corresponding to the point w can be computed by the following equation 60.

$$\lfloor x^T 1 \rfloor = \lfloor w^T 1 \rfloor T(W,X) \qquad 60$$

Similarly, a point in the triangle corresponding to the point w can be computed according to the following equation 61.

$$\lfloor y^T 1 \rfloor = \lfloor w^T 1 \rfloor T(W,Y) \qquad 61$$

When a weight average of both frames is computed according to the time position, a pixel value of an interpolation frame due to the backward matching mapping g(;t+lΔt; −lΔt) can be computed by the following equation 62.

$$s_{b,p}(w,t+l\Delta t_i)=(1-\Delta t_i)s_c(y,t)+\Delta t_i s_c(x,t+l\Delta t) \qquad 62$$

The interpolation frame due to the backward matching mapping g(;t+lΔt; −lΔt) is generated by doing this processing on all triangles in a screen.

A backward occlusion reliability map on an interpolation frame is generated by a backward occlusion reliability map P(y| g(;t+lΔt;−lΔt) as described hereinafter. In other words, a backward occlusion reliability map on an interpolation frame due to the backward matching mapping g(;t+lΔt; −lΔt) is obtained by the following equation.

$$P_o(w,t+l\Delta t_i|g(\bullet,t+l\Delta t;-l\Delta t))=P(y|g(\bullet,t+l\Delta t;-l\Delta t)) \quad 63$$

Similarly, a backward image correlation reliability map is generated by an image correlation reliability computation step. In other words, the backward image correlation reliability map due to the backward matching mapping g(;t+lΔt;−lΔt) is obtained by the following equation 64.

$$P(w,t+l\Delta t_i|g(\bullet,t+l\Delta t;-l\Delta t),s(\bullet,t),s(\bullet,t+l\Delta t))=p(s_c(y,t),s_c(x,t+l\Delta t)) \quad 64$$

Because the backward occlusion mapping g(;t; −lΔ t) due to the backward occlusion matching corresponds to matching from the reference frame t to the reference frame t−lΔt, linear transformation defined by go(x,t;lΔt)=x−d(x,t;−lΔt) is subjected to the backward occlusion mapping to generate a mapping between the reference frame t+lΔt and the reference frame t. Since the direction of the mapping is reversed, it is written into +lΔt. When the backward occlusion mapping g (;t;−lΔt) is subjected to linear transform according to Δti, the backward occlusion mapping is converted into an image expressed by the equation 65.

$$g_{i,o}(x,t;l\Delta t)=x-\Delta t_i d(x,t;-l\Delta t) \quad 65$$

where a triangle having vertexes {gi,o (x1.t;lΔt), gi,o(x2.t; lΔt), gi,o (x3.t; lΔt)} is indicated by Wo, a triangle having vertexes {x1,x2,x3} Xo, and a triangle having vertexes {go (x1.t;lΔt), go(x2.t;lΔt), go(x3.t;lΔt)} by Yo.

A point in the triangle Xo which corresponds to the point w is computed by the following equation 66.

$$\lfloor x_o^T 1 \rfloor = \lfloor w^T 1 \rfloor T(W_o, X_0) \quad 66$$

Similarly, a point in the triangle Yo which corresponds to the point w is computed by the following equation 67.

$$\lfloor y_o^T 1 \rfloor = \lfloor w^T 1 \rfloor T(W_o, Y_o) \quad 67$$

If a weight average of both frames is computed according to the time position, a pixel value of an interpolation frame due to the backward occlusion mapping g (;t;lΔt) is computed by the following equation 68.

$$s_{b,o,p}(w,t+l\Delta t_i)=\Delta t_i s_c(x_o,t)+(1-\Delta t_i)s_c(y_o,t+l\Delta t) \quad 68$$

An interpolation frame due to the backward occlusion mapping g(;t;lΔt) is generated by being done on all triangles in a screen. A backward image correlation reliability map is generated by an image correlation reliability computation step. In other words, a backward image correlation reliability map due to the backward occlusion mapping g (;t;lΔt) is generated based on the following equation 69.

$$P(w,t+l\Delta t_i|g(\bullet,t;-l\Delta t),s(\bullet,t),s(\bullet,t+l\Delta t))=p(s_c(x_o,t),s_c(y_o,t+l\Delta t)) \quad 69$$

Because an interpolation frame due to the forward matching mapping q(;t;lΔt) and an interpolation frame due to the forward occlusion mapping g(;t+lΔt;lΔt), and an interpolation frame due to the backward matching mapping g(;+lΔt; −lΔt) and an interpolation frame due to the backward occlusion mapping g(;t; −lΔt) can be generated, these interpolation frames are combined by a reliability map.

probability of reliability given by image correlation and probability of the reliability given by occlusion are independent from each other. Therefore, the probability that the forward occlusion matching is adopted can be expressed by the following equation 70 according to multiplication theorem of probability.

$$P_1=P_o(w,t+l\Delta t_i|g(\bullet,t;l\Delta t))P(w,t+l\Delta t_i|g(\bullet,t+l\Delta t;l\Delta t),s(\bullet,t),s(\bullet,t+l\Delta t)) \quad 70$$

The probability that the forward matching is adopted can be expressed by the following equation 71:

$$P_0=\{1-P_o(w,t+l\Delta t_i|g(\bullet,t;l\Delta t))\}P(w,t+l\Delta t_i|g(\bullet,t;l\Delta t),s(\bullet,t),s(\bullet,t+l\Delta t)) \quad 71$$

The probability that the backward occlusion matching is adopted can be expressed by the following equation 72.

$$P_3=P_o(w,t+l\Delta t_i|g(\bullet,t+l\Delta t;-l\Delta t))P(w,t+l\Delta t_i|g(\bullet,t;-l\Delta t),s(\bullet,t),s(\bullet,t+l\Delta t)) \quad 72$$

The probability that the backward matching is adopted can be expressed by the following equation 73:

$$P_2=\{1-P_o(w,t+l\Delta t_i|g(\bullet,t+l\Delta t;-l\Delta t))\}P(w,t+l\Delta t_i|g(\bullet,t+l\Delta t;-l\Delta t),s(\bullet,t),s(\bullet,t+l\Delta t)) \quad 73$$

The transparency used for combination of the interpolation frames is computed from these probability based on the following equation 74:

$$\alpha_j = \frac{P_j}{\sum_{n=0}^{3} P_n}, (j=0,1,2,3) \quad 74$$

Using this transparency the interpolation frames are combined based on the reliability according to the following equation 75.

$$s_{i,p}(w,t+l\Delta t_i)=\alpha_0 s_{f,p}(w,t+l\Delta t_i)+\alpha_1 s_{f,o,p}(w,t+l\Delta t_i)+\alpha_3 s_{b,p}(w,t+l\Delta t_i)+\alpha_3 s_{b,o,p}(w,t+l\Delta t_i) \quad 75$$

The interpolation frame Si, p (w,t+lΔti) can be generated by doing on the whole screen the above-mentioned processing.

Fourth Embodiment

An image matching apparatus of the present embodiment will be explained referring to the block diagram of FIG. 25. The present embodiment provides an image mapping apparatus supplied with an image signal of a motion image and used for generating an interpolation frame between the frames of the image signal like the previous embodiments. The present embodiment provides an image matching apparatus using a method for interpolating an occlusion region adequately to generate an interpolation frame of high quality.

Figure 25:
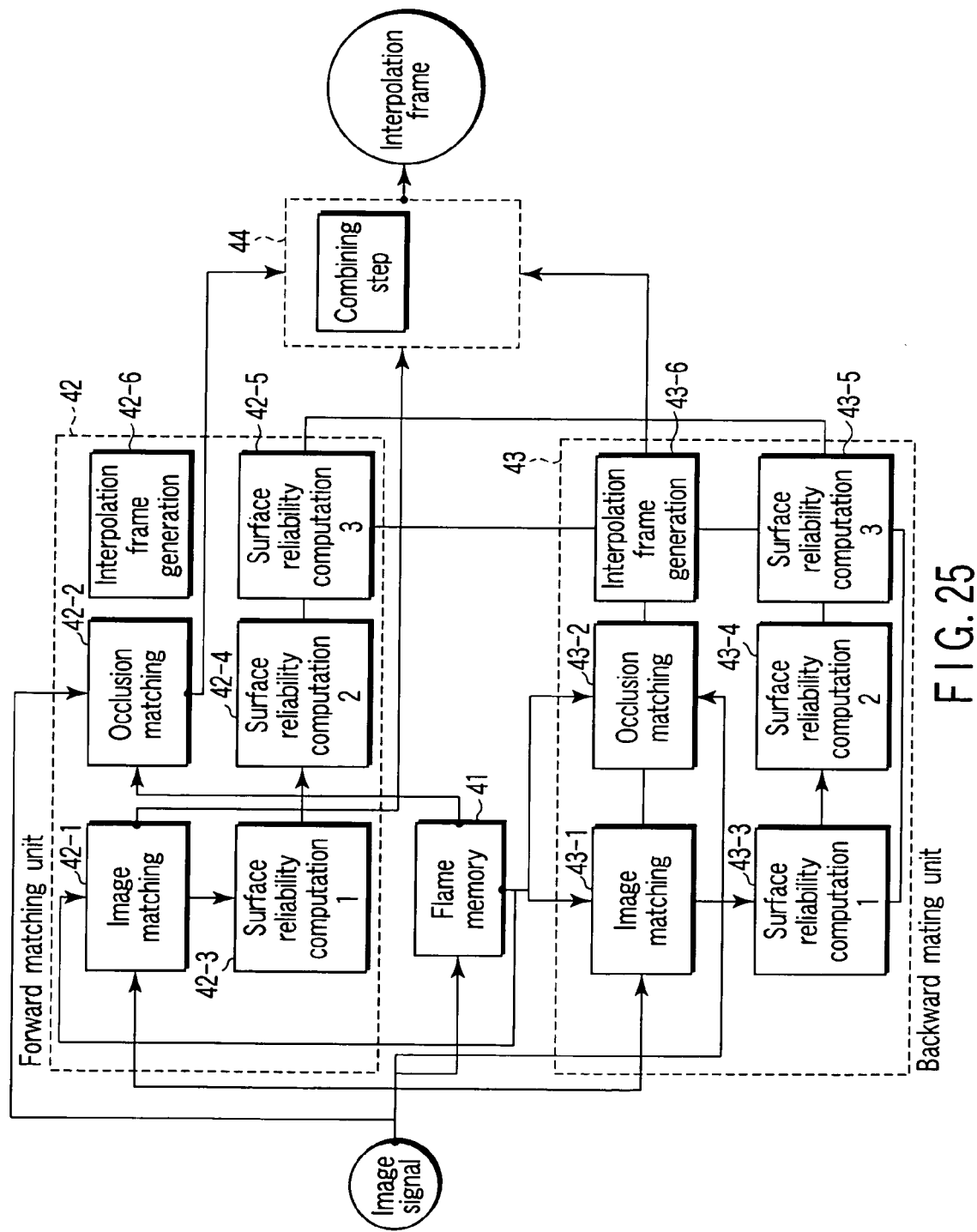
FIG. 25 is a block diagram of an image matching apparatus executing an image matching method according to a fourth embodiment of the present invention.

According to the constitution shown in FIG. 25, the image signal is input to a frame memory 41. The frame memory 41 is connected to a forward matching unit 42 and a backward matching unit 43. The outputs of the forward and backward matching units 42 and 43 are connected to an image combination unit 44.

The forward matching unit 42 comprises an image matching module 42-1 and an occlusion matching module 42-2 to each of which the input image signal and the stored image signal of the frame memory 41 are input. The forward matching unit 42 further includes surface reliability calculators 42-3, 42-4, 42-5 cascade-connected to the image matching module 42-1 and an interpolation frame generator 42-6.

The backward matching unit 43 comprises an image matching module 43-1 and an occlusion matching module 43-2 to each of which the input image signal and the stored image signal of the frame memory 41 are input. The backward matching unit 43 further includes surface reliability calculators 43-3, 43-4, 43-5 cascade-connected to the image matching module 43-1 and an interpolation frame generator 42-6.

In the configuration, the image signal of motion image is divided into a plurality of frames and then processed. In this time, each frame is stored in the frame memory 41 and some frames can be accessed at the same time. In the present embodiment, a frame in the time t is referred to as a reference frame t, a frame in the time t+1Δt is referred to as a reference frame t+1Δt, a frame in the time t+2lΔt is referred to as reference frame t+2lΔt, and a frame in the time t+lΔt to as reference frame t+lΔt. An interpolation frame is interpolated between the reference frame t and the reference frame t+lΔt.

Figure 26:
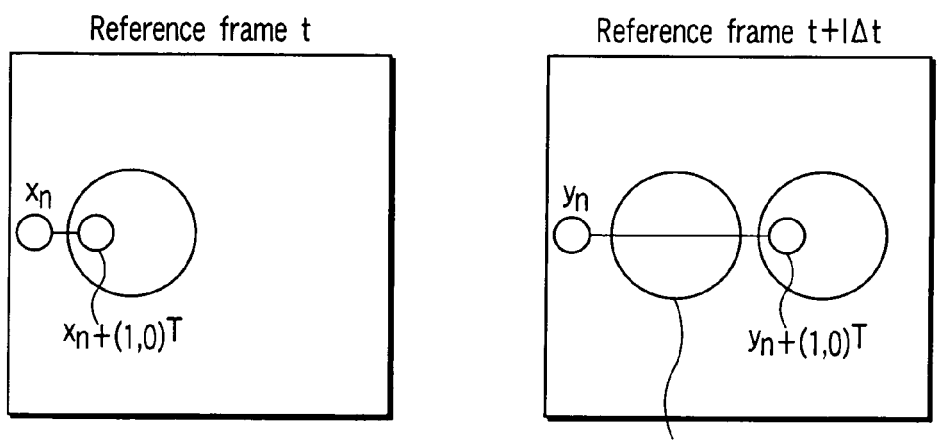
FIG. 26 is a diagram showing a connection between spaces.

An occlusion region must be detected adequately for the occlusion region to be interpolated adequately. The ground that can detect the occlusion region by the present embodiment adequately is explained referring to FIG. 26. FIG. 26 shows an example wherein a round object moves to the left to the right. On the reference frame t+lΔt, a uncovered occlusion region appears at a position before the round object moves as indicated in a circle of FIG. 26. A lattice point of the rear part of the round object is noted, that is, the lattice points xn, xn+(1,0)T and yn, yn+(1,0)T are noted. Since the round object moves, if matching is subjected thereto, the interval between the lattice points yn, yn+(1,0)T should be expanded greatly. In other words, a spring between the lattice points yn, yn+(1,0)T stretches. As thus described when an object moves and thus a uncovered occlusion region appears, it is found that a spring thereon always expands. In other words, the part that the spring stretches greatly can be expected to be the uncovered occlusion region.

The uncovered occlusion appears on the rear of the round object between the times t and t+1Δt as explained referring to FIG. 16. In this time, it is found that the spring expands. When the round object just moves downward, it is found that a part corresponding to the present uncovered occlusion region is appears in the time t+2lΔt. In other words, if the reference frames t+lΔt and t+2lΔt are subjected to matching, a region corresponding to the occlusion region can be found. This is referred to as occlusion matching.

Figure 27:
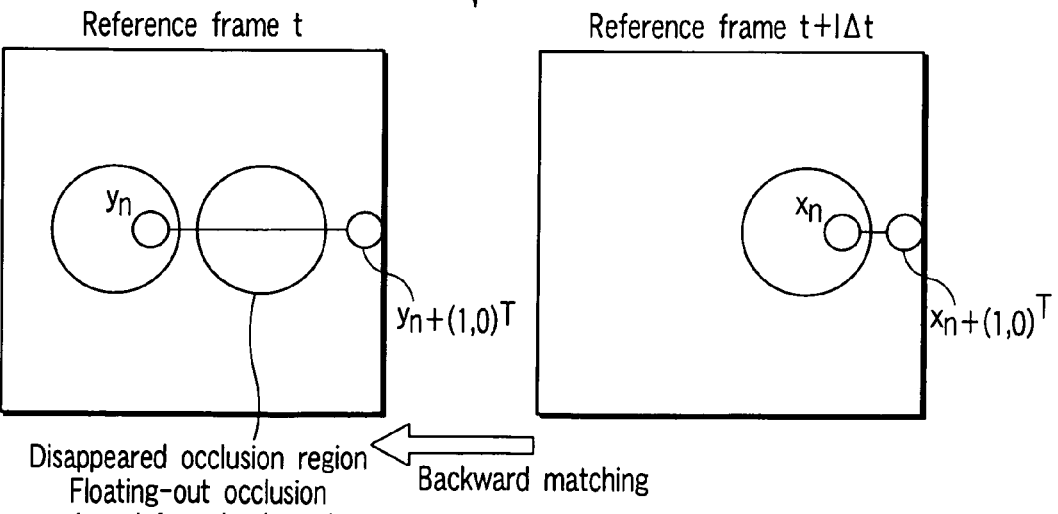
FIG. 27 is a diagram showing an occlusion region obtained by backward matching.

The stretch of the spring corresponds to the uncovered occlusion region as shown in FIG. 26. In this case, because the matching is carried out in a forward direction with respect to a time axis, it corresponds to the forward matching. However, the covered occlusion region of the front part of the object is not considered. When a covered occlusion region is watched in the backward matching as shown in FIG. 27, it is a uncovered occlusion region. Accordingly, it is possible to devise a countermeasure on both occlusions by combining the forward matching and the backward matching together.

With the above it is found that the occlusion region is detected and a region corresponding to the occlusion region can be subjected to the matching.

It is found that the uncovered occlusion region can be detected by the expansion of the spring. This means what can compute surface reliability. If the surface reliability can be computed not only by the expansion of the spring but also by plural information, it is thought that the uncovered occlusion region can be detected at higher precision by the joint probability of these reliabilities.

The following characteristics should be noted.

1. An occlusion occurs before and after movement of the object. The occlusion appearing before movement of the object is covered occlusion and the occlusion appearing thereafter is uncovered occlusion.

2. In dynamic matching, there are geometric characteristics such that the spring stretches on the rear of the object and shortens on the front thereof.

Figure 28:
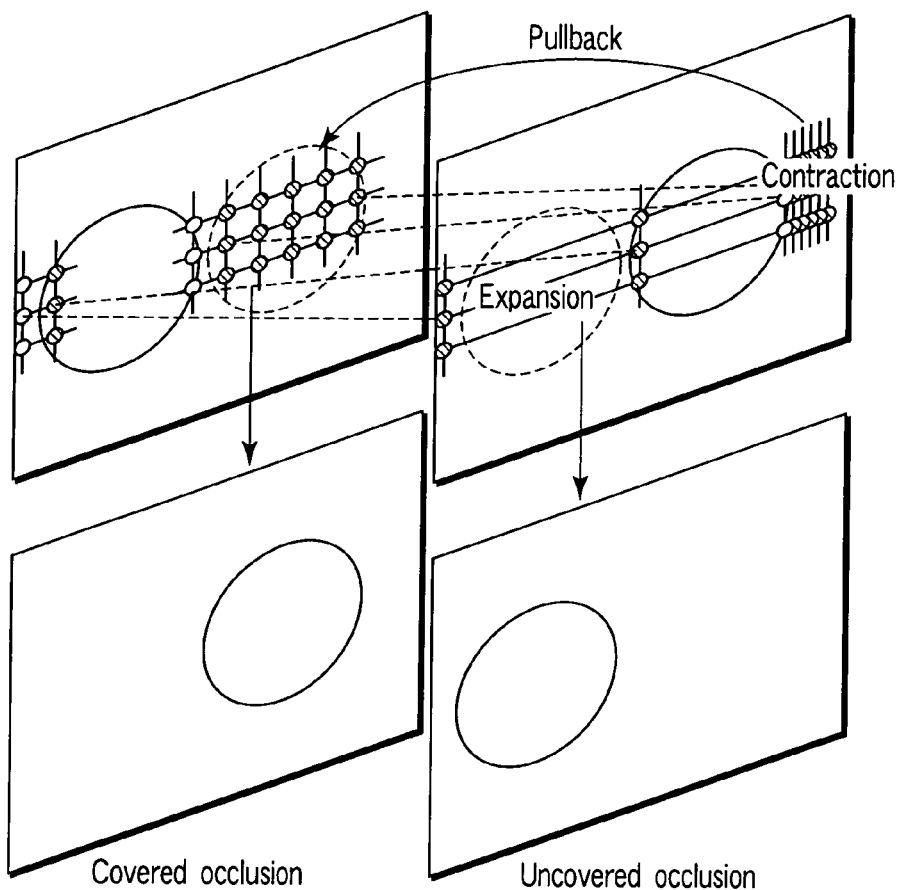
FIG. 28 is a diagram for explaining that forward and backward occlusions can be detected by the expansion and contraction of a spring.

According to the characteristics 1 and 2, the uncovered occlusion can be detected by expansion of the spring, and the covered occlusion can be detected by the contraction thereof. FIG. 28 shows this state. It is described referring to FIG. 29 why the occlusion cannot be detected correctly only by detecting the uncovered occlusion by expansion of the spring.

Figure 29:
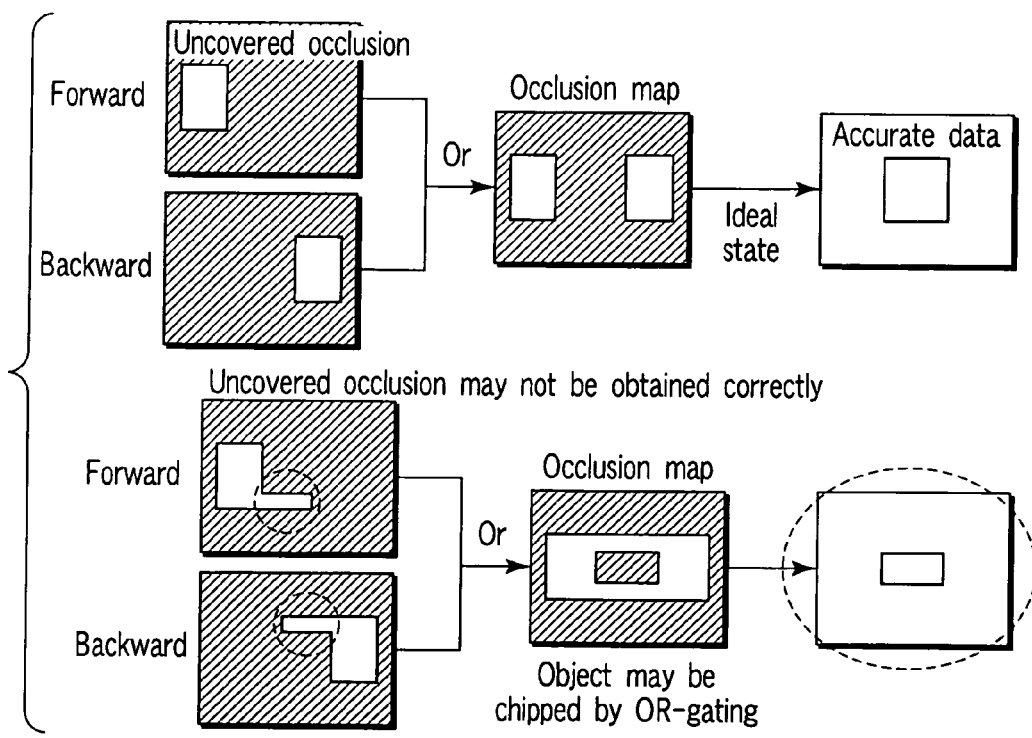
FIG. 29 is a diagram for explaining that the detection of occlusion is not satisfied only by detection of floating out.

It is assumed that the matching is carried out with respect to the bidirection of the time axis to execute the forward matching and backward matching. In this time, one occlusion region is provided on the rear of the object by the forward matching, and the other occlusion region is provided on the front thereof by the backward matching. If these two occlusion regions are added, an ideal result as shown on the upper right of FIG. 29 is provided. However, an occlusion map may not be always provided justly as shown on the under side of FIG. 29. In that case, when the forward and backward occlusion regions are subjected to OR-gating simply, the object is missing resulting in deteriorating the image quality.

Figure 30:
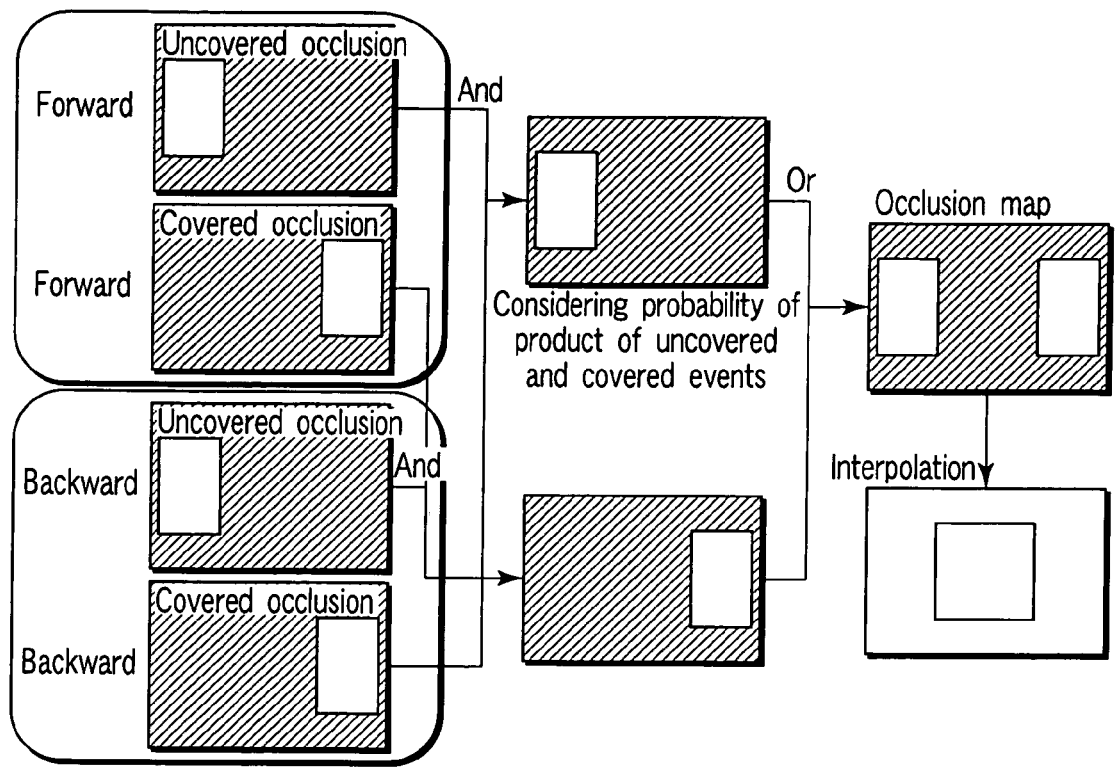
FIG. 30 is a diagram for explaining combination of images by a plurality of reliabilities.

In contrast, the case that the occlusion disappeared due to contraction of the spring is detected at the same time is considered. An example of this case is explained referred to FIG. 30. In this case, the matching is assumed to be carried out in bidirection with respect to the time axis. In this time, two occlusion maps corresponding to the expansion and contraction of the spring are obtained. The two occlusion maps can be provided from a result of the backward matching. Then, as shown in the under side of FIG. 29, it may be said that the uncovered occlusion region (uncovered occlusion) due to the forward matching and the covered occlusion region (covered occlusion) due to the backward matching have the same meaning. In other words, the same occlusion region is watched from two viewpoints. These two maps are ones viewed from two viewpoints with respect to one event. The result of higher robust that is not depended upon a single result by obtaining the joint probability of these maps can be acquired. Accordingly, the joint probability of two maps is obtained as shown in FIG. 30 (AND), and the robust occlusion map can be provided by ORing two results.

Figure 31:
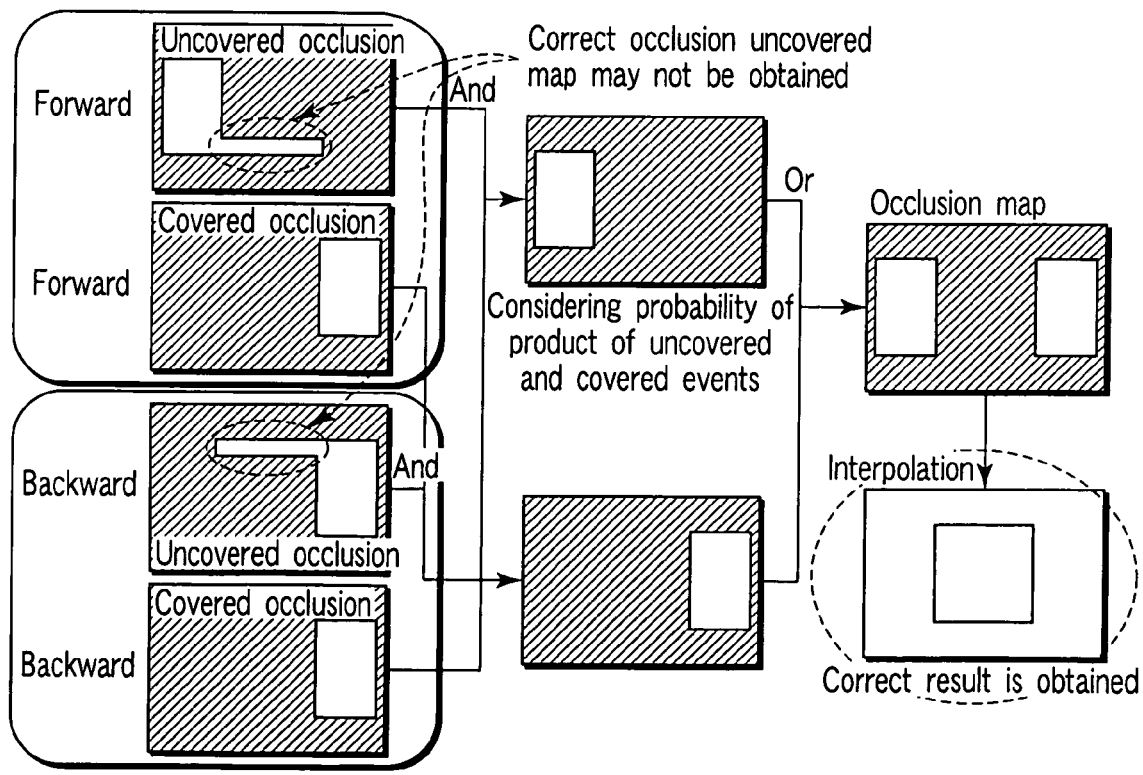
FIG. 31 is a diagram showing to provide a robust even if a right map is not provided.

As shown in FIG. 31 even if the occlusion maps are not really provided justly similarly to the above, this method can provide a robust occlusion map. By obtaining reliability of the mapping as a result of matching, it is thought that more robust result can be obtained by applying the joint probability of the mapping.

Figure 32:
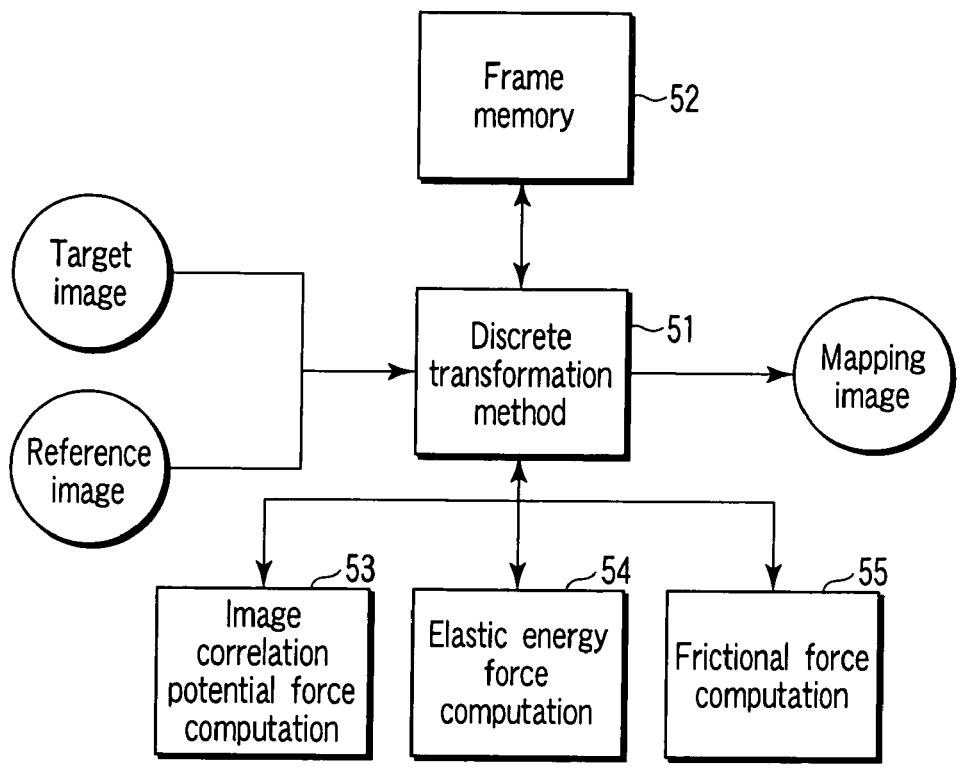
FIG. 32 is a block diagram of a matching apparatus executing a matching step.

How to carry out matching is explained. A method for matching corresponding points from an source image to a reference image when the source image and reference image are input, that is, generating a relation between matching images is explained referring to a block circuit of FIG. 32. In FIG. 32, the output of a discrete variable unit 51 supplied with the reference image and source image is provided to a frame memory 52, an image correlation potential force computation unit 53, a elastic energy computation unit 54 and a frictional force computation unit 55. A problem setting is done on this block circuit. The following modes are conceived as an source image.

A continuous image model $$s_c(x, t), \begin{bmatrix} x \\ t \end{bmatrix} \in (X \times T) \subset R^3 \qquad 76$$

$X \subset R^2$ is a set expressing the whole image, and $T \subset R$ is a set expressing a time to be intended.

This is a continuous image model of a real number base. In the present embodiment, because a digital image is regarded as an source image, the following model obtained by sampling the above model is used.

Sampling Image Model $$s_p(x,t), \begin{bmatrix} x \\ t \end{bmatrix} = \begin{bmatrix} V & 0 \\ 0 & \Delta t \end{bmatrix} \begin{bmatrix} n \\ k \end{bmatrix} \in (N \times K) \subset \Lambda^3 \qquad 77$$

where $N \subset \Lambda^2$ is a lattice set of the whole image, $K \subset A$ is a lattice set of a time to be intended, and V is a sampling matrix, and N and X are connected to each other. For example, $$V = \begin{bmatrix} 1 & 0 \\ 0 & 1 \end{bmatrix}$$

is used.

The image matching is a problem to find which point of the reference image corresponds to a point on the source image In this time, the image matching problem is formulated as a problem to search for a motion vector $d:X \times T \to X$ satisfying the following conditional expression.

$$s_p(x,t) = s_c(x + d(x,t;l\Delta t), t + l\Delta t) \qquad 78$$

It should be noted that since a motion vector d is a real number, the right side of the equation uses notation of the continuous image model equation 77. Because the image matching between two images of the source image and reference image is thought about, the following equivalent problem is considered.

$$s_{k_1,p}(x) = s_{k_2,c}(x + d(x)) \qquad 79$$

where $$s_{k_1,p}(x) = s_p(x,t)|_{t=k_1\Delta t}$$

$$s_{k_2,c}(x) = s_c(x,t)|_{t=k_2\Delta t}$$

$k_1, k_2 \in K$ are variables representing the source image and reference image respectively.

The motion vector is simplified to be $d:X \to X$. Since only one motion vector d may be decided with respect to the point x, the motion vector d is assumed to be a unique mapping. Since the image x+d(x) can be considered to be a mapping with respect to the point x, it is defined by the following equation 80.

$$g(x) = x + d(x) \qquad 80$$

where it is a unique mapping of $g:X \to X$. The above image matching problem results in a problem for searching for the mapping g satisfying the following equation 81.

Image Matching Problem $$s_{k_1,p}(x) = s_{k_2,c}(g(x)) \qquad 81$$

where a point determined by the mapping g is defined by the following equation 82.

$$y = g(x) \qquad 82$$

where $y \in X$.

Because $x=Vn$, the point x corresponds uniquely to a point n on the lattice space. Because the mapping g is a unique mapping, the point y corresponds uniquely to the point x, too. Therefore, the point y corresponds uniquely to the point n. This is expressed by FIG. 5. In other words, the space which will be dealt with here is a transformation lattice space corresponding one-to-one to the point n on the lattice space.

Because $y=g(x)=g(Vn)$ as described above, this is redefined by the following equation in order to make clearly understandable to correspond one-to-one to the point n.

$$y_n = g(x) \qquad 83$$

Then, the image matching problem (equation 3) result in a problem searching for yn satisfying the next expression.

Image Matching Problem $$s_{k_1,p}(x) = s_{k_2,c}(y_n) \qquad 84$$

Measure for solving the problem is explained. Energy function is defined by the following equation to solve the equation 84 of the image matching problem.

Energy Function $$U(y_n) = E_u(y_n) + E_k(y_n) \qquad 85$$

The equation 84 of the image matching problem is formulated to the following optimization problem as the minimization problem of the energy function of the whole screen.

Optimization Problem $$\min_{\{y_n | n \in N\}} \sum_{n \in N} U(y_n) \qquad 86$$

where Eu is assumed to be an image energy, and Ek to be an elastic energy. This is used in Snakes ["M. Kass, A. Witkin and D. Terzopoulos, "Snakes: Active Contour Models", International Journal of Computer Vision, 1, 4, pp. 321-331, 1988"], Active Net ["Sakaue, Yamamoto", Model Active Net of a dynamic network and Application to Region extraction, Television studies magazine, 45, 10, pp. 1155-1163, 1991"] and CPF [Y. Shinagawa and T. L. Kunii, "Unconstrained Automatic Image Matching Using Multiresolutional Critical-Point Filters", IEEE Trans. on Pattern Analysis and Machine Intelligence, Vol. 20, No. 9, 1998"].

Eu is explained as follows. The equation 84 is transformed into the following equation.

$$s_{k_2,c}(y_n) - s_{k_1,p}(x) = 0 \qquad 87$$

It is usually difficult by noise components included in an image to search for a point to satisfy the equation 87 strictly. Accordingly, the following energy function is conceived.

$$E_u(n) = \frac{1}{2}(s_{k_2,c}(y_n(T)) - s_{k_1,p}(x))^2 \qquad 88$$

A point that this energy function Eu becomes minimum is searched for. Ek is explained as follows. The image to be subjected to matching is assumed to be one obtained by projecting a three-dimensional space to a two-dimensional area. When an object on the three-dimensional space is assumed to be a rigid body, the surface of the rigid body is observed as an object on the two-dimensional image. If an object on the three-dimensional space is observed with the source image and reference image, the probability that the phase of the object observed on each image is kept is high. As shown in FIG. 7, the positional relation of points x on the source image should be kept on the point yn on the reference image object point, too. It is convenient that the point yn seems to be a net formed of springs for such a characteristic to be reproduced. In other words, it is preferable that the elastic energy is introduced.

Therefore, the energy minimization equation 86 due to the equation 85 of energy function is to search for solution such that the equation 84 is satisfied as much as possible and the whole image becomes smooth.

The optimality requirement of the following equation is found from the equation 86 in Snakes and Active Net.

Optimality Requirement $$\frac{\partial U(y_n)}{\partial y_n} = 0 \qquad 89$$

A solution is obtained by solving this. This provides a condition of static balance to satisfy the energy function (equation 5).

This method builds up a dynamic solution method by introducing kinetic energy T. A dynamic behavior of the point y is interested, so that the function yn($\tau$) is defined by introducing a new time axis $\tau \in R$ to the point y. Because the new time axis is introduced, a differentiation concerning a time can be defined as follows.

$$\frac{d}{d\tau} y_n(T) = \dot{y}_n(T), \frac{d^2}{d\tau^2} y_n(\tau) = \ddot{y}_n(T) \qquad 90$$

The kinetic energy is defined as the following expression.

Kinetic Energy $$T(\dot{y}_n(T)) = \frac{1}{2}\dot{y}_n(T)^T \dot{y}_n(T) \qquad 91$$

A Lagrangian is defined as follows.

Lagrangian $$L(y_n(T), \dot{y}_n(T)) = T(\dot{y}_n(T)) - U(y_n(T)) \qquad 92$$

An equation of motion to satisfy a variation principle then is provided by the following equation 93.

Euler Equation $$\frac{d}{d\tau} \frac{\partial L}{\partial \dot{y}_n} - \frac{\partial L}{\partial y_n} = 0 \qquad 93$$

When this is developed, the equation of motion of the following expression is provided.

An Equation of Motion $$\ddot{y}_n(T) = -\frac{\partial U(y_n)}{\partial y_n} \qquad 94$$

However, the motion according to the equation of motion 94 is a conservative system, and a solution does not converge by an energy conservation law. Therefore, the friction energy of the following equation 95 is introduced to make the system a non-conservative system.

Friction Energy $$\Phi(\dot{y}_n(T)) = \frac{1}{2}\mu \dot{y}_n(T)^T \dot{y}_n(T) \qquad 95$$

where $\mu>0$ is a coefficient of dynamic friction. The Euler equation when the friction energy is introduced is expressed as follows.

The Euler equation including the friction energy.

$$\frac{d}{dT} \frac{\partial L}{\partial \dot{y}_n} - \frac{\partial L}{\partial y_n} + \frac{\partial \Phi}{\partial \dot{y}_n} = 0 \qquad 96$$

The equation of motion 97 is provided by solving this equation 96.

The equation of motion including friction.

$$\ddot{y}_n(T) = -\frac{\partial U(y_n)}{\partial y_n} - \mu \dot{y}_n(T) \qquad 97$$

Figure 33:
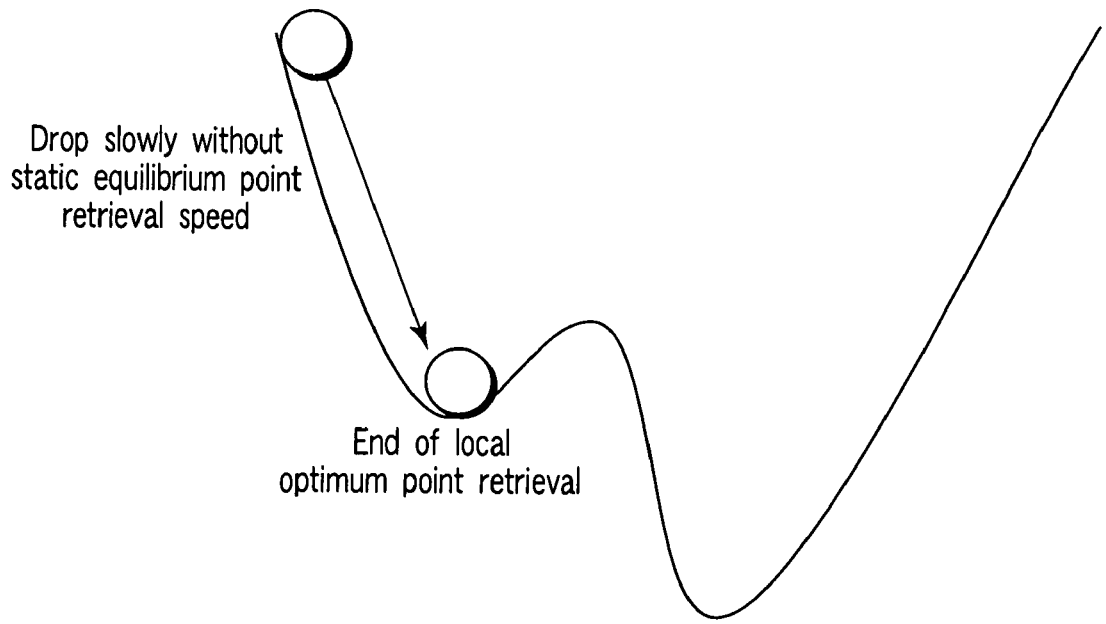
FIG. 33 is a diagram for explaining optimization due to a static energy function.

These static energy function and dynamic energy function are intuitively compared with each other as follows. In optimization according to the static energy function as shown in FIG. 33, a search is done for acquiring a position of a static balance. Therefore, a position of balance which is basically the nearest to an initial value is obtained. In other words, the local optimal point which is the nearest to the initial value is obtained. However, the local optimal point is not always a global optimal point as shown in FIG. 33. As thus described, the optimization due to the static energy function accompanies strong initial value dependence.

Figure 34:
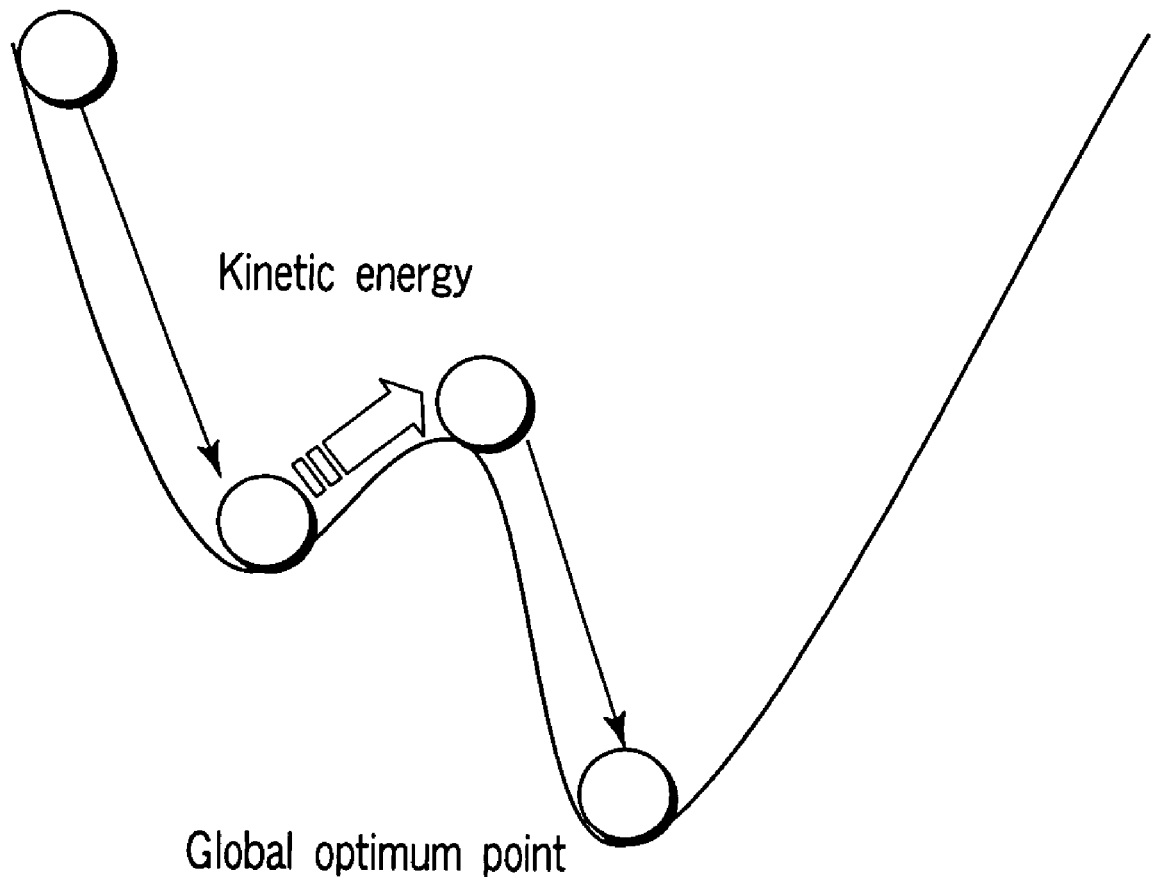
FIG. 34 is a diagram for explaining optimization due to a static energy function.

In contrast, in the dynamic optimization of the present embodiment a search is done in a dynamic motion. More specifically, the search is expressed as motion. Therefore, the first potential energy is converted into the kinetic energy as shown in FIG. 34 so that the search can jump out the local optimal point. As a result, a wider range than used of the static energy function can be searched. Therefore, in comparison with use of the static energy function, the present method can lower the initial value dependence and have robustness against influence of noise, etc.

It will be proved that the dynamic search, that is, a solution according to the equation of motion (equation 15) satisfies an optimality requirement condition for an optimization problem (equation 6).

1. The search is assumed to be completed. Then, the point y stops completely, that is, the following equation 98 is established.

$$\dot{y}=0, \ddot{y}=0 \qquad 98$$

Then, the following equation is established by the equation of motion 97.

$$0 = -\frac{\partial U(y)}{\partial y} - \mu \cdot 0 \qquad 99$$

Thus, the following equation 100 is established.

$$0 = \frac{\partial U(y)}{\partial y} \qquad 100$$

Therefore, the optimality requirement equation 89 is satisfied. When the search is completed, the point is optimum.

2. The point y is assumed to be stationary. Then, the following equation 101 is established.

$$\dot{y}=0, \ddot{y} \neq 0 \quad (101)$$

Then, the following equation 102 is obtained by the equation of motion 97.

$$\ddot{y} = -\frac{\partial U(y)}{\partial y} \quad (102)$$

If the point y is an optimal point now, the following equation 103 is established by the optimality requirement equation 89, and the search is completed.

$$\ddot{y}=0 \quad (103)$$

If the point y is not an optimal point, the search is not completed. In other words, the search is not completed except for the optimal point.

3. The following equation is established by a property of friction energy.

$$\lim_{t \to \infty} T(\dot{y}) = 0 \quad (104)$$

In other words, the motion stops. Thus, the search is completed sometime.

The motion according to the equation of motion (equation 15) satisfies a requirement condition of optimality for the optimization problem equation 86 by the conditions 1, 2 and 3 as mentioned above.

The secondary optimality requirement is not satisfied partly. The reason is because the search may be finished on the top of potential hill. Therefore, if the condition that the search is not completed on the top of potential hill, that is, the following equation 105 is assumed, the secondary optimality requirement is proved, too.

$$\frac{\partial^2 U(y)}{\partial y^2} < 0 \to \dot{y} \neq 0, \ddot{y} \neq 0 \quad (105)$$

This additional assumption can be achieved by requesting for the next condition for an algorithm.

"if $$\frac{\partial^2 U(y)}{\partial y^2} < 0 \text{ in } \dot{y} = 0, \ddot{y} = 0,$$

random perturbation is given."

As described above, the search according to the equation of motion 97 provides a solution for the optimization problem equation 86, and suggests to have a robust in comparison with a conventional static search.

The structure of $$\frac{\partial U(y_n)}{\partial y_n}$$

will be conceived successively.

Since this can be developed like the following equation 106, this equation will be discussed.

$$\frac{\partial U(y_n)}{\partial y_n} = \frac{\partial E_u(y_n)}{\partial y_n} + \frac{\partial E_k(y_n)}{\partial y_n} \quad (106)$$

$$\frac{\partial E_u(y_n)}{\partial y_n}$$

ay represents a force of a reverse direction with respect to a gradienta gradient of the point yn(T) of image energy. The following equation is given to make that it is a force clear.

$$F_u(n) = -\frac{\partial E_u(y_n)}{\partial y_n}$$

Various methods are conceived to compute the gradient, but the following method is adopted. As shown in the equation 7, the gradient is obtained by local optimization directly. The image model Sc is a continuous image model, but in practice only the sampled image model Sp can be used. Thus, the local optimization is done based on the sampled image model, too.

Because the sampling point which is at the nearest to yn(τ) should be a local space center yc, it is obtained by the following equation 107.

$$y_c = \left\lfloor y_n(T) + \begin{bmatrix} 0.5 \\ 0.5 \end{bmatrix} \right\rfloor \quad (107)$$

$\lfloor \cdot \rfloor$ is an operator to be converted to an integer (omission of fractions).

When the adjacency space is defined by the following equation 108, a local search set Ω can be defined by the following equation 109.

$$L = \left\{ \begin{bmatrix} -1 \\ -1 \end{bmatrix}, \begin{bmatrix} 0 \\ -1 \end{bmatrix}, \begin{bmatrix} 1 \\ -1 \end{bmatrix}, \begin{bmatrix} -1 \\ 0 \end{bmatrix}, \begin{bmatrix} 0 \\ 0 \end{bmatrix}, \begin{bmatrix} 1 \\ 0 \end{bmatrix}, \begin{bmatrix} -1 \\ 1 \end{bmatrix}, \begin{bmatrix} 0 \\ 1 \end{bmatrix}, \begin{bmatrix} 1 \\ 1 \end{bmatrix} \right\} \quad (108)$$

$$\Omega = \{y_n(T), y_c + 1 | \forall 1 \in L\} \quad (109)$$

The gradient is subjected to the local optimization, and a vector in the gradient direction is obtained. The vector is normalized and multiplied by the size of the gradient. As a result, the following equation is provided.

A force due to the image energy (square error energy)

$$F_u(n, y \cdot (T)) = \frac{(s_{k_2,c}(y_{\min}) - s_{k_2,c}(y_n(T)))^2}{\|u_d\|} u_d \quad 110$$

$$u_d = y_{\min} - y_n(T)$$

$$y_{\min} = \underset{y \in \Omega}{\operatorname{argmin}}(s_{k_2,p}(y) - s_{k_1,p}(x))^2$$

In view of handling easiness in mounting, the equation 112 of the force due to the image energy that the energy function is defined by the following equation 111 can be used.

$$E_u(n) = |s_{k_2,c}(y_n(T)) - s_{k_1,p}(x)| \quad 111$$

Force due to the Image energy (absolute value difference error energy)

$$F_u(n) = \frac{|s_{k_2,c}(y_{\min}) - s_{k_2,c}(y_n(T))|}{\|u_d\|} u_d \quad 112$$

$$u_d = y_{\min} - y_n(T)$$

$$y_{\min} = \underset{y \in \Omega}{\operatorname{argmin}}|s_{k_2,p}(y) - s_{k_1,p}(x)|$$

$$\frac{\partial E_k(y_n)}{\partial y_n}$$

represents a force due to the gradient in a point $y_n(T)$ of elastic energy.

The following equation is given to make that it is a force clear.

The elastic body is assumed to be configured by a manifold M. A point on the manifold M is assumed to be expressed by the following equation 113.

$$y = \begin{bmatrix} u \\ v \end{bmatrix} \in R^2 \quad 113$$

The manifold is assumed to have coordinate neighborhood. In this time, partial differentiation is defined by the equation 114.

$$y_p = \left(\frac{\partial u}{\partial p}, \frac{\partial v}{\partial p}\right)^T \quad 114$$

$$y_q = \left(\frac{\partial u}{\partial q}, \frac{\partial v}{\partial q}\right)^T$$

The primary differential term of the elastic energy is expressed by the following equation 115.

$$E_k = \frac{1}{2} k (|y_p|^2 + |y_q|^2) \quad 115$$

This is energy to express the shortening of the elastic member. This is differentiated by y as shown by the following equation 116.

$$\frac{\partial E_k}{\partial y} = k \left( -y_p \frac{\partial}{\partial y}\left(\frac{\partial y}{\partial p}\right) - y_q \frac{\partial}{\partial y}\left(\frac{\partial y}{\partial q}\right) \right) \quad 116$$

$$= -k \left( \frac{\partial}{\partial p}\left(\frac{\partial y}{\partial p}\right) + \frac{\partial}{\partial q}\left(\frac{\partial y}{\partial q}\right) \right)$$

$$= -k (y_{pp} + y_{qq})$$

where $$y_{pp} = \left(\frac{\partial^2 u}{\partial p^2}, \frac{\partial^2 v}{\partial p^2}\right)^T \quad 117$$

$$y_{qq} = \left(\frac{\partial^2 u}{\partial q^2}, \frac{\partial^2 v}{\partial q^2}\right)^T$$

The manifold M is assumed to be realized by the spring model coupling lattice points, and the partial differentiation is approximated by the difference equation.

$$y_{pp} \cong y_{n+(-1,0)}{}^T - 2y_n + y_{n+(1,0)}{}^T$$

$$y_{qq} \cong y_{n+(0,-1)}{}^T - 2y_n + y_{n+(0,1)}{}^T \quad 118$$

If this is substituted for the equation 117 and arranged, 4-point connection spring model shown by the following equation 119 is provided.

4-Point Connection Spring Models $$F_k(n, y(\tau)) = k\left(y_{n+\begin{bmatrix}0\\-1\end{bmatrix}}(T) - y_n(T)\right) + k\left(y_{n+\begin{bmatrix}-1\\0\end{bmatrix}}(T) - y_n(T)\right) + \quad 119$$

$$k\left(y_{n+\begin{bmatrix}1\\0\end{bmatrix}}(T) - y_n(T)\right) + k\left(y_{n+\begin{bmatrix}0\\1\end{bmatrix}}(T) - y_n(T)\right)$$

It is natural that an initial condition is expressed by the following equation 120, if $y_n(0) | \forall n \in N$ is assumed to be equal to a square lattice and the kinetic energy is 0, that is, the speed is 0.

$$\begin{bmatrix} y_n(0) \\ \dot{y}_n(0) \end{bmatrix} = \begin{bmatrix} x \\ 0 \end{bmatrix} \quad 120$$

When the above matters are summarized, the equation of motion is expressed by the following equation.

Equation of Motion $$\ddot{y}_n(T) = F_u(n) + F_k(n) - \mu \dot{y}_n(T) \quad 121$$

$$\begin{bmatrix} y_n(0) \\ \dot{y}_n(0) \end{bmatrix} = \begin{bmatrix} x \\ 0 \end{bmatrix}, \forall n \in N$$

Since the force Fu due to the image energy is not solved in analysis, the normal differential equation (equation 19) is not solved in analysis. Therefore, it is difficult to take the limit in $\tau \to \infty$ of the system. For this reason, an enough time necessary for converging the system is considered, and the convergence state of the system is estimated by computing t=(0,T) interval by numeric analysis.

If the initial value is determined, the normal differential equation provides a solution uniquely by a discrete variable method. Generally, it is said an initial value problem of the normal differential equation. There are many numerical solutions for solving this problem, for example, an Euler method, a Runge Kutta method, a Bulirsch-Soer method, a predictor-corrector method, a hidden Runge Kutta method as famous methods. The Runge Kutta method is most famous and has a high use frequent. However, the following equation 121 is hard to fit a complicated numerical solution since it has a dimension for the size of an image. Therefore, it is thought that the Euler method that realization is most simplified is applied.

Since the Euler method is a numerical solution for a normal differential equation of one time, at first, the equation 19 is converted to the ordinary differential equation of one time. When transformation of variable is carried out by the following equation 122, a transformed equation of motion 123 is provided.

Transformation of Variable $$\begin{cases} \psi_{1,n}(T) = y_n(T) \\ \psi_{2,n}(T) = \dot{y}_n(T) \end{cases} \quad 122$$

Transformed Equation of Motion $$\begin{bmatrix} \dot{\psi}_{1,n}(T) \\ \dot{\psi}_{2,n}T \end{bmatrix} = \begin{bmatrix} \psi_{2,n}(T) \\ F_u(n) + F_k(n) - \mu\psi_{2,n}(T) \end{bmatrix}, \forall n \in N \quad 123$$

$$\begin{bmatrix} \psi_{1,n}(0) \\ \psi_{2,n}(0) \end{bmatrix} = \begin{bmatrix} Vn \\ 0 \end{bmatrix}$$

where $\psi_{1,n}(T), \psi_{2,n}(T)$ indicate a position and rate of yn(T) respectively.

A scheme of the Euler method for the normal differential equation 124 is represented by the following equation 125.

[EQUATION 122]]

$$\dot{x}(t) = F(x(t), t) \quad 124$$

A Scheme of Euler Method $$x^{(n+1)} = x^{(n)} + hF(x^{(n)}, t) \quad 125$$

This progresses a solution from $t^{(n)}$ to $t^{(n+1)} \equiv t^{(n)} + h$.

x(n) shows a step and h indicates a step size. When the scheme of the Euler method is applied to the equation 123, an updated equation of the following equation 126 is provided.

Update Equation Due to Euler Method

The update equation is solved repeatedly, so that a convergence state can be obtained.

The interpolation frame generation step is explained. This step adopts a method similar to Digital Image Warping 1 ["J. Nieweglowski, P. Haavisto, "Motion Compensated Video Sequence Interpolation Using Digital Image Warping", IEEE Acoustics, Speech, and Signal Processing, vol. 5, p 205-208, 1994", "J. Nieweglowski, T. George Campbell, P. Haavisto, "A Novel Video Coding Sheme Based on Temporal Prediction Using Digital Image Warping", IEEE Transactions on, Volume: 39 Issue: 3, August 1993"].

In the Digital Image Warping, a motion vector is obtained for each point of a rectangle, the rectangle is divided into two triangles, and affine transformation is computed on the basis of three vertexes for each triangle. A triangular image to be interpolated by the affine transformation is obtained.

The affine transformation from a triangle having vertexes $V = \{(u_i, v_i)^T, (i=0,1,2)\}$ to a triangle having vertexes $Y = \{(x_i, y_i)^T, (i=0,1,2)\}$ by Digital Image Warping can be expressed by the following equation 126.

Affine Transformation $$T(V, Y) = \frac{1}{det(U)} B \begin{bmatrix} x_0 & y_0 & 1 \\ x_1 & y_1 & 1 \\ x_2 & y_2 & 1 \end{bmatrix} \quad 126$$

$$B = \begin{bmatrix} v_1 - v_2 & v_2 - v_0 & v_0 - v_1 \\ u_2 - u_1 & u_0 - u_2 & u_1 - u_0 \\ u_1v_2 - u_2v_1 & u_2v_0 - u_0v_2 & u_0v_1 - u_1v_0 \end{bmatrix} \quad 127$$

$$det(U) = u_0(v_1 - v_2) + v_0(u_2 - u_1) + (u_1v_2 - u_2v_1)$$

It can be computed using the affine transformation that the point $(u,v)^T$ in the triangular V corresponds to the point $(x,y)^T$ in the triangle expressed by the following equation 128.

$$[x,y,1] = [u,v,1]T(V,Y) \quad 128$$

An interpolation frame is obtained by the affine transformation. The time position of the reference frame t is set to 0, the time position of the reference frame t+lΔt is set to 1, and the time position of the interpolation frame to be interpolated is assumed to be $\Delta t_i (0 < \Delta t_i < 1)$. When the mapping g(,t;lΔt) is subjected to the linear transformation according to Δti, the following equation 129 is established.

$$g_i(x,t;l\Delta t) = x + \Delta t_i d(x,t;l\Delta t) \quad 129$$

The interpolation frame is generated as shown in FIG. 20. Assuming that a triangle having vertexes $\{g_i(x_1,t;l\Delta t), g_i(x_2,t;l\Delta t), g_i(x_3,t;l\Delta t)\}$ is W, a triangle having vertexes $\{x_1, x_2, x_3\}$ is X, and a triangle having vertexes $\{g(x_1,t;l\Delta t), g(x_2,t;l\Delta t), g(x_3,t;l\Delta t)\}$ is Y. A pixel value of a point within a triangle on the interpolation frame will be obtained. An affine transformation from the triangular W to the triangular X and an affine transformation to the triangular Y are obtained by the equation 24, and a pixel value corresponding to the point w is derived from each affine transformation. In other words, the point within the triangular X corresponding to the point w can be computed by the following equation 130.

$$\lfloor x^T 1 \rfloor = \lfloor w^T 1 \rfloor T(W,X) \quad 130$$

Similarly, the point within the triangle Y corresponding to the point w can compute by the following equation 131.

$$\lfloor y^T 1 \rfloor = \lfloor w^T 1 \rfloor T(W,Y) \quad 131$$

If a weight average of both frames is computed according to the time position, a pixel value of the interpolation frame can be computed by the following equation 132.

Interpolation frame due to a mapping g(•,t;lΔt)

$$s_p(w,t+l\Delta t_i) = \Delta t_i s_c(x,t) + (1-\Delta t_i)s_c(y,t+l\Delta t) \quad 132$$

The right side of the equation 132 is written in a form of a continuous image model. Therefore, a pixel value is computed by being interpolated by a bi-linear method to compute the right side from the discrete image model. An interpolation frame based on the mapping g(•,t;lΔt) is generated by doing this processing for all triangles in a screen.

The step of the surface reliability computation 1 is explained. The part which the spring expands is assumed to be a region having a high reliability as occlusion. On the contrary, the part which the spring does not change has a high reliability as the surface.

In practice, since the reliability in the region must be computed, the area of a triangle surrounded by the region expressed by, for example, the following equation as shown in FIG. 17 is used.

$$y_n, y_{n+(0,-1)}^T, y_{n+(-1,-1)}^T$$

The area of the original triangle is derived from the absolute value of outer product of a vector according to the following equation 133.

$$S_1(n) = \frac{1}{2}|(x_{n+(0,-1)^T} - x_n) \times (x_{n+(-1,-1)^T} - x_n)| \quad 133$$

Similarly, the area after mapping is obtained by the following equation 134.

$$S_2(n) = \frac{1}{2}|(y_{n+(0,-1)^T} - y_n) \times (y_{n+(-1,-1)^T} - y_n)| \quad 134$$

Therefore, the differential value of the area is assumed to be expressed by the following equation 135.

$$R(n) = S_2(n) - S_1(n) \quad 135$$

Assuming that the probability of surface enhances as the differential value nears to 0, and the probability of surface lowers as the differential value increases. In this case, it is convenient that if the differential value is greater than a threshold, it is set to 0, and if the differential value is smaller than the threshold, it is set to 1.

The step of the surface reliability computation 2 is explained.

The lattice point of the covered occlusion region (covered occlusion region) has a geometric characteristic to be shortened to 0 ideally. This is symmetrical with that the uncovered occlusion region (uncovered occlusion region) stretches.

The probability of reliability given by the uncovered occlusion region is associated with the expansion of the spring, so that it will be natural that the probability of reliability given by the covered occlusion region is associated with the contraction of the spring. In other words, the expansion and contraction of the spring are dealt with equivalently till now. Hereinafter, the different confidence probabilities generate according to the expansion and contraction of the spring. This seems to be natural from the symmetry of a theory Using the difference of area used in the step of the surface reliability computation 1, if the difference is greater than the threshold, it is set to 0, and if the difference is smaller than the threshold, it is set to 1. The step of the surface reliability computation 3 is explained hereinafter.

If the reliability of the mapping is positive, it is probability to seem to be reliable as the surface. This is modeled as probability of the image Sk2 under a state that the mapping g(x) is provided to the lattice point x. Generally, this is called likelihood. Assuming that a noise is added to an observed image, the pixel values of the lattice point x and mapping g(x) are expressed by the following equation 136.

$$g_1 = s_{k_1}(x) + \epsilon_1$$

$$g_2 = s_{k_2}(g(x)) + \epsilon_2 \quad 136$$

where $\epsilon_1, \epsilon_2$ are additive noises.

Displaced Pixel Difference (referred to as DPD hereinafter) is modeled as shown by the following equation 137.

$$r(g(x), x) = g_2 - g_1 \quad 137$$

$$= s_{k_2}(g(x)) - s_{k_1}(x) + (\epsilon_2 - \epsilon_1)$$

$$= s_{k_2}(g(x)) - s_{k_1}(x) + \epsilon$$

If this DPD is smaller than the threshold, the mapping is probable. Accordingly, the probability is set to 1. If DPD is greater than the threshold, the probability is set to 1. A configuration is explained referring to FIG. 25.

Because the forward matching (42) and the backward matching (43) differ only in an input frame, the matching step with occlusion is summed up as follows. In the case of the forward matching, the input frame needs not re-read, but in the backward matching, the input frame is re-read as indicated by the following equation:

$$t+l\Delta t \to t$$

$$t \to t+l\Delta t$$

$$t-l\Delta t \to t+2l\Delta t$$

A subscript f is added to an output result in the forward matching, and a subscript b is added to the output result in the backward matching.

Figure 35:
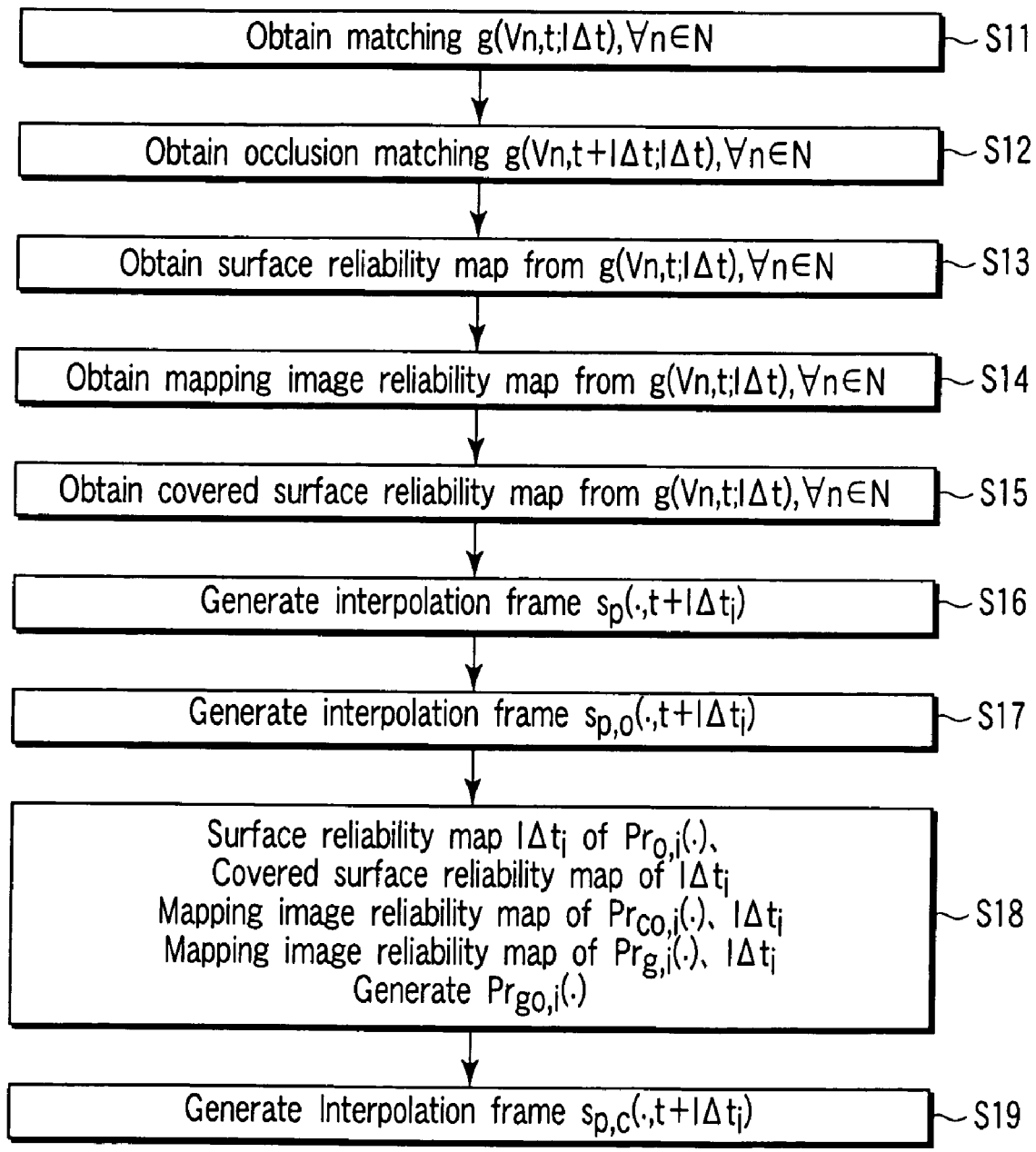
FIG. 35 is a flow chart for explaining an image matching method according to a fourth embodiment.

Matching step with occlusion (FIG. 35)

The matching $g(Vn,t;l\Delta t), \forall n \in N$ is derived from $t \mapsto t+l\Delta t$ by the matching step (later described) (S11).

2. The occlusion matching $g(Vn,t+l\Delta t;l\Delta t), \forall n \in N$ is derived from $t+l\Delta t \mapsto t+2l\Delta t$ by an occlusion matching step (the same as the matching step) (S12).

A surface reliability map is derived from $g(Vn,t;l\Delta t), \forall n \in N$ by the step of the surface reliability computation 1 (S13).

(a) The area $S_1(n)$ of a quadrilateral $Quad(Vn, V(n+(1,0)^T), V(n+(1,1)^T), V(n+(0,1)^T))$ is obtained, the area $S_2(n)$ of a quadrilateral $Y=Quad(g(Vn,t;l\Delta t), g(V(n+(1,0)^T), t;l\Delta t), g(V(n+(1,1)^T), t;l\Delta t), g(V(n+(0,1)^T), t;l\Delta t))$ is obtained, and a difference $R(n)=S_2(n)-S_1(n)$ between the areas is computed.

(b) The surface probability inside the quadrilateral is obtained with respect to a threshold T1.

$$Pr_o = \begin{cases} 1 & R(n) < T_1 \\ 0 & R(n) > T_1 \end{cases}$$

(c) A result is stored in the surface reliability map.

$$Pr_o(y) = Pr_o \forall y \in \{Y \cap Vn' | \forall n' \in N\}$$

(e) The above-mentioned processing is carried out for the whole screen**.

2. A mapping reliability map is derived from $g(Vn,t;l\Delta t), \forall n \in N$ by the step of the surface reliability computation 3 (S14).

(a) The probability of the mapping is obtained with respect to a threshold T3.

$$Pr_g = \begin{cases} 1 & r(n) < T_3 \\ 0 & r(n) > T_3 \end{cases}$$

$$r(n) = s_p(Vn, t) - s_c(g(Vn, t; l\Delta t), t+l\Delta t)$$

(b) A result is stored in the mapping reliability map.

$$Pr_g(Vn) = Pr_g$$

(c) The above-mentioned processing is carried out for the whole screen $\forall n \in N$.

3. A mapping reliability map is derived from $g(Vn,t+l\Delta t; l\Delta t), \forall n \in N$ by a step of the surface reliability computation 3 (S15).

(a) The probability of the mapping is obtained with respect to the threshold T3.

$$Pr_g = \begin{cases} 1 & r(n) < T_3 \\ 0 & r(n) > T_3 \end{cases}$$

$$r(n) = s_p(Vn, t + l\Delta t) - s_c(g(Vn, t + l\Delta t; l\Delta t), t + 2l\Delta t)$$

(b) A result is stored to a mapping reliability map.

$$Pr_{go}(Vn) = Pr_g$$

(c) The above-mentioned processing is done for the whole screen $\forall n \in N$.

4. A covered surface reliability map is derived from $g(Vn, t; l\Delta t), \forall n \in N$ by the step of the surface reliability computation (S16).

(a) The area $S_1(n)$ of a quadrilateral $X = Quad(Vn, V(n+(1,0)^T), V(n+(1,1)^T), V(n+(0,1)^T))$ is obtained, the area $S_2(n)$ of a quadrilateral $Quad(g(Vn,t;l\Delta t), g(V(n+(1,0)^T), t; l\Delta t), g(V(n+(1,1)^T, t; l\Delta t), g(V(n+(0,1)^T), t; l\Delta t))$ is obtained, and a difference $R(n) = S_2(n) - S_1(n)$ between the areas is computed.

(b) The surface probability inside the quadrilateral is obtained with respect to a threshold T2.

$$Pr_{co} = \begin{cases} 1 & R(n) > T_2 \\ 0 & R(n) < T_2 \end{cases}$$

(c) A result is stored in the covered surface reliability map.

$$Pr_{co}(x) = Pr_{co}, \forall x \in \{X \cap Vn' | \forall n' \in N\}$$

(d) The above-mentioned processing is done for the whole screen $\forall n \in N$.

5. $g_i(x,t;l\Delta t) = x + \Delta t_i d(x,t;l\Delta t)$ is obtained for $\forall n \in N$ by the interpolation frame generation step (described later), and an interpolation frame $s_p(\bullet, t+l\Delta t_i)$ is generated (S17).

6. $g_{i,o}(x\ t+l\Delta t; -l\Delta t) = x - (1-\Delta t_i)d(x,t+l\Delta t;l\Delta t)$ is obtained for $\forall n \in N$ by the interpolation frame generation step (described later), and an interpolation frame $s_{p,o}(\bullet, t+l\Delta t)$ is generated (S18).

7. Surface reliability map $Pr_{o,i}(\bullet)$ of $l\Delta t_i$ is generated.

Covered surface reliability map $Pr_{co,i}(\bullet)$ of $l\Delta t_i$ is generated.

Mapping reliability map $Pr_{g,i}(\bullet)$ of $l\Delta t_i$ is generated.

Mapping reliability map $Pr_{go,j}(\bullet)$ of $l\Delta t_i$ is generated. (S19)

(a) The following triangles are obtained.

$$X = Tri(Vn, V(n+(1,0)^T), V(n+(1,1)^T))$$

$$W = Tri(g_i(Vn,t;l\Delta t), g_i(V(n+(1,0)^T)t;l\Delta t), g_i(V(n+(1,1)^T), t;l\Delta t))$$

$$Y = Tri(g(Vn,t;l\Delta t), g(V(n+(1,0)^T), t;l\Delta t), g(V(n+(1,1)^T), t; l\Delta t))$$

(b) Affine transformation $T(W,Y), T(W,X)$ is obtained.

(c) $\lfloor y^T\ 1 \rfloor = \lfloor w^T\ 1 \rfloor T(W,Y)$ is obtained for $\forall w \in \{W \cap Vn' | \forall n' \in N\}$ and stored in $Pr_{o,y}(w) = Pr_o(y)$.

$\lfloor x^T\ 1 \rfloor = \lfloor w^T\ 1 \rfloor T(W,X)$ is obtained and stored in $Pr_{g,i}(w) = Pr_g(x)$.

It is stored in $Pr_{go,i}(w) = Pr_{go}(y)$.
It is stored in $Pr_{co,i}(w) = Pr_{co}(x)$.

(d) The above-mentioned processing is done for the whole screen $\forall n \in N$.

A combination step is explained.

8. combination is carries out to generate an interpolation frame $s_{p,c}(\bullet, t+l\Delta t_i)$.

(a) The probabilities of the surface side and the occlusion side are obtained as probability of the product event (S20).

$$Pr_1 = Pr_{f,co,i}(Vn) Pr_{f,o,i}(Vn) Pr_{f,g,i}(Vn)$$

$$Pr_2 = (1-Pr_{b,co,i}(Vn)) Pr_{f,co,i}(Vn)(1-Pr_{f,o,i}(Vn)) Pr_{f,go,i}(Vn)$$

$$Pr_3 = Pr_{b,co,i}(Vn) Pr_{b,o,i}(Vn) Pr_{b,g,i}(Vn)$$

$$Pr_4 = (1-Pr_{f,co,i}(Vn)) Pr_{b,co,i}(Vn)(1-Pr_{b,o,i}(Vn)) Pr_{b,go,i}(Vn)$$

(b) An alpha blend coefficient for composition is lost as follows.

$$\alpha_1 = \frac{Pr_1}{Pr_1 + Pr_2} \quad (c)$$

$$\alpha_2 = \frac{Pr_2}{Pr_1 + Pr_2}$$

$$\alpha_3 = \frac{Pr_3}{Pr_1 + Pr_2}$$

$$\alpha_4 = \frac{Pr_4}{Pr_1 + Pr_2}$$

$$s_{p,c}(Vn, t + l\Delta t_i) = \alpha_1 s_{p,f}(Vn, t + l\Delta t_i) + \alpha_2 s_{p,f,o}(Vn, t + l\Delta t_i)$$
$$\alpha_3 s_{p,b}(Vn, t + l\Delta t_i) + \alpha_4 s_{p,b,o}(Vn, t + l\Delta t_i)$$

(d) The above-mentioned processing is done for the whole screen $\forall n \in N$.

Each step is described concretely according to the block diagram shown in FIG. 32.

Figure 36:
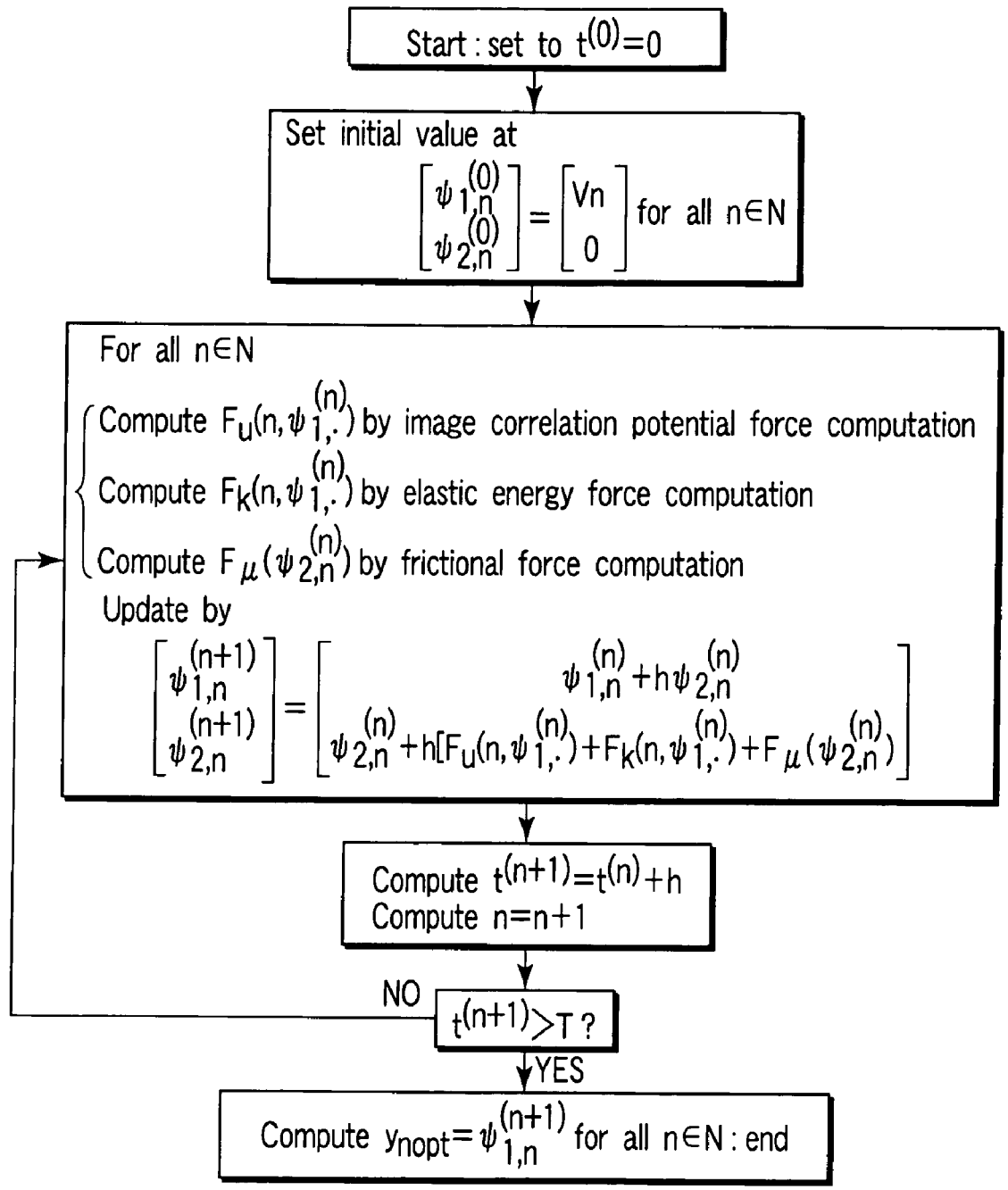
FIG. 36 is a flow chart showing a procedure of a discrete variable method.

In a discrete variable method step, a position and a speed are updated according to an update equation 126 of the discrete variable method, and a computation is done from the initial value to a predetermined time. In this embodiment, a discrete variable method based on Euler method is used. Concretely, computation is performed according to a flow shown in FIG. 36. An image force computation step, an elastic energy force computation step, and a frictional force computation step are used.

In the image force computation step, a force Fu occurring by the potential energy due to the image correlation is computed.

If a position and mapping $n, \psi_{1,\bullet}^{(n)}$ in a certain step are input, Fu is computed according to the equation 110 by the following equation 138.

$$F_u(n) = \frac{(s_{k_2,c}(y_{min}) - s_{k_2,c}(\psi_{1,n}^{(n)}))^2}{\|u_d\|} u_d \qquad 138$$

$$u_d = y_{min} - \psi_{1,n}^{(n)}$$

$$y_{min} = \underset{y \in \Omega}{\arg\min}(s_{k_2,p}(y) - s_{k_1,p}(Vn))^2$$

$$\Omega = \{\psi_{1,n}^{(n)}, y_c + 1 | \forall\ 1 \in L\}$$

$$y_c \lfloor \psi_{1,n}^{(n)} + \begin{bmatrix} 0.5 \\ 0.5 \end{bmatrix} \rfloor$$

-continued $$L = \left\{ \begin{bmatrix} -1 \\ -1 \end{bmatrix}, \begin{bmatrix} 0 \\ -1 \end{bmatrix}, \begin{bmatrix} 1 \\ -1 \end{bmatrix}, \begin{bmatrix} -1 \\ 0 \end{bmatrix}, \begin{bmatrix} 0 \\ 0 \end{bmatrix}, \begin{bmatrix} 1 \\ 0 \end{bmatrix}, \begin{bmatrix} -1 \\ 1 \end{bmatrix}, \begin{bmatrix} 0 \\ 1 \end{bmatrix}, \begin{bmatrix} 1 \\ 1 \end{bmatrix} \right\}$$

Figure 37:
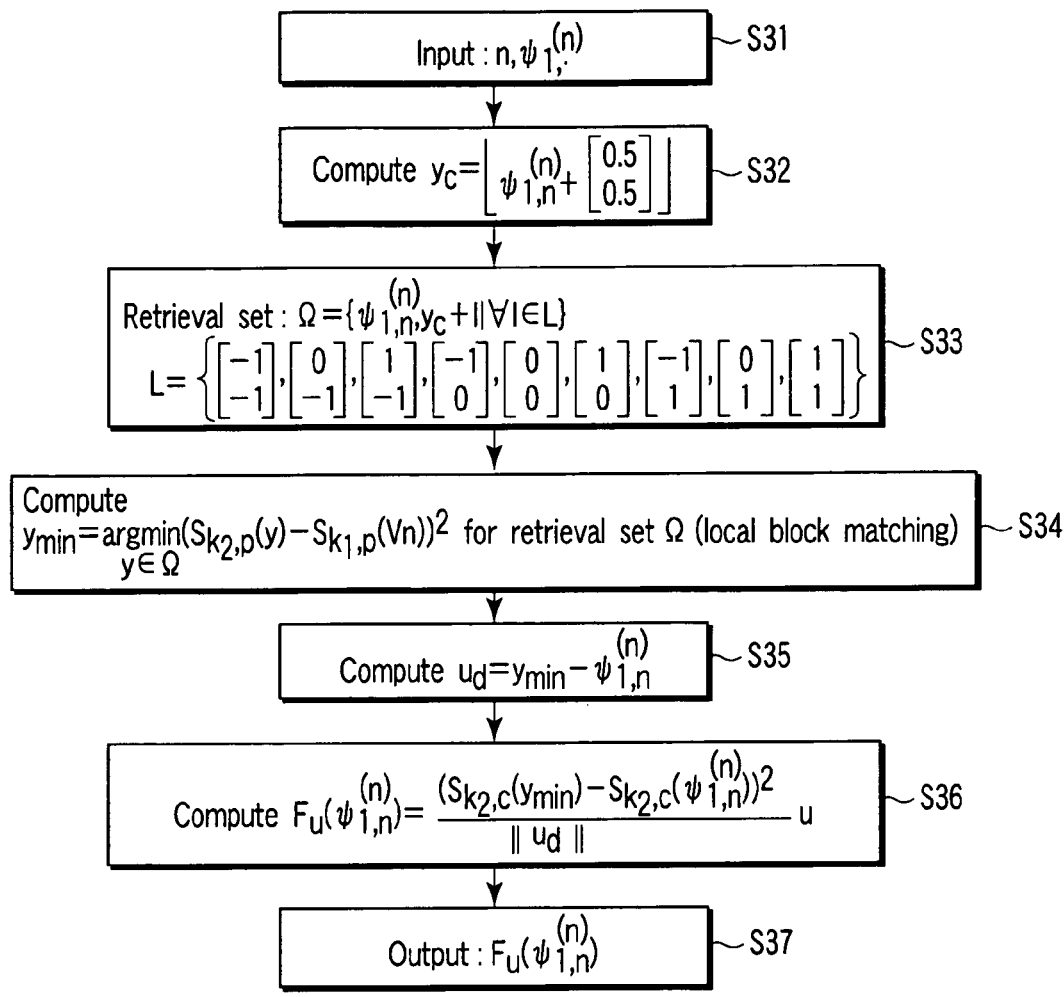
FIG. 37 is a flow chart showing a procedure for computing a power generated by a potential energy in an image correlation.

Concretely, computation is carried out according to a flow chart shown in FIG. 37. This computation may be carried out according to the equation 112. In the elastic energy force computation step, a force Fk occurring by the elastic energy is computed.

If a position and mapping $n, \psi_{1,\cdot}^{(n)}$ in a certain step are input, Fk is computed according to the equation 18 by the following equation 139.

$$F_k(n) = k\left(\psi_{1,n+\begin{bmatrix}0\\-1\end{bmatrix}}^{(n)} - \psi_{1,n}^{(n)}\right) + k\left(\psi_{1,n+\begin{bmatrix}-1\\0\end{bmatrix}}^{(n)} - \psi_{1,n}^{(n)}\right) + k\left(\psi_{1,n+\begin{bmatrix}1\\0\end{bmatrix}}^{(n)} - \psi_{1,n}^{(n)}\right) + k\left(\psi_{1,n+\begin{bmatrix}0\\1\end{bmatrix}}^{(n)} - \psi_{1,n}^{(n)}\right)$$ 139

Figure 38:
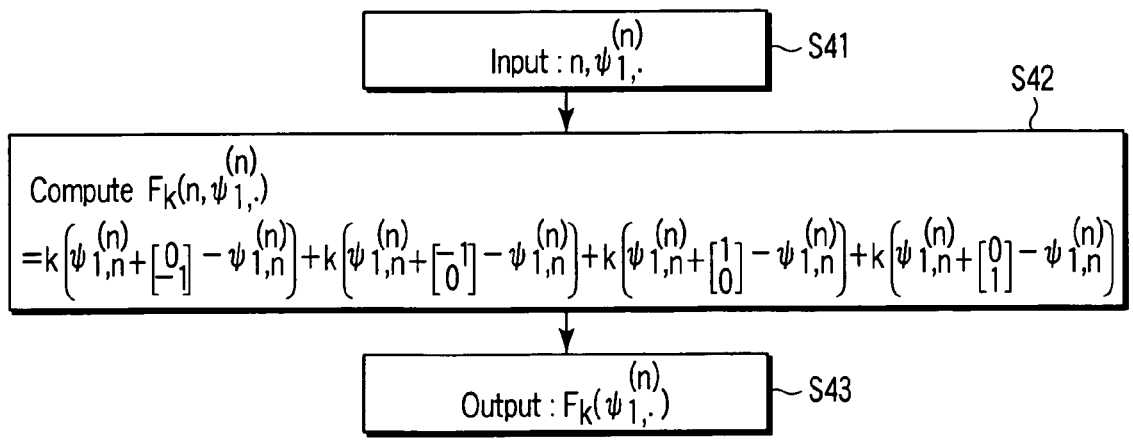
FIG. 38 is a flow chart showing a procedure for computing a power due to elasticity energy.

Concretely, computation is carried out according to a flow shown in FIG. 38.

In the frictional force computation step, the force $F_\mu$ occurring by dynamical friction is computed.

When a speed $\psi_{2,n}^{(n)}$ in a certain step is input, Fu is computed by the following equation 140.

$$F_\mu(\psi_{2,n}^{(n)}) = -\mu\psi_{2,n}^{(n)}$$ 140

Figure 39:
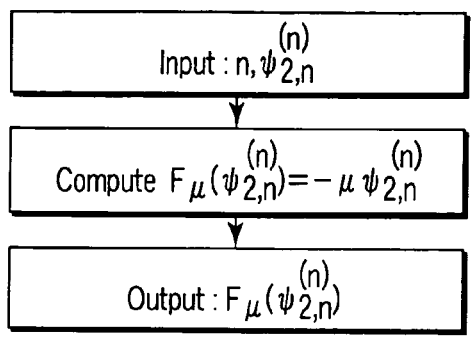
FIG. 39 is a flow chart showing a procedure for computing a frictional force.

Concretely, computation is carried out according to a flow shown in FIG. 39.

Figure 40:
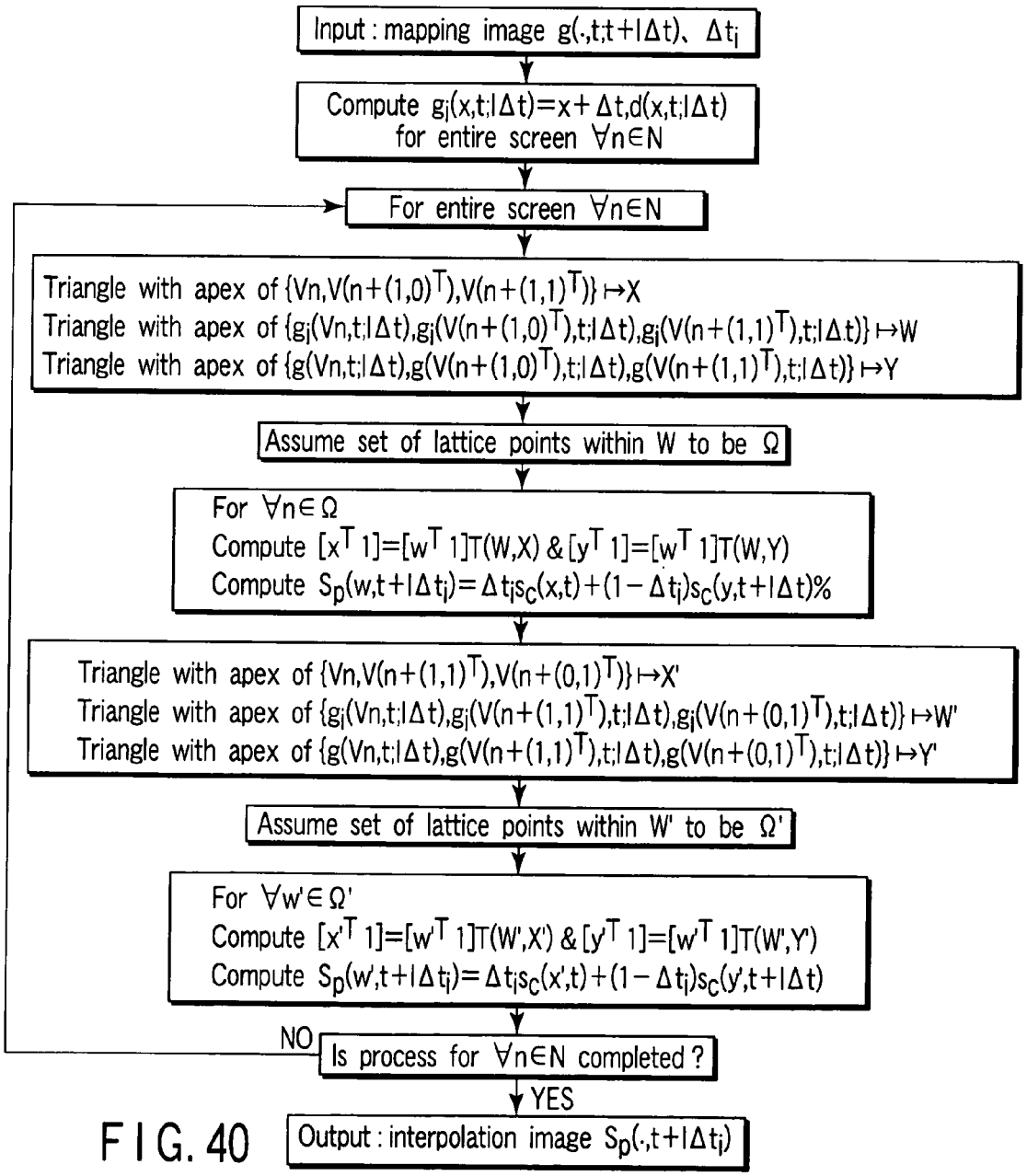
FIG. 40 is a flow chart showing a procedure of interpolation computation.

In an interpolation frame generation step, an interpolation image of a $0 \leq \Delta t_i \leq 1$ position is generated by the obtained mapping. Computation is carried out according to a flow of FIG. 40 concretely.

The present embodiment can provide a robust and high-quality interpolation frame and interpolate an appropriate image in an occlusion region as mentioned above.

Fifth Embodiment

The present embodiment is explained referring to the block diagram of FIG. 25. In the fourth embodiment, randomization with respect to the threshold is done in surface reliability computation steps 1, 2, 3. In this case, if the surface reliability is greater than a threshold, the probability is set at 1, and if it is not more than the threshold, the probability is set at 0. In other words, the probability can be expressed by the binary only. For this reason, the present embodiment uses the following sigmoid function in order to provide a more smooth probability expression of high precision.

$$Pr(x) = \frac{1}{1 + \exp(-\alpha(x - \beta))}$$ 141 where $\alpha$ indicates a gradient and $\beta$ indicates a center. For example, $\alpha = 30.0$ and $\beta = 0.25$ can be used. The following part is changed from the third embodiment.

The step of the surface reliability computation 1.

(a) The area $S_1(n)$ of quadrilateral Quad(Vn,V(n+(1,0)T), V(n+(1,1)$^T$),V(n+(0,1)$^T$)) and the area $S_2(n)$ of quadrilateral Y=Quad(g(Vn,t; $l\Delta t$),g(V(n+(1,0)$^T$),t; $l\Delta t$),g(V(n+(1,1)$^T$),t; $l\Delta t$),g(V(n+(0,1)$^T$),t;$l\Delta t$)) are obtained, and a difference $R(n) = S_2(n) - S_1(n)$ between the areas is computed.

(b) The surface probability of the quadrilateral inside is obtained by the next expression.

$$Pr_o = \frac{1}{1 + \exp(\alpha_1(R(n) - \beta_1))}$$

(c) A result is stored in the surface reliability map as follow:

$Pr_o(y) = Pr_o, \forall y \in \{Y \cap Vn' | \forall n' \in N\}$ (d) The above processing is done about the whole screen $\forall n \in N$.

A mapping reliability map is obtained from $g(Vn,t;l\Delta t)$, $\forall n \in N$ by the step of surface reliability computation 3.

(a) The probability of mapping is obtained according to the following equation:

$$Pr_g = \frac{1}{1 + \exp(\alpha_3(r(n) - \beta_3))}$$

$r(n) = s_p(Vn, t) - s_c(g(Vn, t; l\Delta t), t + l\Delta t)$ (b) A result is stored in the mapping reliability map as shown by the following equation.

$Pr_g(Vn) = Pr_g$ (c) The above processing is done about the whole screen $\Delta n \in N$.

(d) A mapping reliability map is obtained from $g(Vn,t+l\Delta t; l\Delta t), \forall n \in N$ by the step of surface reliability computation 3.

(e) The probability of mapping is obtained with respect to the threshold T3 as represented by the following equation:

$$Pr_g = \frac{1}{1 + \exp(\alpha_3(r(n) - \beta_3))}$$

$r(n) = s_p(Vn, t + l\Delta t) - s_c(g(Vn, t + l\Delta t; l\Delta t), t + 2l\Delta t)$ (f) The result is stored in the mapping reliability map as represented by the following equation.

$Pr_{go}(Vn) = Pr_g$ (g) The above processing is done about the whole screen $\forall n \in N$.

Step of surface reliability computation 2.

(a) The area $S_1(n)$ of quadrilateral X=Quad(Vn,V(n+ (1,0)$^T$),V(n+(1,1)$^T$),V(n+(0,1)$^T$)) is obtained and the area $S_2(n)$ of quadrilateral Quad(g(Vn,t;l$\Delta$t),g(V(n+(1,0)$^T$),t;l$\Delta$t), g(V(n+(1,1)$^T$),t;l$\Delta$t),g(V(n+(0,0)$^T$),t;l$\Delta$t)) is obtained. A difference between these areas is computed.

(b) Surface probability of the quadrilateral inside is obtained with respect to the threshold T2 by the following equation.

$$Pr_{co} = \begin{cases} 1 & R(n) > T_2 \\ 0 & R(n) < T_2 \end{cases}$$

(c) A result is stored in a covered surface reliability map.

$Pr_{co}(x)=Pr_{co}, \forall x \in \{X \cap Vn'|\forall n' \in N\}$ (e) The above-mentioned processing is done about the whole screen $\forall n \in N$.

The present embodiment can provide an interpolation frame of higher image quality because the more smooth probability map is provided.

Sixth Embodiment

The present embodiment is explained referring to the block diagram of FIG. 25.

In the present embodiment, the more robust surface reliability is obtained by describing the probability of surface reliability as a probability distribution according to a Gaussian distribution.

About the step of surface reliability computation 1.

The part that a spring expands is assumed to be a region having a high reliability as occlusion, in other words, the part which the spring does not change has a high reliability as the surface.

Actually, an area of the triangle surrounded by, for example, three points $y_n$, $y_{n+(0,-1)}{}^T$, $y_{n+(-1,-1)}{}^T$ as shown in FIG. 17 are used, because reliability in the region must be computed. An area of an original triangle is obtained by an absolute value of outer product of a vector as follows;

$$S_1(n) = \frac{1}{2}\left|\left(x_{n+(0,-1)^T} - x_n\right) \times \left(x_{n+(-1,-1)^T} - x_n\right)\right|$$

Similarly, the area of the triangle after mapping is obtained as follows:

$$S_2(n) = \frac{1}{2}\left|\left(y_{n+(0,-1)^T} - y_n\right) \times \left(y_{n+(-1,-1)^T} - y_n\right)\right|$$

Therefore, a differential value between the areas is computed by the following equation.

$R(n)=S_2(n)-S_1(n)$

Assuming that the surface probability increases as the differential value draws closer to 0, and the surface probability decreases as the differential value increases. If the differential value is 0 in average and accords to the Gaussian distribution of dispersion $\sigma^2$, it is proper. Therefore, the probability density function of the differential value R is modeled as follows.

$$p(R) = \frac{1}{\sqrt{2\pi\sigma^2}} \exp\left(-\frac{R^2}{2\sigma^2}\right)$$

Because this is a probability density function, a distribution function is expressed by the following equation:

$$P(x) = \int_{-\infty}^{x} p(v)dv$$

Therefore, the probability that the differential value R(n) is between a and b is given by the following equation:

$Pr(a \leq R(n) < b) = P(b) - P(a)$

If the reliability when the differential value R(n)=0 is provided will be 95%, the following equation may be concluded.

$Pr(-1.96\sigma \leq R(n) < 1.96\sigma) = P(1.96\sigma) - P(-1.96\sigma) = 0.95$ Accordingly, the surface probability when a certain differential value is given is defined by the following equation 142:

Surface Probability $Pr(R(n)-1.96\sigma \leq R(n) < R(n)+1.96\sigma) = P(R(n)+1.96\sigma) - P(R(n)-1.96\sigma)$  (142)

Because this is the reliability of the surface inside the triangle, this is assigned to the inside of the triangle and stored in a memory.

Because when the triangle $y_n$, $y_{n+(0,-1)}{}^T$, $y_{n+-1,-1}{}^T$ having the lattice point n as a reference is assumed to be Y, the lattice point inside this triangle can be expressed by $y \in \{Y \cap Vn'|\forall n' \in N\}$. Accordingly, the reliability map of the surface is built up using this lattice point as follows.

$Pr_o(y) = Pr(R(n)-1.96\sigma \leq R(n) < R(n)+1.96\sigma),$
$\forall y \in \{Y \cap Vn'|\forall n' \in N\}$ Surface reliability computation 3 is described. The reliability of mapping is modeled as probability.

This is modeled as plausibility of the image $S_{k2}(.)$ under the state that the mapping g(x) is given to the lattice point x. Generally, this is called likelihood.

Assuming that an observed image contains a noise, pixel values of the lattice point x and mapping g(x) are expressed by the following equations:

$g_1 = s_{k1}(x) + \epsilon_1$ $g_2 = s_{k2}(g(x)) + \epsilon_2$ where $\epsilon_1$, $\epsilon_2$ indicate additivity noises.

Displaced Pixel Difference (referred to as DPD hereinafter) is modeled as follows.

$$\begin{aligned}r(g(x), x) &= g_2 - g_1 \\ &= s_{k_2}(g(x)) - s_{k_1}(x) + (\varepsilon_2 - \varepsilon_1) \\ &= s_{k_2}(g(x)) - s_{k_1}(x) + \varepsilon\end{aligned}$$

Assuming that the observed noise is 0 in average and accords to the Gaussian distribution of dispersion $\sigma 2$, likelihood of a certain DPDx can be described as a probability density function (pdf) as expressed by the following equation 143.

Likelihood $$p(x) = (2\pi\sigma^2)^{-\frac{1}{2}} \exp\left\{-\frac{x^2}{2\sigma^2}\right\}$$  (143)

Because this is a probability density function, the distribution function is described by the following equation.

$$P(x) = \int_{-\infty}^{x} p(v)dv$$

Therefore, a probability that the DPD r(g(x),x) exists between a and b is determined by the following equation.

$Pr(a \leq r(g(x),x) < b) = P(b) - P(a)$

If in true mapping $\tilde{g}(x)$ the differential value between corresponding pixels becomes zero, DPD in $\tilde{g}(x)$, that is, the true DPD$\tilde{r}(\tilde{g}(x),x)$ is $\tilde{r}(\tilde{g}(x),x)=\epsilon$. In other words, the true DPD$\tilde{r}(\tilde{g}(x),x)$ is equal to a noise component. Therefore, $\tilde{r}(\tilde{g}(x),x)$ is to be 0 in average and accord to the Gaussian distribution of dispersion $\sigma^2$. The reliability in the true DPD $\tilde{r}(\tilde{g}(x),x)$ is set by the confidence interval of the Gaussian distribution. For example, when the reliability of 95% will be given to the true DPD$\tilde{r}(\tilde{g}(x),x)$, it may be expressed by the following equation.

$$Pr(-1.96\sigma \leq \tilde{r}(g(x),x)<1.96\sigma)=P(1.96\sigma)-P(-1.96\sigma)=0.95$$

Therefore, the probability of the mapping $g(x)$ when DPD is provided may be defined by the following equation 144.

Probability of Mapping $g(x)$ $$Pr(r(g(x),x)-1.96\sigma \leq r(g(x),x)<r(g(x),x)+1.96\sigma)=P(r(g(x),x)+1.96\sigma)-P(r(g(x),x)-1.96\sigma) \qquad 144$$

Surface reliability computation 2 is described.

Covered occlusion (covered occlusion) is a transformed and compressed region.

The quadrilateral is defined as follows:

$$Quad_1=Quad(x_n,x_{n+(1,0)^T},x_{n+(1,1)^T},x_{n+(0,1)^T})$$

The transformed quadrilateral is defined as follows $$Quad_2=Quad(y_n,y_{n+(1,0)^T},y_{n+(1,1)^T},y_{n+(0,1)^T})$$

The difference between these areas is represented by the following equation.

$$R(n)=S(Quad_2)-S(Quad_1)$$

where S represents an operator for computing an area. If this differential value $r(n)$ is a negative, the occlusion is compressed.

If the whole screen is a single area, the distribution of differential value $R(n)$ looks good according to the Gaussian distribution. If the screen comprises a plurality of regions, and the covered occlusion occurs, the differential value $R(n)$ between the regions may be distributed as outlier. Therefore, the probability that it is the surface builds reliability to be high so that the differential value $R(n)$ is almost zero.

Probability density function of differential value R is modeled as follows.

$$p(R)=\frac{1}{\sqrt{2\pi\sigma^2}}\exp\left(-\frac{R^2}{2\sigma^2}\right)$$

Because this is a probability density function, a distribution function is expressed by the following equation:

$$P(x)=\int_{-\infty}^{x}p(v)dv$$

Therefore, the probability that the differential value $R(n)$ is between b and a is represented by the following equation:

$$Pr(a \leq R(n)<b)=P(b)-P(a)$$

If the reliability when the differential value $R(n)=0$ is obtained will be 95%, the following equation is preferable.

$$Pr(-1.96\sigma \leq R(n)<1.96\sigma)=P(1.96\sigma)-P(-1.96\sigma)=0.95$$

Surface probability when the differential value is obtained is defined by the following equation 145.

Surface Probability $$Pr(R(n)-1.96\sigma \leq R(n)<R(n)+1.96\sigma)=P(R(n)+1.96\sigma)-P(R(n)-1.96\sigma) \qquad 145$$

Real constitution seems to become not more than.

One Surface Reliability Computation Step (a) An area $S_1(n)$ of the quadrilateral $Quad(Vn,V(n+(1,0)^T),V(n+(1,1)^T),V(n+(0,1)^T))$ and an area $S_2(n)$ of the quadrilateral $Y=Quad(g(Vn,t;l\Delta t),g(V(n+(1,0)^T),t;l\Delta t),g(V(n+(1,1)^T),t;l\Delta t),g(V(n+(0,1)^T),t;l\Delta t))$ are obtained. A difference $R(n)=S_2(n)-S_1(n)$ between these areas is computed.

(b) (a sample average u of $R(n), \forall n \in N$ and a sample variance $\sigma 2$ are computed from $g(Vn,t;l\Delta t), \forall n \in N$)

(c) Surface probability of the quadrilateral inside is obtained.

$$Pr_o=P(R(n)+1.96\sigma)-P(R(n)-1.96\sigma)$$

$$P(x)=\int_{-\infty}^{x}p(v)dv$$

$$p(R)=\frac{1}{\sqrt{2\pi\sigma^2}}\exp\left(-\frac{(R-\mu)^2}{2\sigma^2}\right)$$

(d) A result is stored in the surface reliability map.

$$Pr_o(y)=Pr_o, \forall y \in \{Y \cap Vn' | \forall n' \in N\}$$

(e) The above processing is done about the whole screen $\forall n \in N$.

Surface Trust Computation 3

(a) Probability of mapping is obtained.

$$Pr_g=P(r(n)+1.96\sigma)-P(r(n)-1.96\sigma)$$

$$P(x)=\int_{-\infty}^{x}p(v)dv$$

$$p(r)=\frac{1}{\sqrt{2\pi\sigma^2}}\exp\left(-\frac{r^2}{2\sigma^2}\right)$$

$$r(n)=s_p(Vn,t)-s_c(g(Vn,t;l\Delta t),t+l\Delta t)$$

(b) A result is stored in the mapping reliability map.

$$Pr_g(Vn)=Pr_g$$

(c) The above processing is done about the whole screen $\forall n \in N$.

A mapping reliability map is obtained from $g(Vn,t+l\Delta t; l\Delta t), \forall n \in N$ by the surface reliability computation 3.

(a) Probability of representation is found.

$$Pr_g=P(r(n)+1.96\sigma)-P(r(n)-1.96\sigma)$$

$$P(x)=\int_{-\infty}^{x}p(v)dv$$

$$p(r)=\frac{1}{\sqrt{2\pi\sigma^2}}\exp\left(-\frac{r^2}{2\sigma^2}\right)$$

$$r(n)=s_p(Vn,t+l\Delta t)-s_c(g(Vn,t+l\Delta t;l\Delta t),t+2l\Delta t)$$

(b) A result is stored in the mapping reliability map.

$$Pr_{go}(Vn)=Pr_g$$

(c) The above processing is done about the whole screen $\forall n \in N$.

Surface Reliability Computation 2

(a) An area $S_1(n)$ of the quadrilateral $X=Quad(Vn,V(n+(1,0)^T),V(n+(1,1)^T),V(n+(0,1)^T))$ and an area $S_2(n)$ of the quadrilateral $Quad(g(Vn,t;l\Delta t),g(V(n+(1,0)^T),t; l\Delta t),g(V(n+(1,1)^T),t;l\Delta t)g(V(n+(0,1)^T),t;l\Delta t))$. A difference $R(n)=S_2(n)-S_1(n)$ between the areas is computed.

(b) Surface probability of the quadrilateral inside is obtained with respect to the threshold T2.

(c) A result is stored in the covered surface reliability map.

$$Pr_{co}(x)=Pr_{co}, \forall x \in \{X \cap Vn' | \forall n' \in N\}$$

(d) The above processing is done about the whole screen $\forall n \in N$.

As described above, according to the present embodiment, the probability of the surface reliability is described as a probability distribution according to the Gaussian distribution, whereby the more robust surface reliability can be obtained and the interpolation frame of higher image quality more can be provided.

Seventh Embodiment

The present embodiment is explained referring to the block diagram of FIG. 25.

In the case of the image wherein the background remains stationary, a part that an occlusion region can occur is only a part which changes between frames. The part which changes between frames can be detected by detecting a difference between the frames. Therefore, the surface reliability can be computed from the difference between the frames.

Surface reliability computation 4 is explained. An observed image is assumed to contain a noise, and a pixel value between frames is expressed by the following equation.

$$g_1 = s_{k_1}(x) + \epsilon_1$$

$$g_2 = s_{k_2}(x) + \epsilon_2$$

where $\epsilon 1, \epsilon 2$ each are an additivity noise.

Pixel Difference (referred to as PD hereinafter) is modeled as follows.

$$\begin{aligned} r(x) &= g_2 - g_1 \\ &= s_{k_2}(x) - s_{k_1}(x) + (\varepsilon_2 - \varepsilon_1) \\ &= s_{k_2}(x) - s_{k_1}(x) + \varepsilon \end{aligned}$$

If this PD is smaller than a threshold, the probability can be set to 1, and if it is greater than the threshold, it can be set to 0.

The modeling is not the above threshold modeling but may be the following method according to the Gaussian distribution model. Assuming that an observed noise is 0 in average, and accords to the Gaussian distribution of dispersion σ2, likelihood of a certain PDx can be described as a probability density function (pdf) by the following equation 146.

Likelihood $$p(x) = (2\pi\sigma^2)^{-\frac{1}{2}} \exp\left\{-\frac{x^2}{2\sigma^2}\right\} \qquad 146$$

Because this is a probability density function, the distribution function is expressed by the following equation.

$$P(x) = \int_{-\infty}^{x} p(v) dv$$

Therefore, the probability that PDγ(x) is between a and b is expressed by the following equation.

$$Pr(a \leq r(x) < b) = P(b) - P(a)$$

Assuming that a differential value between corresponding pixels becomes zero in a stationary region, the stationary PD is equal to a noise component. Therefore, the stationary PD is 0 in average and accords to the Gaussian distribution of dispersion σ2 from definition of a noise. The reliability in the stationary PD is set by a confidence interval of the Gaussian distribution. For example, if the reliability of 95% will be given to the stationary PD, the following equation may be established.

$$Pr(-1.96\sigma \leq r(x) < 1.96\sigma) = P(1.96\sigma) - P(-1.96\sigma) = 0.95$$

Accordingly, the surface probability when a certain PD is provided is defined by the following equation 147.

Surface Probability $$Pr(r(x)-1.96\sigma \leq r(x) < r(x)+1.96\sigma) = P(r(x)+1.96\sigma) - P(r(x)-1.96\sigma) \qquad 147$$

The dispersion σ2 may set to a given value, and it can be obtained repeatedly from an image given by an M estimation.

Therefore, the surface reliability computation 4 is configured as follows.

Surface Trust Computation 4

(d) Probability of the stationary surface is computed.

$$Pr_{so} = P(r(n)+1.96\sigma) - P(r(n)-1.96\sigma)$$

$$P(x) = \int_{-\infty}^{x} p(v) dv$$

$$p(r) = \frac{1}{\sqrt{2\pi\sigma^2}} \exp\left(-\frac{r^2}{2\sigma^2}\right)$$

$$r(n) = s_p(Vn, t+l\Delta t) - s_p(Vn, t)$$

(e) A result is stored in a stationary surface reliability map.

$$Pr_{so}(Vn) = Pr_{so}$$

(f) The above processing is done about the whole screen $\forall n \in N$.

If the background completely stands still, it may use as it is without occlusion matching.

A combination step is improved for the fourth embodiment.

Combination is performed to generate an interpolation frame $s_{p,c}(\bullet, t+l\Delta t_i)$.

(a) Probabilities on the surface side and the occlusion side are obtained as a probability of product event.

$$Pr_1 = Pr_{so}(Vn)Pr_{f,co,i}(Vn)Pr_{f,o,i}(Vn)Pr_{f,g,i}(Vn)$$

$$Pr_2 = (1-Pr_{so}(Vn))(1-Pr_{b,co,i}(Vn))Pr_{f,co,i}(Vn)(1-pr_{f,o,i}(Vn))Pr_{f,go,i}(Vn)$$

$$Pr_3 = Pr_{so}(Vn)Pr_{b,co,i}(Vn)Pr_{b,o,i}(Vn)Pr_{b,g,i}(Vn)$$

$$Pr_4 = (1-Pr_{so}(Vn))(1Pr_{f,co,i}(Vn))Pr_{b,co,i}(Vn)(1-Pr_{b,o,i}(Vn))Pr_{b,go,i}(Vn)$$

(b) An alpha blend coefficient for combination is determined by the following equation.

$$\alpha_1 = \frac{Pr_1}{Pr_1 + Pr_2}$$

$$\alpha_2 = \frac{Pr_2}{Pr_1 + Pr_2}$$

$$\alpha_3 = \frac{Pr_3}{Pr_1 + Pr_2}$$

$$\alpha_4 = \frac{Pr_4}{Pr_1 + Pr_2}$$

$$s_{p,c}(Vn, t+l\Delta t_i) = \alpha_1 s_{p,f}(Vn, t+l\Delta t_i) + \alpha_2 s_{p,f,o}(Vn, t+l\Delta t_i)$$
$$\alpha_3 s_{p,b}(Vn, t+l\Delta t_i) + \alpha_4 s_{p,b,o}(Vn, t+l\Delta t_i)$$

(c)

(d) The above processing is done about the whole screen $\forall n \in N$.

According to the present embodiment, there is provided a high-quality interpolation frame in the case that the background stands still as mentioned above.

Eighth Embodiment

The embodiment may accord to the Gaussian distribution as in the sixth embodiment in the case that the whole screen is a single area, but needs not always accord to the Gaussian distribution in the case that it comprises a plurality of areas. For this reason, the precision may fall. Accordingly, in the present embodiment, a precision is maintained for a plurality of regions by flipping the region coming off from the Gaussian distribution by M estimation.

Covered occlusion is assumed to be a transformed and compressed region.

A quadrilateral is defined as $Quad_1 = Quad(x_n, x_{n+(1,0)}{}^T, x_{n+(1,1)}{}^T, x_{n+(0,1)}{}^T)$ and a transformed quadrilateral as $Quad_2$ $Quad(y_n, y_{n+(1,0)}{}^T, y_{n+(1,1)}{}^T, y_{n+(0,1)}{}^T)$.

The difference between the areas of these quadrilateral is assumed to be $R(n)=S(Quad_2)-S(Quad_1)$.

S indicates an operator for computing the areas.

If this differential value $R(n)$ is negative, the region is compressed.

If the whole screen is a single region, the distribution of differential value $R(n)$ is seemed to be good according to the Gaussian distribution. If the screen is formed of a plurality of regions and the covered occlusion occurs, the possibility that the differential value $R(n)$ between the regions is distributed as an outlier is high. Therefore, it is possible to built up the reliability that the probability that the region is the surface increases as the differential value $R(n)$ nears zero.

The probability density function of the differential value R is modeled as follows.

$$p(R) = \frac{1}{\sqrt{2\pi\sigma^2}}\exp\left(-\frac{R^2}{2\sigma^2}\right)$$

Because this is a probability density function, the distribution function is expressed by the following equation.

$$P(x) = \int_{-\infty}^{x} p(v)dv$$

Therefore, the probability that the differential value $R(n)$ exists between a and b is given by the following equation.

$$Pr(a \leq R(n) < b) = P(b) - P(a)$$

If the reliability when the differential value $R(n)=0$ is provided will be 95%, the following equation may be established.

$$Pr(-1.96\sigma \leq R(n) < 1.96\sigma) = P(1.96\sigma) - P(-1.96\sigma) = 0.95$$

Accordingly, the surface probability when the differential value is acquired is defined by the following equation 148.

The surface probability is defined by the following equation.

$$Pr(R(n)-1.96\sigma \leq R(n) < R(n)+1.96\sigma) = P(R(n)+1.96\sigma) - P(R(n)-1.96\sigma) \quad 148$$

This surface probability is one obtained when the whole screen is a single region.

When the probability which is not an outlier is assumed to be $w: N \to R: n \mapsto w(n)$, the surface probability in the case of a plurality of regions can be defined by the following equation 149.

$$Pr(R(n)-1.96\sigma \leq R(n) < R(n)+1.96\sigma) = w(n)(P(R(n)+1.96\sigma) - P(R(n)-1.96\sigma)) \quad 149$$

This probability w can be associated with the weight function of the M estimation. The weight function of the M estimation nears 1 as the probability nears to an average, and nears zero as the probability falls.

A modeling will be done within a frame of the M estimation.

Because it is desired to discuss on the covered occlusion, this modeling is intended for only a compression direction. In other words, the expanded region should be ignored, the modeling is intended for a point of $R(n)<1$ ($R(n)>1$ represents the expanded region).

The surface on the covered occlusion is an average of the Gaussian distribution. In other words, a gap between the model and the differential value $R(n)$ can be defined by the following equation.

$$z(n) = \frac{R(n) - \bar{R}}{\sigma}$$

According to the TuKey's Biweight method, the weight function can be expressed by the following equation.

$$w(n) = \begin{cases} \left(1 - \left(\dfrac{z(n)^2}{c^2}\right)\right) & |z(n)| < c \\ 0 & |z(n)| \geq c \end{cases}$$

where c>0 is a constant, and c=6.0 in the case of normal distribution. A sample average and a specimen deviation can be computed using the weight function by the following equation.

$$\overline{R}^{(i)} = \dfrac{1}{\sum_{n \in N} w(n)} \sum_{n \in N} w(n) R(n)$$

$$\sigma^{(i)} = \sqrt{\dfrac{1}{\sum_{n \in N} w(n)} \sum_{n \in N} w(n)\left(R(n) - \overline{R}^{(i)}\right)}$$

where the superscript expresses iteration. The M estimation is done by iterating a computation of the sample average & deviation and a computation of the weight function alternately once. When the probability is developed using a result of this M estimation, the modeling can be carried out as follows.

$$Pr = \begin{cases} 1 & z(n) > 0 \\ Pr(R(n) - 1.96\sigma^{(1)} \leq R(n) < R(n) + 1.96\sigma^{(1)}) & z(n) \leq 0 \end{cases}$$

$$Pr(R(n) - 1.96\sigma^{(1)} \leq R(n) < R(n) + 1.96\sigma^{(1)}) = w(n)(P(R(n) + 1.96\sigma^{(1)}) - P(R(n) - 1.96\sigma^{(1)}))$$

$$P(x) = \int_{-\infty}^{x} p(v) dv$$

$$p(R) = \dfrac{1}{\sqrt{2\pi\sigma^{2(1)}}} \exp\left(-\dfrac{(R^2 - \overline{R}^{(1)})^2}{2\sigma^{2(1)}}\right)$$

As described above, the present embodiment can provide an interpolation frame with a good precision even if the screen is formed of a plurality of regions.

Ninth Embodiment

The present embodiment is explained referring to the block diagram of FIG. 25, too. The above embodiment provides a method of detecting an occlusion region by the stretch and shrinkage of a spring. If the matching is done precisely, the stretch and shrinkage of the spring can be determined as a occlusion region. However, if the matching is done incorrectly, the stretch and shrinkage of the spring may cause a matching error. The present embodiment provides a method of generating a high-quality interpolation frame by detecting a matching error and compensating it.

Figure 41:
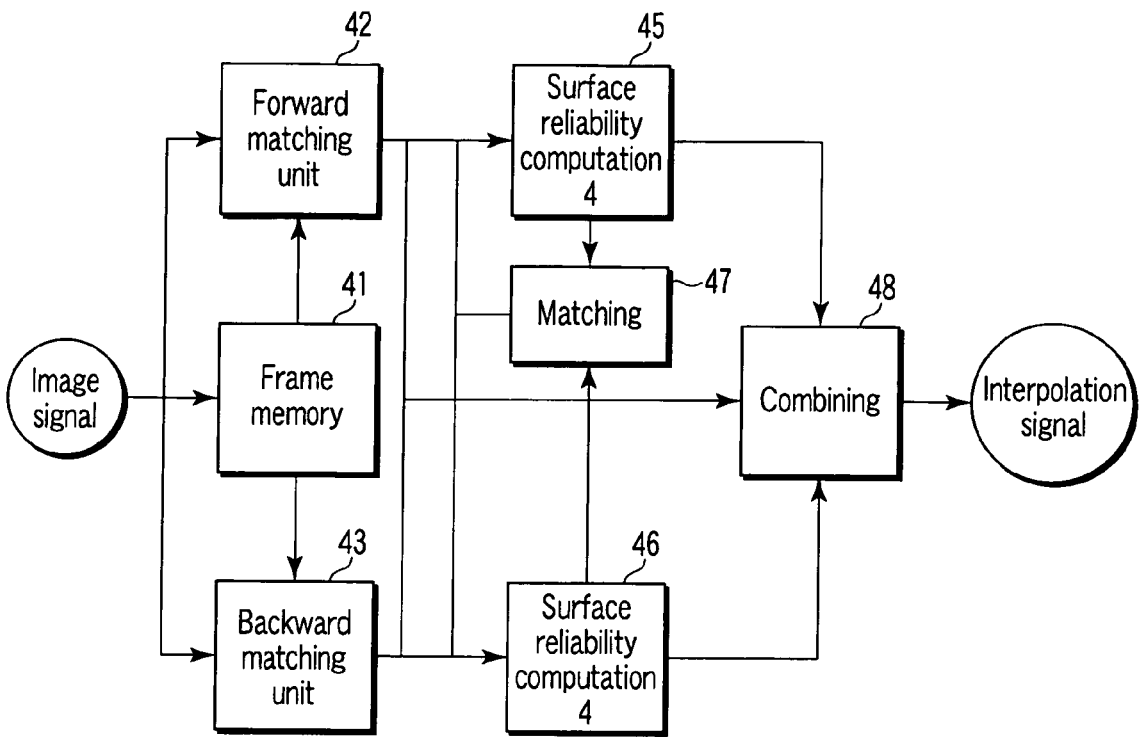
FIG. 41 is a block diagram of an image matching apparatus executing an image matching method according to a fifth embodiment.

FIG. 41 shows a block diagram of an image matching apparatus enforcing picture matching method according to the ninth embodiment. According to this, a frame memory 41 for storing an input image signal is provided. This frame memory 41 is coupled with a forward matching unit 42 and a backward matching unit 43 to the stored image signal to these matching units. The forward and backward matching units 42 and 43 are supplied with the input image signal, too, to carry out a matching process based on both signals.

The outputs of the forward and backward matching units 42 and 43 are connected to surface reliability computation units 45 and 46 respectively. The outputs of the surface reliability computation units 45 and 46 each are connected to the matching unit 47 and the combination unit 48.

Figure 42:
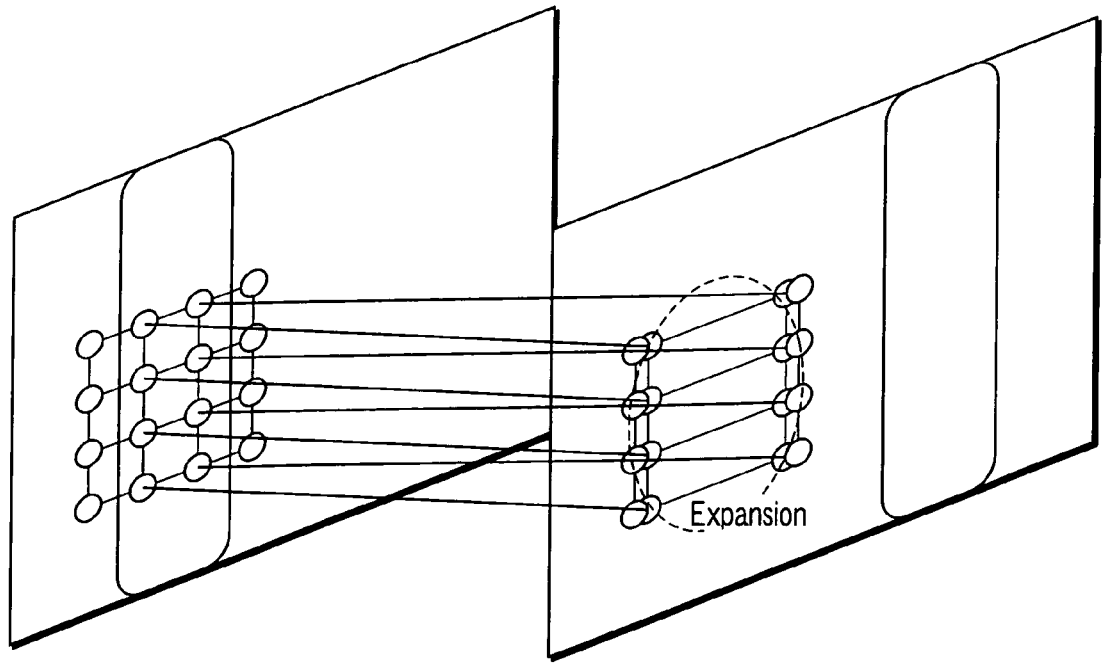
FIG. 42 is a diagram showing a state that a matching error appears as elongation of the spring.

Assuming that the image wherein an object moves from the left to the right is subjected to matching as shown in FIG. 42. In this time, if the matching is correctly done, the lattice of the object should move to a corresponding object. However, if the object cannot be detected due to a matching error, the lattice point on the object is located on the background of the reference image. In this situation, the lattice point is very unstable because the image energy is high. Therefore, the lattice point moves to a location of a lower image energy on its circumference. As a result, the stretch of the spring is observed there.

The similar action occurs even if the matching is carried out in an opposite direction. Therefore, the regions which the forward and backward matching could not be carried out are detected as the expansion and shrinkage of the spring respectively. In other words, it is very likely that the region which could not be detected is contraction with being combined with the occlusion region. The matching error can be compensated by matching the occlusion regions together again.

A surface reliability computation 4 is explained.

A step corresponding to the forward matching unit 42 is assumed to be a first surface reliability computation step and a step corresponding to the backward matching unit 43 is assumed to be a second surface reliability computation step. At first a complement of the surface reliability map of the surface reliability computation step 1 is computed to obtain a back side reliability. Alternatively, a product probability of a surface reliability map of the first surface reliability computation step 1 and that of the surface reliability computation step 2 may be obtained to acquire a complement thereof.

A region that the back side reliability is more than a threshold (0.5, for example) is detected as the back side. These regions are assumed to be the first back side and the second back side respectively. A frame obtained by masking the reference frame t with the second back side is assumed to be a mask reference frame t, and a frame obtained by masking the reference frame t+1Δt with the second side is assumed to be a mask reference frame t+1Δt.

The matching is done using the mask reference frame t as an source image and the mask reference frame t+1Δt as a reference image to produce a forward matching image. The matching is done using the mask reference frame t+1Δt as a source image and the mask reference frame t as a reference image to produce a backward matching image. For example, the reliabilities of the forward matching image and backward matching image are obtained using the step of the surface reliability computation 3 to obtain a surface reliability at the time of matching error.

By doing combination as in the fourth embodiment together with the result of the surface reliability computation 4, a higher-quality interpolation frame can be generated with the matching error being compensated well.

According to the present invention, there can be produced an image wherein even if the image is smoothed off, expression of discontinuity is not lost, and even if discontinuity is expressed, the smoothness is obtained.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image matching method for detecting a mapping from a first image to a second image, comprising:
   setting a first lattice having a plurality of first lattice points to a first image;
   setting a second lattice having a plurality of second lattice points, each second lattice point of the second lattice points of corresponding to each first lattice point of the first lattice points, to a second image;
   computing potential force applied to the each second lattice point by a gradient of an image correlation potential energy based on a position of the each first lattice point, pixel data of the each first lattice points, a position of the each second lattice point and pixel data of the each second lattice point;
   computing elasticity force applied to the each second lattice point from an elasticity energy between the each second lattice point and adjacent lattice points on the second lattice which are adjacent to the each second lattice point;
   computing frictional force occurring at the each second lattice point;
   performing a numerical analysis of an equation of motion regarding the second lattice points and based on the potential force, the elasticity force and the frictional force to obtain a convergence state of the second lattice points; and
   adding a new lattice point between an adjacent lattice point pair of the second lattice points according to a distance between the adjacent lattice point pair while the numerical analysis of the equation of motion is performed.

2. An image matching method for detecting a mapping from a first image to a second image, comprising:
   setting a first lattice having a plurality of first lattice points to a first image;
   setting a second lattice having a plurality of second lattice points, each second lattice point of the second lattice points corresponding to each first lattice point of the first lattice points, to a second image;
   computing potential force applied to the each second lattice point by a gradient of an image correlation potential energy based on a position of the each first lattice point and pixel information the each first lattice point and a position of the each second lattice point and pixel data of the each second lattice point;
   computing elasticity force applied to the one second lattice point from an elasticity energy between the one second lattice point and the second lattice points adjacent to the one second lattice point;
   computing frictional force occurring at the one second lattice point;
   performing a numerical analysis of an equation of motion regarding the second lattice points and based on the potential force, the elasticity force and the frictional force t to obtain a convergence state of the second lattice points; and
   changing an elasticity constant of the elasticity energy according to a distance between an adjacent lattice point pair of the second lattice points while the numerical analysis of the equation of motion is performed.

3. The image matching method according to claim 2, wherein the changing includes changing the elastic constant step-by-step according to the distance.

4. The image matching method according to claim 2, wherein the changing includes changing the elastic constant linearly according to the distance.

5. The image matching method according to claim 2, wherein the changing includes changing the elastic constant in logistic function according to the distance.

6. An image matching apparatus for detecting a mapping from a first reference image to a second reference image, the apparatus comprising:
   a mapping unit configured to map, to first lattice points of a first lattice on a first reference image, second lattice points of a second lattice on a second reference image, respectively;
   a potential computing unit configured to compute potential force applied to each second lattice point of the second lattice points by a gradient of an image correlation potential energy based on a position of each first lattice point of the first lattice points and image information the each first lattice point and a position of the each second reference lattice point and image information the each second reference lattice point;
   an elasticity computing unit configured to compute elasticity force applied to the each second lattice point from an elasticity energy from the each second lattice point to the second lattice points adjacent to the each second lattice point;
   a frictional force computing unit configured to compute frictional force occurring at the each second lattice point;
   a numerical analysis unit configured to perform a numerical analysis of an equation of motion regarding the second lattice points and based on the potential force, the elasticity force and the frictional force to obtain a convergence state of the second lattice point; and
   a lattice point adding unit configured to add a new lattice point between an adjacent lattice point pair of the second lattice points according to a distance between the adjacent lattice point pair while the numerical analysis of the equation of motion is performed.

7. An image matching apparatus for detecting a mapping from a first image to a second image, the apparatus comprising:
   a first lattice setting unit configured to set a first lattice having a plurality of first lattice points to a first image;
   a second lattice setting unit configured to set a second lattice having a plurality of second lattice points corresponding to the first lattice points respectively, to a second image;
   an active force computing unit including an image correlation force computing unit configured to compute image correlation force corresponding to a gradient of an image correlation potential energy based on a positional relation of the fist lattice points and the second lattice points to obtain potential force acting to each second lattice point of the second lattice points, an elasticity computing unit configured to compute elasticity force corresponding to a distance between the each second lattice point and the second lattice points adjacent to the second lattice point, and frictional force computing unit configured to compute frictional force occurring at the reference second lattice point, a numerical analysis unit configured to obtain numerically a position of the each second lattice point and a speed of the each second lattice point using the image correlation force, the elasticity force and the frictional force;
   a lattice point-to-point distance computing unit configured to compute a distance between the each second lattice point and each of the second lattice points adjacent to the each second lattice point based on the position of the each second lattice point obtained by the numerical analysis unit;

a lattice adding control unit configured to add a new second lattice point between an adjacent lattice point pair of the lattice points between which the distance satisfies a predetermined condition exists; and a numerical analysis control unit configured to output, to the active force computing unit, the position of the each second lattice point and the speed of the each second lattice point, which are obtained by the numerical analysis unit, and a position of the new second lattice point added by the lattice adding control unit and a speed of the new second lattice point, till the second lattice point reaches a convergence state.

8. The image matching apparatus according to claim 7, wherein the active force computing unit is configured to compute image correlation force, elasticity force and frictional force for the new second lattice point.

9. An image matching apparatus for detecting association between a first image and a second image, the apparatus comprising:
   a first lattice setting unit configured to set a first lattice having a plurality of first lattice points to a first image;
   a second lattice setting unit configured to set a second lattice having a plurality of second lattice points corresponding to the first lattice points respectively, to a second image;
   an active force computing unit comprising an image correlation force computing unit configured to compute image correlation force corresponding to a gradient of an image correlation potential energy based on a position of each first lattice point of the first lattice points, a position of each second lattice point of the second lattice points, pixel information of the each first lattice point and pixel information of the each second lattice point, an elasticity computing unit configured to compute elasticity force corresponding to a lattice point-to-point distance between the each second lattice point and the second lattice points adjacent to the each second lattice point and a variable elastic coefficient, and a frictional force computing unit configured to compute frictional force occurring at the second lattice point;
   a numerical analysis unit configured to obtain numerically a position of the each second lattice point and a speed of the each second lattice point using the image correlation force, the elasticity force and the frictional force; and
   a lattice point-to-point distance computing unit configured to compute the lattice point-to-point distance for each of the second lattice points based on the position of the each second lattice point obtained by the numerical analysis unit;
   an elastic coefficient control unit configured to change a value of the variable elastic coefficient according to the lattice point-to-point distance; and
   a numerical analysis control unit configured to output, to the active force computing unit, the position of the each second lattice point and the speed of the each second lattice point, which are obtained by the numerical analysis unit, till the each second lattice point reaches a convergence state.

10. An image matching method for detecting association between a first image and a second image, the apparatus comprising:
    setting a first lattice having a plurality of first lattice points to a first image;
    setting a second lattice having a plurality of second lattice points corresponding to the first lattice points respectively, to a second image;
    computing active force including:
    computing image correlation force corresponding to a gradient of an image correlation potential energy based on a position of each first lattice point of the first lattice points, a position of each second lattice point of the second lattice points, pixel information of the each first lattice point and pixel information of the each second lattice point;
    computing elasticity force corresponding to a lattice point-to-point distance between the second lattice point and the second lattice points adjacent thereto and a variable elastic coefficient; and
    computing frictional force occurring at the each second lattice point;
    obtaining numerically a position of the each second lattice point and a speed of the each second lattice point using the image correlation force, the elasticity force and the frictional force; and
    computing the lattice point-to-point distance for each of the second lattice points based on the position of the each second lattice point obtained by the numerical analysis; and
    adding a new second lattice point between an adjacent lattice point pair of the second lattice points between which the lattice point-to-point distance satisfies a given condition, wherein
    the position of the each second lattice point and the speed of the each second lattice point, which are obtained by the numerical analysis and a position of the new second lattice point added by the lattice adding and a speed of the new second lattice point are used for the computing the active force till the each second lattice point reaches a convergence state.

11. The image matching method according to claim 10, wherein the computing the active force includes computing image correlation force, elasticity force and frictional force for the new second lattice point.

12. An image matching method for detecting a mapping from a first image to a second image, the apparatus comprising:
    setting a first lattice having a plurality of first lattice points to a first image;
    setting a second lattice having a plurality of second lattice points corresponding one to one to the first lattice points to a second image;
    computing active force including computing image correlation force corresponding to a gradient of an image correlation potential energy based on a position of each first lattice point of the first lattice points, a position of each second lattice point of the second lattice points, pixel information of the each first lattice point and pixel information of the each second lattice point, computing elasticity force corresponding to a lattice point-to-point distance between the each second lattice point and lattice points adjacent to the each second lattice point and a variable elastic coefficient, and computing frictional force occurring at the each second lattice point;

obtaining numerically a position of the each second lattice point and a speed of the each second lattice point using the image correlation force, the elasticity force and the frictional force; and computing the lattice point-to-point distance for each of the second lattice points based on the position of the each second lattice point obtained by the numerical analysis; and changing a value of the variable elastic coefficient step-by-step according to the lattice point-to-point distance, wherein the position of the each second lattice point and the speed thereof which are obtained by the numerical analysis are used for the computing the active force till the each second lattice point reaches a convergence state.

* * * * *

UNITED STATES PATENT AND TRADEMARK OFFICE
CERTIFICATE OF CORRECTION

PATENT NO. : 7,440,619 B2 Page 1 of 1
APPLICATION NO. : 11/355144
DATED : October 21, 2008
INVENTOR(S) : Mishima et al.

It is certified that error appears in the above-identified patent and that said Letters Patent is hereby corrected as shown below:

Column 51, line 59, change "force t to" to --force to--.

Column 52, line 53, change "fist" to --first--.

Signed and Sealed this

Thirtieth Day of December, 2008

JON W. DUDAS
*Director of the United States Patent and Trademark Office*